US006634946B1

(12) United States Patent
Bridgeman et al.

(10) Patent No.: US 6,634,946 B1
(45) **Date of Patent: *Oct. 21, 2003**

(54) PARI-MUTUEL NETWORKS, DEVICES AND GAMES

(76) Inventors: James L. Bridgeman, 9582 Hamilton Ave., Huntington Beach, CA (US) 92646; Nancy L. Bridgeman, 9582 Hamilton Ave., Huntington Beach, CA (US) 92646; Lance F. Bridgeman, 9582 Hamilton Ave., Huntington Beach, CA (US) 92646; Jerry K. Bridgeman, 9582 Hamilton Ave., Huntington Beach, CA (US) 92646; Stephanie A. Bridgeman, 9582 Hamilton Ave, Huntington Beach, CA (US) 92646; Robert J. Bridgeman, 9582 Hamilton Ave., Huntington Beach, CA (US) 92646

( * ) Notice: Subject to any disclaimer, the term of this patent is extended or adjusted under 35 U.S.C. 154(b) by 0 days.

This patent is subject to a terminal disclaimer.

(21) Appl. No.: 09/395,729

(22) Filed: Sep. 12, 1999

Related U.S. Application Data

(62) Division of application No. 08/938,024, filed on Sep. 19, 1997, now Pat. No. 5,984,779.

(51) Int. Cl.[7] .............................. A63F 13/00; A63F 1/00

(52) U.S. Cl. .............................. 463/28; 463/26; 463/27; 463/13

(58) Field of Search .............................. 463/13, 26–28; 273/292

(56) References Cited

U.S. PATENT DOCUMENTS

| | | | | |
|---|---|---|---|---|
| 4,836,553 A | * 6/1989 | Suttle et al. | ................ | 273/292 |
| 5,275,400 A | * 1/1994 | Weingardt et al. | ............ | 463/28 |
| 5,476,259 A | * 12/1995 | Weingardt | ................... | 463/28 |
| 5,984,779 A | * 11/1999 | Bridgeman et al. | ........... | 463/16 |

OTHER PUBLICATIONS

"Draw Poker", Scarne's Encyclopedia of Games, John Scarne, Harper & Row Publishers, pp. 6–18. 1973.*

* cited by examiner

*Primary Examiner*—Benjamin H. Layno

(57) ABSTRACT

This present pari-mutuel invention provides for a network of table games and real time electronic devices operating slots, poker, keno, bingo and other games. Players compete against other players for non-banked prizes which are paid only from player pools. Player pools start with a balance of zero. The player pool receives one hundred percent (100%) of player bets, less appropriate rental fees. Posted prizes cannot exceed the player pool. The player receives dynamic displays of the pool balance and corresponding posted prizes. A top prize feature prevents the pool from dropping back to zero. The house receives a fee from players who rent a pari-mutuel device. The house does not seed the pool with money, nor take any money from it. The devices can operate in a stand-alone-mode with local player pools under local control. However, they have linked access to a network controlled by a central management system to receive the benefit of centralized Player pools. Pari-mutuel devices can switch to a "stand-alone-mode" using the local pool. This may be desirable when the central pool becomes unavailable for any reason, or simply if stand-alone-mode is preferred.

57 Claims, 47 Drawing Sheets

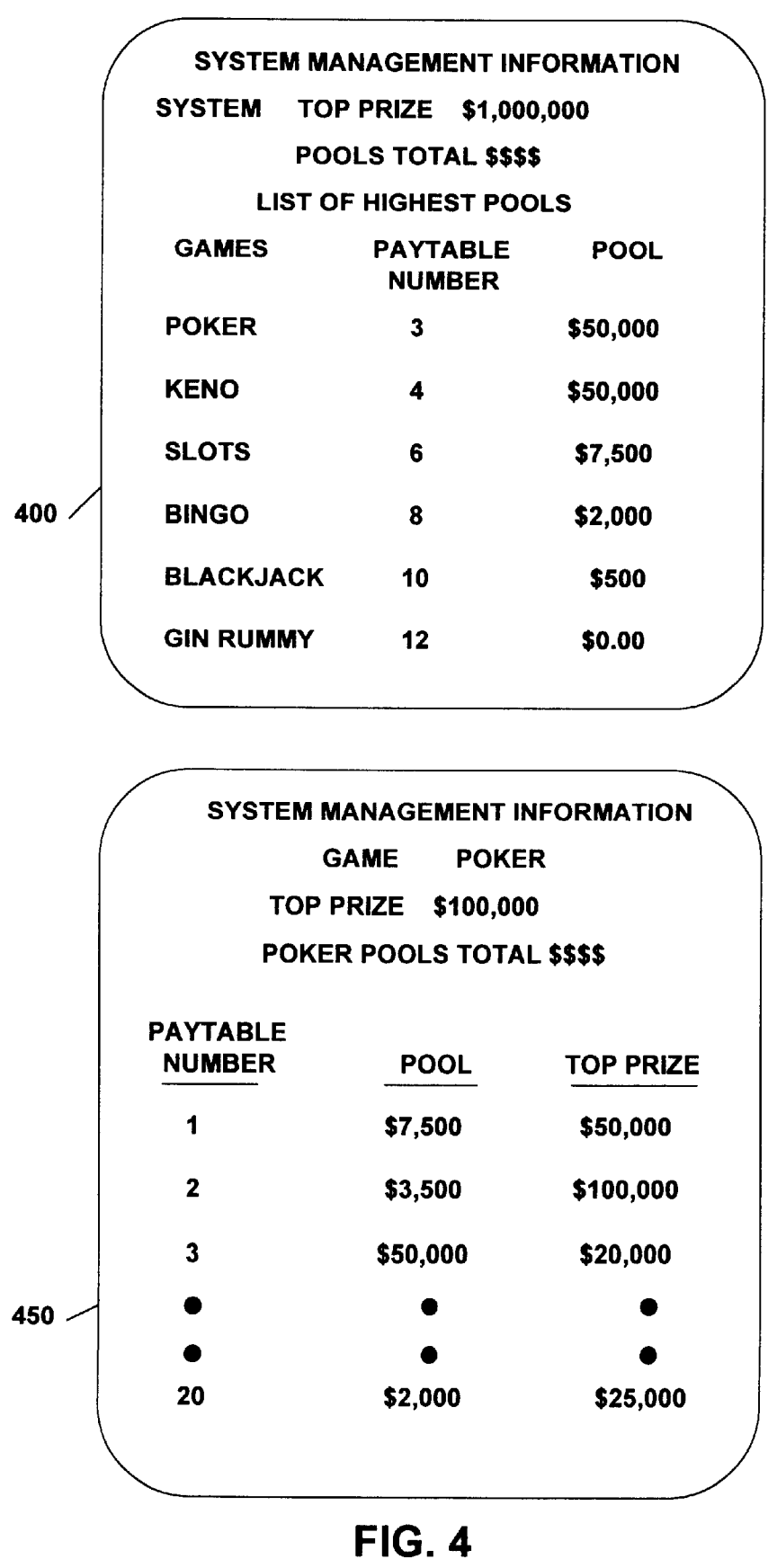

400

SYSTEM MANAGEMENT INFORMATION

SYSTEM TOP PRIZE $1,000,000

POOLS TOTAL $$$$

LIST OF HIGHEST POOLS

| GAMES | PAYTABLE NUMBER | POOL |
|---|---|---|
| POKER | 3 | $50,000 |
| KENO | 4 | $50,000 |
| SLOTS | 6 | $7,500 |
| BINGO | 8 | $2,000 |
| BLACKJACK | 10 | $500 |
| GIN RUMMY | 12 | $0.00 |

450

SYSTEM MANAGEMENT INFORMATION

GAME POKER

TOP PRIZE $100,000

POKER POOLS TOTAL $$$$

| PAYTABLE NUMBER | POOL | TOP PRIZE |
|---|---|---|
| 1 | $7,500 | $50,000 |
| 2 | $3,500 | $100,000 |
| 3 | $50,000 | $20,000 |
| ● | ● | ● |
| ● | ● | ● |
| 20 | $2,000 | $25,000 |

FIG. 4

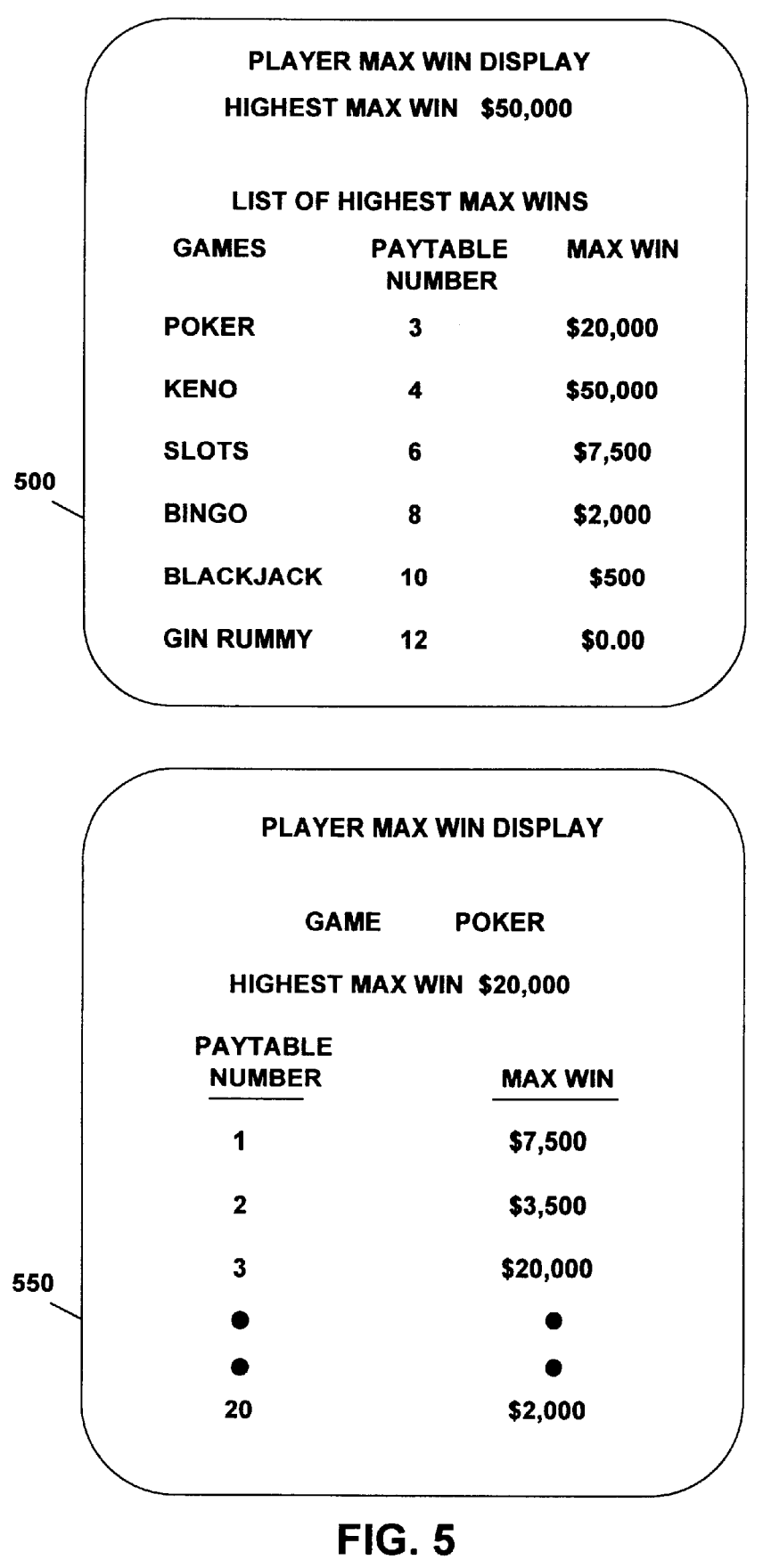

500

PLAYER MAX WIN DISPLAY

HIGHEST MAX WIN $50,000

LIST OF HIGHEST MAX WINS

| GAMES | PAYTABLE NUMBER | MAX WIN |
|---|---|---|
| POKER | 3 | $20,000 |
| KENO | 4 | $50,000 |
| SLOTS | 6 | $7,500 |
| BINGO | 8 | $2,000 |
| BLACKJACK | 10 | $500 |
| GIN RUMMY | 12 | $0.00 |

550

PLAYER MAX WIN DISPLAY

GAME POKER

HIGHEST MAX WIN $20,000

| PAYTABLE NUMBER | MAX WIN |
|---|---|
| 1 | $7,500 |
| 2 | $3,500 |
| 3 | $20,000 |
| ● | ● |
| ● | ● |
| 20 | $2,000 |

FIG. 5

PLAYER POOL DATA PACKET

| TYPE | NUMBER OF MACHINE | PPA $ | ON-LINE | # UP OPERATING | # BEING PLAYED | MASTER/ SLAVE |
|---|---|---|---|---|---|---|
| T-ID | T# | PPA $ | YES/NO | TU# | TP# | |
| H-ID | H# | H$ | YES/NO | HU# | HP# | M/S |
| G-ID | G# | G$ | YES/NO | GU# | GP# | M/S |
| B-ID | B# | B$ | YES/NO | BU# | BP# | M/S |
| M-ID | M# | M$ | YES/NO | MU# | MP# | M/S |
| ID-1 | 11# | 11$ | YES/NO | IU#1 | IP#1 | M/S |
| ID-2 | 12# | 12$ | YES/NO | IU#2 | IP#2 | M/S |
| ● ● ● | | | | | | |
| ID-N | IN# | 1N$ | YES/NO | IU#N | IP#N | M/S |

FIG. 33A

PACKET LEVEL SETTINGS:

| | PACKET LEVEL T | PACKET LEVEL H | PACKET LEVEL G | PACKET LEVEL B | PACKET LEVEL M | PACKET LEVEL I |
|---|---|---|---|---|---|---|
| T-ID TOTAL | X | X | X | X | X | X |
| H-ID HIGHGRP | O | X | X | X | X | X |
| G-ID GROUP | O | O | X | X | X | X |
| B-ID BANK | O | O | O | X | X | X |
| M-ID MACHINE | O | O | O | O | X | X |
| ID-1 | H-1 | G-1 | B-1 | M-1 | O | O |
| • • • | H | G | B | M | O | O |
| ID-N | H-N | G-N | B-N | M-N | O | O |

FIG. 33B

PARI-MUTUEL NETWORKS, DEVICES AND GAMES

This is a Division of Ser. No. 08/938,024, Filed Sep. 19, 1997 now U.S. Pat. No. 5,984,779, Examiner Layno.

BACKGROUND-CROSS-REFERENCE TO RELATED APPLICATIONS

U.S. Pat. No. 5,033,744, U.S. Pat. No. 5,046,736, U.S. Pat. No. 5,224,706, and U.S. Pat. No. 5,308,065, all relate to electronic gaming devices that are suitable for use in our present invention where the payouts are based on a Pari-Mutuel system that allows for preset paytables, with a separate rent fee to be earned by the gaming establishment.

BACKGROUND—DISCUSSION OF PRIOR ART

Our invention is a new method and apparatus for player pools in a gaming environment. It is an innovative Pari-Mutuel slot machine, which requires no seed money. This method is especially suitable for those casinos and lotteries, that cannot have games with house backed prizes.

U.S. Pat. No. 5,275,400 "Pari-Mutuel Electronic Gaming," combines the Nevada style banked progressive with a Pari-Mutuel pool. However, it requires seeding by the house or banker, at startup and when the pool goes negative. Once house seeding is used, it is a banked game. Thus, the referenced patent allowed banking, since the house used its own money to seed the pool. The Keno game in the state of California, was declared illegal on Jun. 24, 1996, because it was a banked game. The California Keno game used guaranteed, preset prizes that were banked by the State (the house). It was deemed not a legal lottery, which can pay winnings only from player money.

Each legal jurisdiction has its own definition for skill games and games of chance. Some prohibit games of chance, while allowing games of skill. In certain cases, some skill games are legal, but others are not. States, like California, specifically do not allow banked games, where the house guarantees any part of a bonus. At the present time, the only popular slot machines are banked games that pay preset prizes. There are no known Pari-Mutuel video slots or poker gaming machines operating successfully today, in any legal jurisdiction.

OBJECTS AND ADVANTAGES

Accordingly, we have provided a new method and apparatus with the following objects and advantages. Pari-Mutuel gaming machines haven't competed successfully in the marketplace alongside slots, Draw Poker, or other gaming devices. Our unique method presents these gaming machines in a Pari-Mutuel format, while retaining their most popular and successful features.

Any game, can be made into a viable player pool, game. This includes: table games, card games, slot games, draw poker games, Bingo, Keno and other gambling games.

Electronic skill game machines, using Pari-Mutuel payoff methods, can now be used in jurisdictions where only non-banked skill games are allowed. In fact, any table game with or without electronic assistance, combined with our method might now be legal.

There are jurisdictions, where no gaming machines have been allowed, which do allow Pari-Mutuel gaming. Electronic slot game machines, using Pari-Mutuel payoff methods, may now be used.

A rapid build-up of a player pool is possible without being banked (seeded) by the house. One hundred percent (100%) of player bets, less player winnings, goes to the player pool, not just a fraction of the bet. This may cause the Jackpots to be astronomically high. Where legal, the sky may be the limit!.

Preset pay schedules are now possible without house backing. Players bet against posted pay-schedules changing dynamically, while racing against other players for maximum wins.

Zero seeding eliminates the banking aspect of any game and makes our invention unique.

Rent (fee for apparatus use) clearly can be kept physically separate from the player's pool. This assumes unequivocally, that the house never, at any time, contributes to the Player's pool.

Our invention is flexible. This is a multi-faceted invention that can operate in a full spectrum of ways, that are quite player friendly. In the beginning, this system operates quite simply; as a single game (stand-alone) video machine played by one player at a time. At the end, most brilliantly, it operates within a whole network; as a multi-game machine with multiple players playing against each other through linked machines.

A casino can choose between local or remote control over their linking system.

Where legal, with more player contributions, this pool can accumulate geometrically larger progressives.

A real time, continuous, non-banked Keno system allows the players to make bets, as fast as the Keno device accepts them and certainly makes this invention commercially feasible.

A top-prize feature insures that the pool won't drop back to the start-up condition of zero.

The house never covers a bet and has no downside, since it is a true player's pool.

Our invention features many player options: players can choose or switch from the different games offered, with dynamically different odds and paytables, including a wide variety of jackpots (which are found in sidepots). The many pots (sub-pools) spread the overall system around for considerable variety. These player options, combined with the potentially huge jackpots, make this invention exciting and commercially feasible.

SUMMARY

Our real time method, presents gaming in a new, dynamic way. It works for table games, skill games, slots, video poker games, real time Keno or Bingo, and other games. It operates by itself as a stand-alone machine or in a network of linked machines. The apparatus operates as a stand alone, or in a network of linked machines. It provides for local or remote control. Centralized pools give large jackpots, but stand-alone machines may operate with part of the central pool with no bank contribution, when the network is disabled. State lotteries, race tracks, card rooms, and casinos can take advantage of this Pari-Mutuel system.

Players compete only against other players for prizes, paid from a player pool accrued from player bets. The house never involves itself in the wager, in any manner.

The preferred embodiment has a rent slot where the player pays a fee, to use the system or video machine. Rent money entered through a coin acceptor, is easily kept separate from the player bet money, entered through a bill acceptor.

Player money increases credits, but does not affect the pool until bet. Each bet decreases credits and increases the pool, including Maxwin. The pool amount and Maxwin are always accessible at video monitors, or LED sign displays. In summary, the pool rises with player bets, and falls with player wins. With one hundred linked machines, the Maxwin of our invention, can grow significantly larger than the top-prize for the average video poker machine.

Popular preset paylines with varying prizes form the paytables. But, these paylines can each be set to a different percentage of the player's pool, rather than preset amounts. The selection is controlled by the system operator.

At system startup, the player's pool has no money. But shortly, the Maxwin may reach five (5) units. Paylines will display five (5) units for those paylines that exceed five (5) units.

The player will develop strategies to cope with pool fluctuations. When the pool is low, the skilled player may emphasize non-Maxwin combinations. Why try for risky hands that don't pay more? Maxwin can be restricted at the upper end by the maximum top-prize value set by the system operator.

It is commercially feasible. The Casino gets rent for games just as they currently do for table games. More excitement builds when the pool goes up 100% of the money bet (less wins).

DRAWING FIGURES

FIG. 4 shows "System Management Information" with pool information that is supplied to a system operator, in accordance with the method of the present invention.

FIG. 5 shows displays of various games and Maxwin amounts which are selectable by the player, when playing an electronic gaming device of FIG. 1.

FIG. 33A shows a typical data packet for a Player Pool System according to our invention.

FIG. 33B illustrates how Type categories are set, depending on the hierarchy level of the data packet according to our invention.

DRAWING REFERENCE NUMERALS

Figure 1:
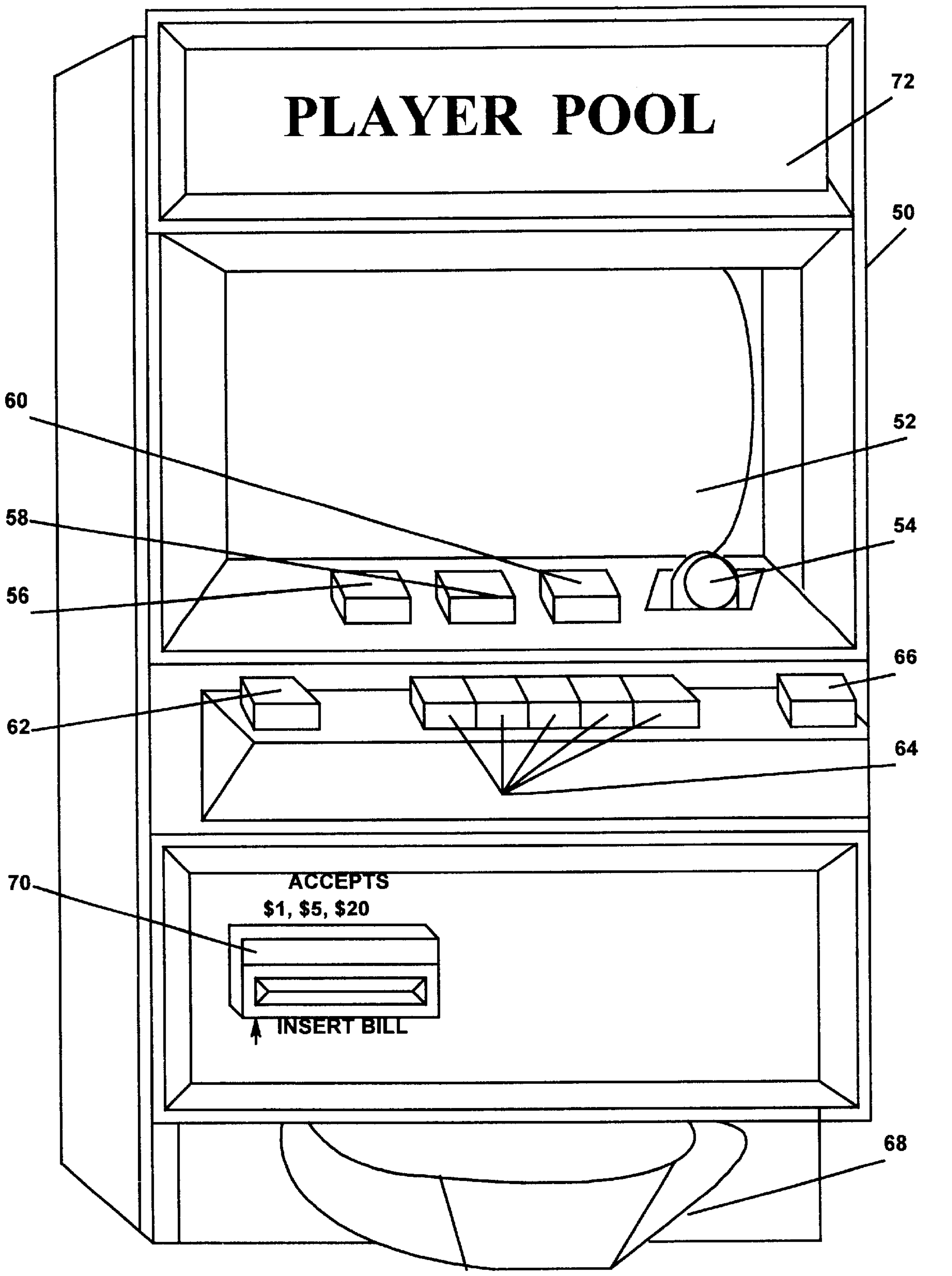
FIG. 1 is a perspective view of an "electronic video game machine" in accordance with the present invention.

50 CABINET of video game machine.
52 CATHODE RAY TUBE (CRT).
54 COIN INLET.
56 COLLECT button.
58 PLAY 1 CREDIT button.
60 PLAY MAX CREDIT button.
62 FOLD button.
64 CHANGE CARDS button.
66 BET/DEAL button.
68 COIN OUTLET (including tray) for coins, tokens, coupons or tickets.
70 BILL ACCEPTOR.
72 PLAYER POOL display.
200 MAXWIN PAYTABLE display.
210 PAYTABLE NUMBER display.
230 MAXWIN display.
234 TIME left display.
236 GAMES remaining display.
240 RENT units display.
250 WAGER/bet display.
260 CREDITS display.
270 PLAYER PAID display.
280 ANY GAME.
300 KENO GAME.
310 KENO RATE CARD (paytable).
400 LIST OF POOLS for management.
450 LIST OF POOLS for a game for management.
500 LIST OF MAXWINS for a player.
550 LIST OF MAXWINS for a game for a player.
610, 620, 630 and 640 PAYTABLES for poker.
650 ONE PAYLINE PAYOUT for a flush.
680 PAYS TIMES BET.
710, 720, 730 and 740 PAYTABLES for poker.
750 ONE PAYLINE PAYOUT for a Royal Flush.

DETAILED DESCRIPTION OF THE PREFERRED EMBODIMENTS GLOSSARY

Most of the terms used are standard in the industry. However, certain terms are defined to standardize them for this discussion. The following terms have the following meanings:

Banked game. A game where payouts of player wins are guaranteed by the house.

Bank, Machine A number of machines linked together, usually to form larger progressives. (Not to be confused with the house.)

Pari-Mutuel. A bank of machines which operates at the lowest hierarchy level of linked machines in a Pari-Mutuel system.

Banker. Synonymous with the house (casino) where banked (non-Pari-Mutuel) games are allowed. The banker guarantees posted prizes.

Black Jack. A popular game in Vegas casinos sometimes called 21, which is usually a banked (non-Pari-Mutuel) game.

Chips—See Player Chips.

Chit, Dealer. An I.O.U. filled out, and signed by the dealer, to borrow chips from the PPC.

Committed. General—Player money that is committed to the player pool before it is actually bet. Committed money (could be in computer video RGB format) is stored into credits (player betting money), and a stash variable (containing committed credits, not yet bet by the player). If the stash credits are more than the player pool, the player might not be allowed to cash them. However, our invention lets these committed credits be converted to escrow credits for deferred player use (at system operator option). (see Stash, Decommitted.)

Credits. (Player Credits.) The amount of unused money belonging to the player. The credits may be bet, or collected by the player.

Decommitted. Committed player money that has been bet, or cashed out (see Committed and Stash). When the player cashes out, the committed money kept in the stash variable, has to be backed out of the player pool (decommitted), if possible.

Downlinks. Communications sent from a specified hierarchy level machine to a machine at a lower hierarchy level.

Group (G-node) Server. Linked machines lower than H-level, operating at same logical level, but higher than the bank level.

High Group (H-node) server. Linked machines higher than Group G-level and lower than Total T-level.

High Hand (H) Player 5 card hand in "Pai-Gow Poker" or "Fast Pai-Gow".

House. The establishment wherein gambling occurs.

Internet. A network of machines communicating with each other, which links communications between computers, using the Internet Protocol.

Loser Bets (LB). The total of bets made by losing players.

Lottery. Considered a non-banking player's pool. It is also a Pari-Mutuel where wins are paid only from money bet by players.

Low Hand (L). The player two (2) card hand in "Pai-Gow Poker" or "Fast Pai-Gow"

Maxwin. The highest amount a player can win from a specific pot.

Master. A machine (computer) that controls other machines (slaves) at the same hierarchy level.

Master Bank. The master machine controlling a bank of slaves.

MC—See Money Chips.

Money Chips. These are chips which represent Money (cash) that has not been committed to the Player Pool.

Node. A machine (computer) in a communication network, which receives, processes, and passes on data.

Pari-Mutuel. It is a player's pool. Horse racing uses an elaborate system of changing odds as people bet up until race time. Players can receive winnings only from the Player Pool. And bankers cannot take from it, or add (seed) money to it.

Paypot. Repository for money which covers the wins for an associated pay-schedule, up to a Maxwin top payout. (Almost interchangeable with Paytable, since each paytable has a paypot, and each paypot has a paytable. However, a paytable can use money from both paypots and sidepots, but a paypot can't use money from sidepots.)

Payrank. A classification within paytype.

Paytable, Maxwin A paytable which is derived from a preset paytable, but where the posted pay amounts do not exceed a Maxwin amount (see "Paytable, Preset"). A Maxwin paytable is a visible means for the player to know how the related paypot will be disbursed based on certain combinations in game play. (Almost interchangeable with Paypot, since each paytable has a paypot, and each paypot has a paytable. However, a paytable can use money from both paypots and sidepots, but a paypot can't use money from sidepots.)

Paytable, Preset. A paytable which is defined in advance, specifying the minimum win values for certain winning combinations. They are only suitable for banked games (unless modified in accordance with our invention, see "Paytable, Maxwin").

Paytype. A classification which defines game results in some order, usually by difficulty of achievement. Such as, a Royal Flush hand in a video Draw Poker is much more difficult to get than a straight hand.

Player chips. Tokens, or other substitutes for player cash, used at table games.

PC. (See Pool Chips.)

PPA. (See Player Pool Amount).

PPC. (See Player Pool Cage.)

Player Pool Amount. The amount of money in the Player Pool, which can be used to pay player winnings.

Pool Chips (PC). Committed Money Chips representing player money in the Player Pool, and available for prizes.

Player Pool Cage (PPC). Repository for Player Chips (including MC's and PC's), and cash to redeem chips.

Player's pool. The total amount of money that has accrued from player betting, less wins.

Pot. Repository for portions of player pool. (Also, see paypot, sidepot, and zeropot.) Paypots specifically are disbursed according to the rules of a Maxwin paytable. However, sidepots can also be disbursed from a Maxwin paytable specification.

Progressive. An amount, normally starting at a minimum value, and increasing by holding back a small percentage, say one percent of each bet. It is usually associated with linked machines, but a single machine can have its own internal progressive. In fact, different games on a multiple-game machine can be linked together for a total games progressive. The progressive buildup is usually associated with the top win as an incentive for a player to bet more. The player normally can not get this jackpot unless they bet over and above the normal limits.

Rent. A certain Fixed amount (fee) to use a machine for a number of games, or for a certain play time. It also can be the amount required to play at the cardroom tables. Where legally allowed, it could be a percentage of the bet or a percentage of the money won.

Rent, Nevada Style. A percentage of the players win is treated as rent and goes to the house and/or employees of the house.

Scratchers. (Pull-Tabs). Paper form (or video simulation) where squares are uncovered to reveal winnings, if any.

Server. Communication node.

Slave. A machine which controls no other machines, but reports to another machine.

Sidepot. Repository for special bonuses, extra progressives, mystery bonuses, etc. Can also be used to collect various fees, e.g. money to state, fees to vendors, and for other lottery allocations. Where legal, rent money, collected as a percentage of player winnings or player bets, can be accumulated in a sidepot.

Stash. Repository for committed money, used up as the player bets.

Top-prize. An amount specifying the largest Maxwin for payouts. It can be a Fixed amount of units, or it can be a percentage of a pool or pot, (usually less than 100%). When a percentage, it keeps pots from being emptied during a Maxwin event. A System (S) top-prize overrides all other top-prizes at lower levels. In turn, a Game (G) top-prize overrides any lower level Paytable (P) top-prize for that game.

Total (T-node) Server. The highest level node in the hierarchy, where the total Player Pool (PPA) is accumulated, and is communicated back to the lower hierarchy levels.

Uplinks. Communications sent from a specified hierarchy level machine to a machine at a higher hierarchy level.

Winner Bets TWOS. The total bets made by winning players. Wintable. In "Pai-Gow Poker" or "Fast Pai-Gow", the amount posted for payouts, based on the five (5) card player hand.

Zeropot. Repository for money that might normally go into a paypot. It is used to fill the associated paypot when the paypot goes to zero.

DETAILED DESCRIPTION—FIG. 1

FIG. 1 shows a perspective view of a video game machine, according to our invention. The video monitor displays various symbols appropriate to the game played. The machine services button actions, collects bets and makes payoffs. Payoffs are credits, points, coins or printed tickets.

The machine's CABINET 50 is about 100 cm high; 45 cm wide, and 45 cm deep. It includes a video monitor (cathode ray tube CRT 52) or like display panel hardware.

The player inserts the proper number of fee or rent coin(s), in a COIN INLET 54 to activate the game. The COIN INLET 54 connects to a coin collector; it only collects, and does not dispense money in our preferred embodiment. Cashless systems can accept rent through coupons or credit/debit/ATM cards.

The player can pre-set the bet by choosing either PLAY 1 button 58 or PLAY MAX 60. The Player can repeatedly hit the PLAY 1 CREDIT 58 to bet 1, 2, 3 or more coins to the desired size. The PLAY MAX 60 immediately raises the bet to the game limit bet. Before or after setting the bet, the player inserts the bills (paper money) in the BILL ACCEPTOR 70, which adds money to player CREDITS 260.

The Player now plays the game by hitting a DEAL/BET (SPIN button for slots) button 66. This button press transfers player credits to the wager, simultaneously committing the bet amount to the player's pool. Draw Poker has five buttons so the player may hold or discard cards by using the CHANGE CARD buttons 64. The FOLD 62 button is used in multiple bet games, to end the game without another wager.

Our invention uses preset paytables, as the foundation for our Maxwin paytables. Nevertheless, each posted payline is modified, to not exceed Maxwin, at any time. No player can ever win more than the amount in the player pool, regardless of any posted potential prizes. All prize money comes from the player's pool, never from the house, thus a non-banking game.

A win payoff is computed from a Maxwin paytable, derived from a preset paytable which has preset schedule. A Maxwin paytable limits a payoff so that it does not exceed available funds in the PLAYER POOL 72. A win amount is added to credits, and the credits display is updated. The player collects credits (winnings and player money) by pressing COLLECT 56 button. Credits convert to cash in the form of coins (or printed as a pay ticket by a printer device) in the tray of COIN OUTLET 68 (Money Dispenser). The player win, of course, reduces the players pool.

Many types of input controllers are available including keys, buttons, mouse, light pens, touchscreens or similar devices, which can be used to input information to the game.

Many details do not appear in the above hardware description. To one skilled in the art, these omitted details are obvious. All hardware for our video poker machine is similar to existing video poker machines. Coin hoppers, coin acceptors, bill acceptors, and hard meters are standard equipment. Other standard equipment includes IBM compatible computers, screen monitors, and VGA graphic display cards. It is relatively simple for an experienced engineer in the gaming business to construct a comparable machine.

DETAILED DESCRIPTION—FIG. 2

Figure 2:
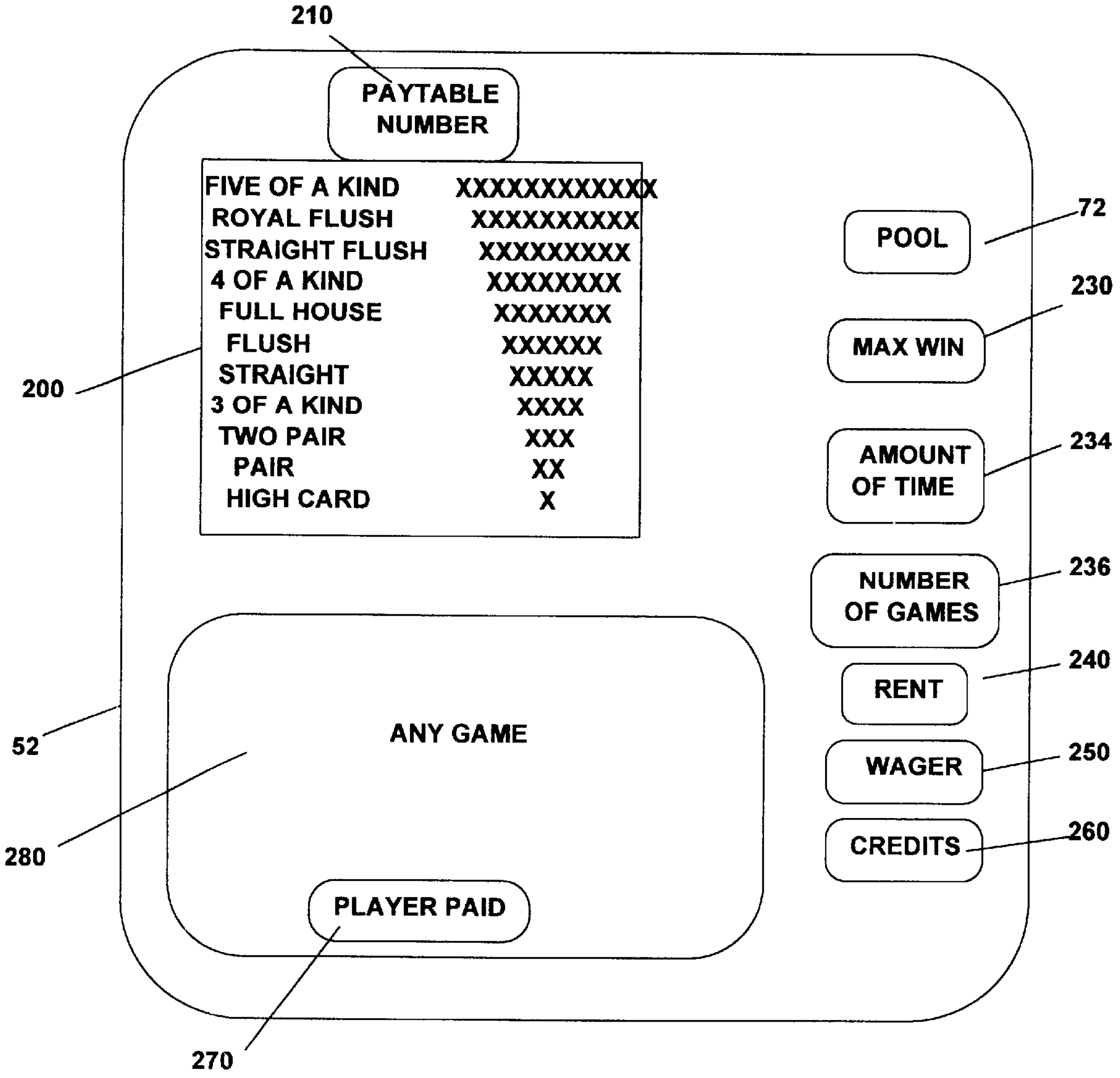
FIG. 2 shows a typical video display for an "electronic poker game," which appears on the screen of an electronic gaming device programmed to operate in accordance with the method of the present invention.

FIG. 2 shows a typical electronic video poker display that appears on the screen of an electronic gaming device programmed to operate in accordance with the method of the present invention.

FIG. 2 shows a video monitor CRT 52 that displays the VIDEO GAME 280, the MAXWIN PAYTABLE 200, the PAYTABLE NUMBER 210, the PLAYER POOL 72, the MAXWIN 230, TIME 234 left, GAMES 236 remaining, RENT 240, last bet or WAGER 250, player CREDITS 260, and last PLAYER PAID 270 amount.

The video poker game machine of FIG. 1 is called a stand alone machine, if it is not linked with other machines. Stand alone machines display the PLAYER POOL 72 amount that has accumulated up to the present time on that particular machine. A player really competes with all players that play that machine, before and after the current player. A machine linked to others, reflects play on all linked machines to cause a more rapid increase in the PLAYER POOL 72.

The PLAYER POOL 72 and the MAXWIN 230 fluctuate according to wins and losses. The MAXWIN PAYTABLE 200 shows various combinations and their posted win amounts.

Our MAXWIN PAYTABLE 200 appears like current gaming machines, but posted paylines never exceed the Maxwin. At system startup, all paytable lines display a Maxwin of $0.00, or zero. Maxwin covers all posted prizes, at that startup time. New payline amounts appear as the Maxwin climbs. Display of posted prizes, changes dynamically in real time, as players win and lose.

The Maxwin line displays are replaced by preset paylines, as Maxwin climbs to the top like a column of mercury in a thermometer on a hot day. The low value prizes are exposed first, then medium value prizes, and so on. The highest prize is the Maxwin, disregarding special Jackpots. Using the thermometer analogy, the column of Maxwin may climb out of sight. The size of the player's pool is always displayed along with the Maxwin and paytables are easily accessed by touching a virtual button on a video Touch Screen. The Maxwin changes with the fluctuations in the player POOL 72. A jackpot, or any top bonus payoff, will cause the pool to decrease significantly. It could re-start at zero, after being emptied by a large win. The remaining pool could be a fraction, of the previous pool. This fraction depends on our invention of the setting of the top-prize percentage. A top-prize less than 100% prevents the pool from going to zero.

Before play, the preferred embodiment requires the player to first pay RENT 240. Where legal, the rent can be collected as a percentage of player bets, or of the player winnings. The RENT 240 box shows rent paid, GAMES 236 remaining, and TIME 234 left. Player CREDITS 260 are accrued by inserting bills, tokens, coupons, or cards.

An increase in CREDITS 260 does not cause the PLAYER'S POOL 72 to increase. The credits are not committed to the game, and player's pool until they are bet. However, the system operator can direct new money to be immediately committed when it is entered. If so, committed money cannot usually be cashed out until at least that amount has been wagered.

Then the player bets the desired amount. Once bet, credits go down, with the PLAYER POOL 72 going up the same amount. The CREDITS 260 belong solely to the player who may collect them any time. When credits are cashed out, the CREDITS 260 go to zero while the PLAYER PAID 270 display reflects the amount paid. The PAYTABLE 210 is used for identification and for management purposes.

Our invention is a Pari-Mutuel machine that posts preset prizes without turning it into a banking game. These postings change as more player bets are made. Each posted prize cannot exceed a maximum win amount, called MAXWIN 230. Preset pays are posted as Maxwin, if they pay more than Maxwin. As the Maxwin exceeds a masked posted prize, the preset prize will be unveiled.

The MAXWIN 230 box normally shows just a portion of the total system pool amount. The total pool is split into many paypots, zeropots and sidepots. Paypots contain monies to pay posted prizes. Zeropots refill empty paypots. And sidepots accumulate monies for jackpots, etc. The MAXWIN 230 is the maximum paypot win for the particular selected game at that instance in time; sidepots can pay additional amounts. The RENT 240 box shows rent paid, the GAMES 236 box shows how many games before the rent runs out, and the TIME 234 box shows the time left before the rent expires.

DETAILED DESCRIPTION—FIG. 3

Figure 3:
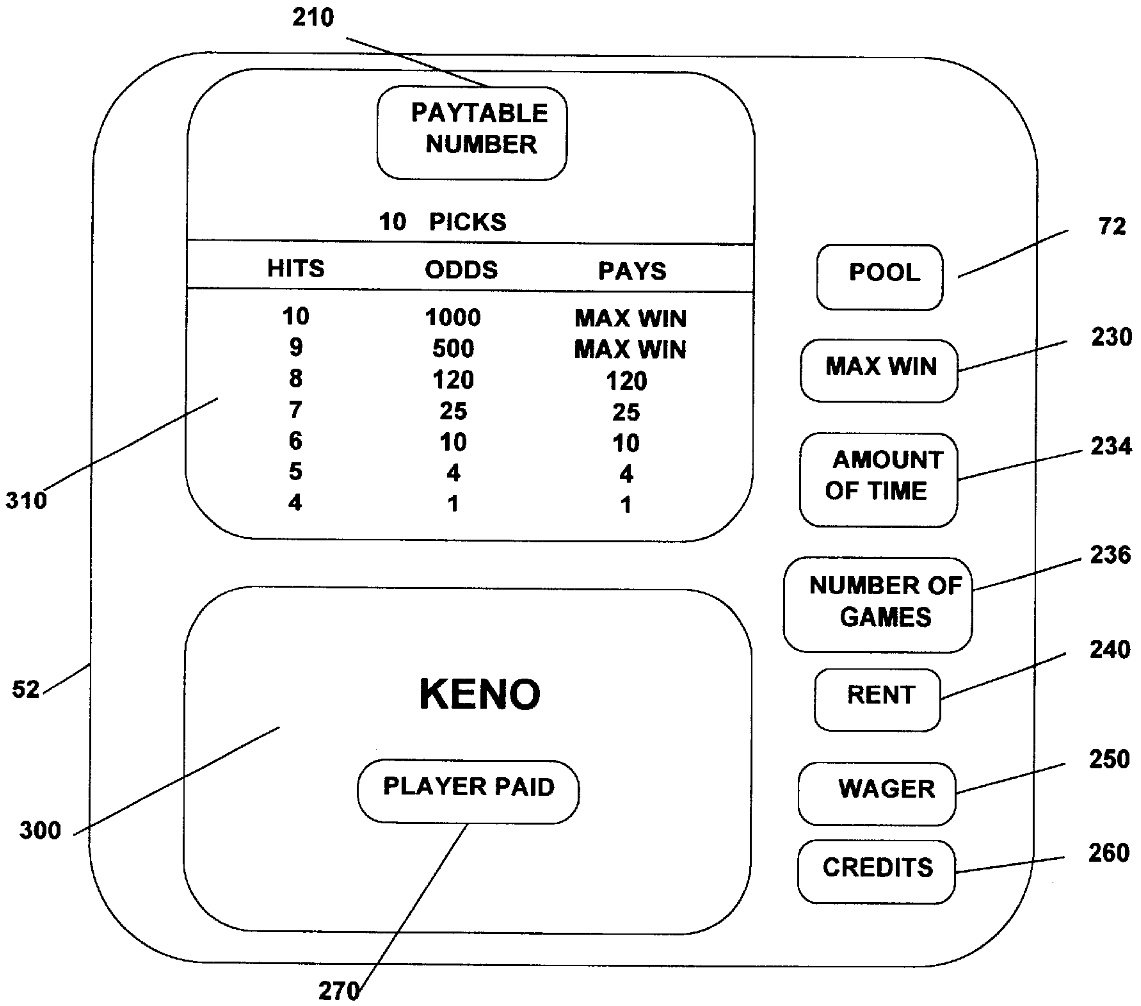
FIG. 3 shows a typical video display of a "real-time Keno game," programmed to operate in accordance with the method of the present invention.

FIG. 3 shows a typical video screen display, of a real-time Keno electronic gaming device programmed to operate in accordance with the method of the present invention.

A video monitor CRT 52 displays the KENO 300 game, the RATE CARD 310 (or paytable), PAYTABLE NUMBER 210, the PLAYER POOL 72, the MAXWIN 230, amount of TIME 234, GAMES 236, RENT 240, WAGER 250, CREDITS 260, and a PLAYER PAID 270 box.

The Keno video game machine (similar to FIG. 1) is a stand-alone machine, as it is not linked to other machines. It can operate as a stand-alone machine for game play, even if linked to a central computer. The central computer could provide management controls and receive statistical information from the game machine. It could compile reported data from thousands of game machines, each operating in game stand-alone mode. Players do not care that the results come entirely from the machine in front of them, or from a central computer somewhere else. The above arrangement, a central computer with many stand-alone game machines, is just one of the possible configurations. Another, is the game machine receiving random numbers from the central computer, while maintaining its own paytable data base. Likewise, the central computer could maintain the paytable data base for many linked machines, while each machine generates its own random numbers.

This machine is very similar to the poker machine described in FIG. 2. A touchscreen could be used to pick numbers. KENO 300 is typically a one WAGER 250 game (not incremental betting via multiple bets). The PLAYER POOL 72 increases after each WAGER 250. The PLAYER POOL 72 fluctuates with player wins or losses. The player pays RENT 240, whether games are won or lost, for play to continue. NUMBER OF GAMES 236 is shown after RENT 240 is paid. Also, the amount of TIME 234 is displayed if that method is used or the time box could show how much time to the next game. Player betting money which is input via the BILL ACCEPTOR 70 increases CREDITS 260. The main difference from FIG. 2 is a rate card, which is a different looking paytable. This example shows a RATE CARD 310 where the player picks ten numbers for play. There exist a multiplicity of RATE CARDS 310, for the game of KENO 300, but the PLAYER POOL 72 concept works the same for each.

FIG. 3 RATE CARD 310 shows a PLAYER POOL 72, not large enough to fund all possible wins for the preset paytable. All hits are not paid their full value according to preset odds. The win payoffs for nine hits out of ten, show a payout lower than the preset 500 odds posted. However, the PLAYER POOL 72 is fully funded for the 8 out of 10 hits.

A skilled player would probably choose another rate card with easier odds, since the Maxwin in this case, limits the top amount. This RATE CARD 310 shows that a MAXWIN 230 system could provide potentially very large, almost unlimited, player pools. A Maxwin pay reduces the pool by the Maxwin payout, leaving the POOL 72 a fraction of its pre-win value.

Multiple linked machines cause the Keno game pool to grow rapidly. The Keno pool would typically be kept separate from other game types, such as Draw Poker. If directed by the system operator, Keno can be combined in an intermediate level pool with other game types, say slots and Bingo. The system operator can dictate that the Keno game pool be divided into many paypots, each having its own preset pay-schedule. Further, each paypot can have an associated zeropot, which builds at the same, or different rate, than the paypot. Zeropots are designed to refill a paypot, having zero or little money left. But the system operator, at any time, can cause the zeropot to empty into its related paypot, or even other authorized pots.

Additionally, the system operator can select the number of sidepots, which are used for special event payouts, such as progressives, very difficult poker hands, extremely large odds, Keno draws, etc. They can also be used to allocate portions of the pool to state agencies, or other legal jurisdictions. Any group that is legally entitled to part of the player pool, can have a sidepot assigned to it. Sidepots are especially advantageous for legally operated lottery games, where government controlled house money (rent) does not have to be entered separately from player pool money. The paytable number 210 identifies different games.

A real time Keno network of linked game machines, benefits from a larger number of players contributing to the pool, with many different pots, and preset pay-schedules. The player has an option to select any one of many paypots to play. The player could choose a different paypot for each new game.

A top-prize percentage of 100%, allows the pool to go to zero when a Maxwin payout occurs. This causes a new zero startup situation, just like the very first startup. This might be appropriate for games with Fixed time intervals, where all players have a Fixed interval of time to enter their bet(s) before each game starts. Many state run Keno games, use Fixed time limits. Our invention, significantly, will let states run Keno games in real time, providing immediate results to the player. A real time, continuous, non-banked Keno system allows the players to make bets, as fast as the Keno device accepts them.

Typically, marked numbers on a player Keno ticket is the input to the system. Random numbers can be immediately drawn to simulate Keno balls just for the one player, against the posted Keno Maxwin paytable. In other words, the player plays against the current player pool only. A win reduces Maxwin in the paytable before other players draw simulated Keno balls for their game. Optionally, players can cancel their current play, or switch paytables, if the Maxwin change exceeds a threshold set by the system operator.

DETAILED DESCRIPTION—FIG. 4

FIG. 4 shows the "System Management Information" with pool information that is supplied for use by a system operator in accordance with our present invention.

FIG. 4 shows typical display pages that a system operator would view. The first management page (400) summarizes all games, highest pools, and their top-prize amounts. The system top-prize listed first, one-million dollars ($1,000,000.00) establishes the upper limit top-prize for any and all games in the system. It overrides all other top-prizes at lower game and paytable levels. Next, each game type is listed, with the largest pool for that game type, with its paytable number.

The second management page (450) performs similar treatment for individual games, such as: poker, keno, slots, bingo, black jack, gin rummy, pai gow, black jack, video craps, roulette, etc. First, this video Draw Poker example, lists a game (G) top-prize of $100,000, upper limit for all pays for that game type. In this example, a payout cannot exceed $100,000, although one paytable (P) might itself have a $550,000 top-prize. Second, the pools' total for all poker games, is listed next.

Several different Draw Poker games are listed. They may be identical in operation with the same preset pay schedules. However, they are given unique paytable numbers 210, since their Maxwins 230, and associated paypots grow independent of the others.

DETAILED DESCRIPTION—FIG. 5

FIG. 5 shows a display of Maxwin amounts the player utilizes, when selecting game on the electronic gaming device of FIG. 1.

Multiple game machines are popular where a player can select the game. Our invention lets the player choose one game type from many, in addition to a paytable choice for that game type.

The Maxwin menu (500) shows that the highest Maxwin is $50,000 for all games, regardless of type.

The highest Maxwin is listed for each game category. The player considers the highest Maxwin when making a game selection, which calls up the menu 550 display.

Menu 550 lists all paytables for a single game type, Draw Poker, with different Maxwin amounts. This simple menu 550 lets the player select the paypot for the next play.

Draw Poker is used in this example menu 550. However, Draw Poker encompasses different games which might include wild cards, or Jokers. All kinds of paytable variations exist for the same game, where flush hand payouts will change depending on the overall pay schedule structure. New identifiers (paytable number 210) are used for each of the Draw Poker games, even if they have identical preset paytable structures. Other typical poker games are Seven Card stud, Five Card Stud, Texas Hold'em, Omaha, and Pai-gow poker.

DETAILED DESCRIPTION—FIG. 6

Figure 6:
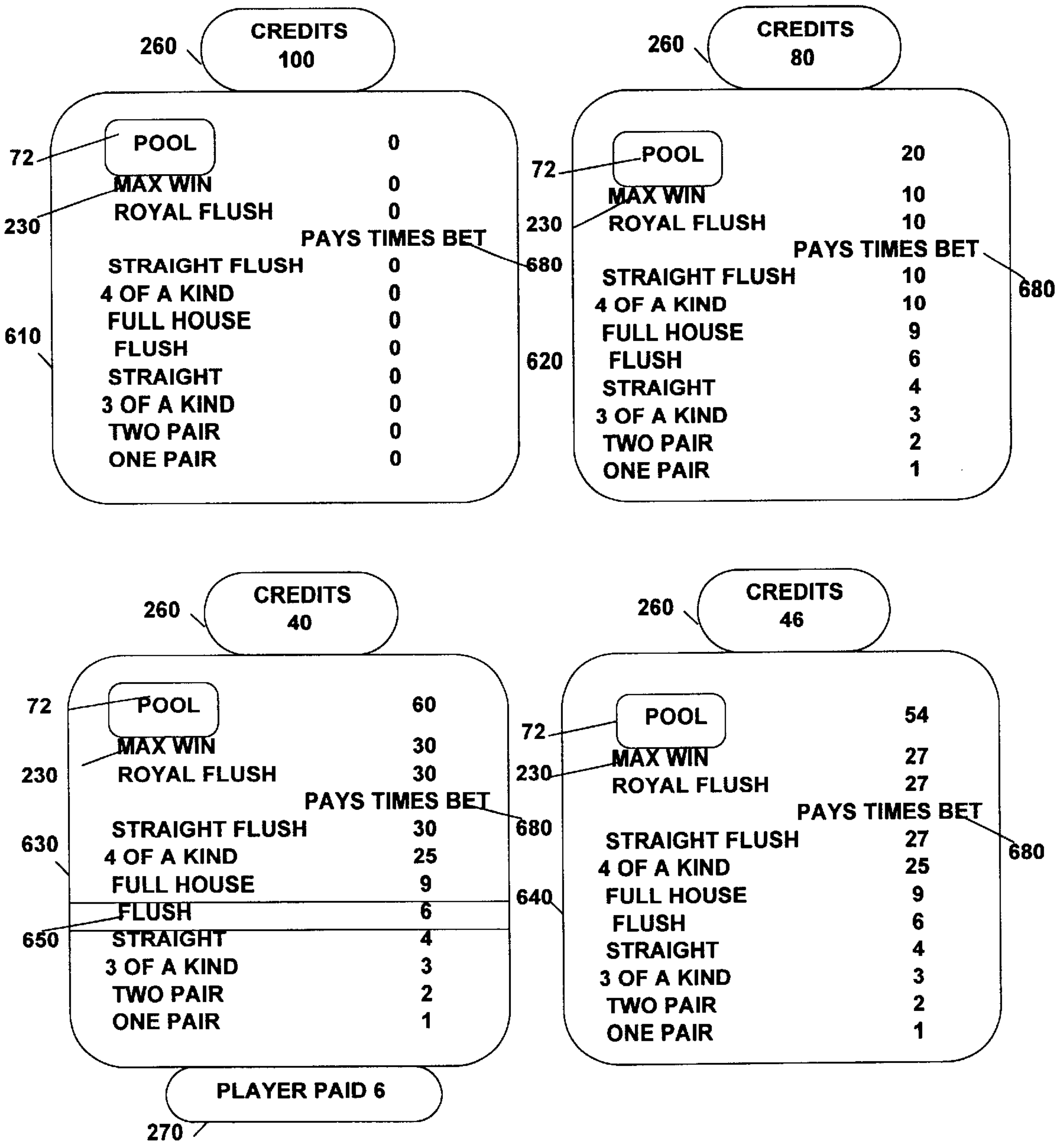
FIG. 6 shows a poker game paytable with four representative "Maxwin paytables" schedules, as the pool changes from zero to 54.

FIG. 6 shows a "Poker Game Paytable" with four "Representative Maxwin Paytable Schedules" as the pool changes from zero to 54 on the game machine of FIG. 1. The paytable Maxwin starts at zero value, but by the fourth display, it grows to a value of 27.

First, Pay Schedule 610, shows the player paid rent (not shown here) and accrued 100 units of CREDITS 260. This startup situation has an empty PLAYER POOL 72. A zero PLAYER POOL 72, means the MAXWIN 230 will be zero. All payouts will all be zero, since there isn't any pool money. No money has yet been bet or wagered.

Second 620 pay-schedule, the player has bet 20 credits leaving 80 CREDITS 260. This changed the Maxwin, Royal Flush and Straight Flush payouts to a posted prize of 10 (or Maxwin). The other paylines display their preset values. But, the 20 credits bet are now in the PLAYER POOL 72. This particular paypot has a top-prize percentage of 50%, and MAXWIN 230 is one-half of the (paypot) POOL 72. The Royal Flush, the straight flush, and 4 of a kind will pay just 10. The other paylines receive normal payouts, since Maxwin exceeds their preset pay-schedule.

The pay times the bet 680 column, allows a pay-schedule to show a large range of bets, say from 1 to 100. Otherwise, one hundred columns, would be required. The payline 650 shows the appropriate payout for a bet of 1. Normal odds for a flush payline for a 10-bet payline is 60 (6 multiplied by 10). However, in this case since the Maxwin is only 30, the flush would only pay 30. The player would not make a 10-bet play. Paylines will show Maxwin unless the multiplied value is less than Maxwin. The paytable changes as larger bets are made, sometimes more Maxwins appear each time the bet increases. If the paytable has mostly Maxwins showing, the skilled player will go for easier, more sure wins with the best odds (instead of a Royal Flush). Almost certainly, the bet amount should not be run up if the payout doesn't change from the Maxwin. Skilled players use different strategies, when the Maxwin paytable fluctuates, in comparison with the more standard, preset paytable for Las Vegas banked games.

Third 630 pay-schedule, the player was down to 40 credits before winning 6 credits on a flush. The lost 60 credits, went to the PLAYER POOL 72. The MAXWIN 230, the Royal flush, and the straight flush paylines are all now 30. A four-of-a-kind hand receives a normal payout of 25, since the preset pay is good to 30 units.

The player wins with a flush and is paid 6, shown in PLAYER PAID 270 box. If the player doesn't COLLECT 56, the 6 units go into the CREDITS 260. If the player collects, the CREDITS 260 go to zero, and the PLAYER PAID 270, would show 46.

The player win causes the PLAYER POOL 72 to drop to 54. The MAXWIN 230 drops to one-half of 54, or 27, as does the Royal Flush and straight flush. Fourth 640 pay-schedule 640, shows the Maxwin paytable, at the start of the next game.

DETAILED DESCRIPTION—FIG. 7

Figure 7:
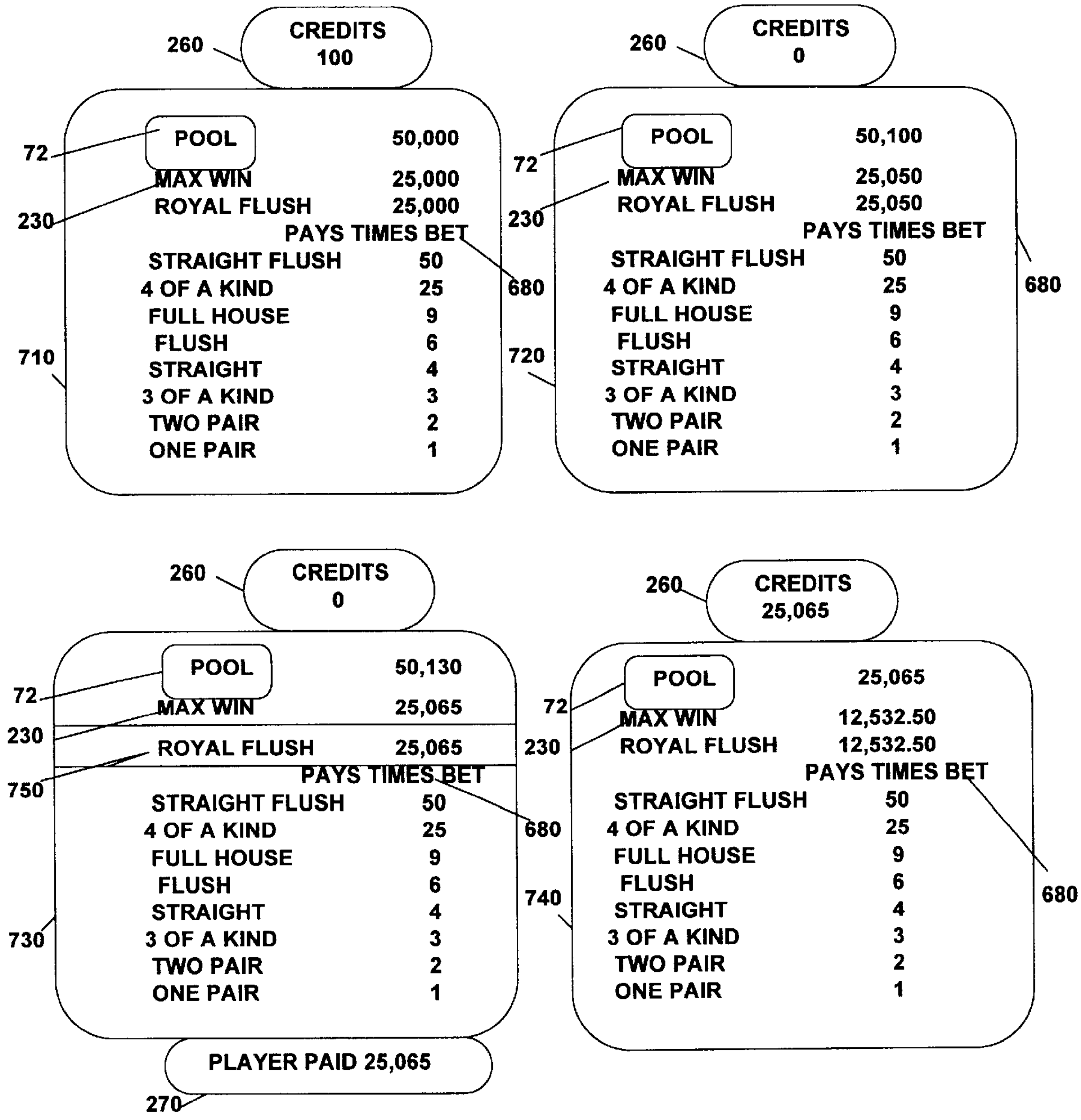
FIG. 7 shows four representative "Maxwin payschedules" showing how the player's pool fluctuates during a Maxwin event.

FIG. 7 shows one Draw poker paytable with four representative Maxwin pay-schedules illustrating what happens when a Maxwin occurs on the game machine of FIG. 1.

First 710 Pay Schedule, shows 100 CREDITS 260 and the PLAYER POOL 72 is 50,000, and Maxwin is 25,000 (top-prize is 50%). The Royal flush is also at the Maxwin 25,000 value. The player pool is large and other paylines appear at preset values.

Second 720 Pay Schedule, indicates the player BET 100 CREDITS 260 with no win. It is impossible, to know if the player lost this money, during one or many games. The PLAYER POOL 72 has now increased 100 to 50,100. The MAXWIN 230 portion is one-half or 25,050. Preset payline amounts are shown, except for the Royal Flush, which is always set at Maxwin.

Third 730 pay-schedule, shows the player bet 30 more CREDITS 260 before winning with a Royal Flush 750 hand. Thirty credits more are in the PLAYER POOL 72, bringing the total to 50,130. The MAXWIN 230 is half (50% top-prize), and the ROYAL FLUSH 750 pays Maxwin 26,065 to the player (PLAYER PAID 270). Other paylines display their preset values.

The fourth 740 pay-schedule, shows that the player now has 25,065 CREDITS 260 in SCHEDULE 740. The PLAYER POOL 72 drops to 25,065. The Maxwin and Royal Flush drop to one-half, or 12,532.50, and the paytable is shown at the start of the next game. This paytable also allows for larger bets with the column PAYS TIMES BET 680.

DETAILED DESCRIPTION—FIG. 8

Figure 8:
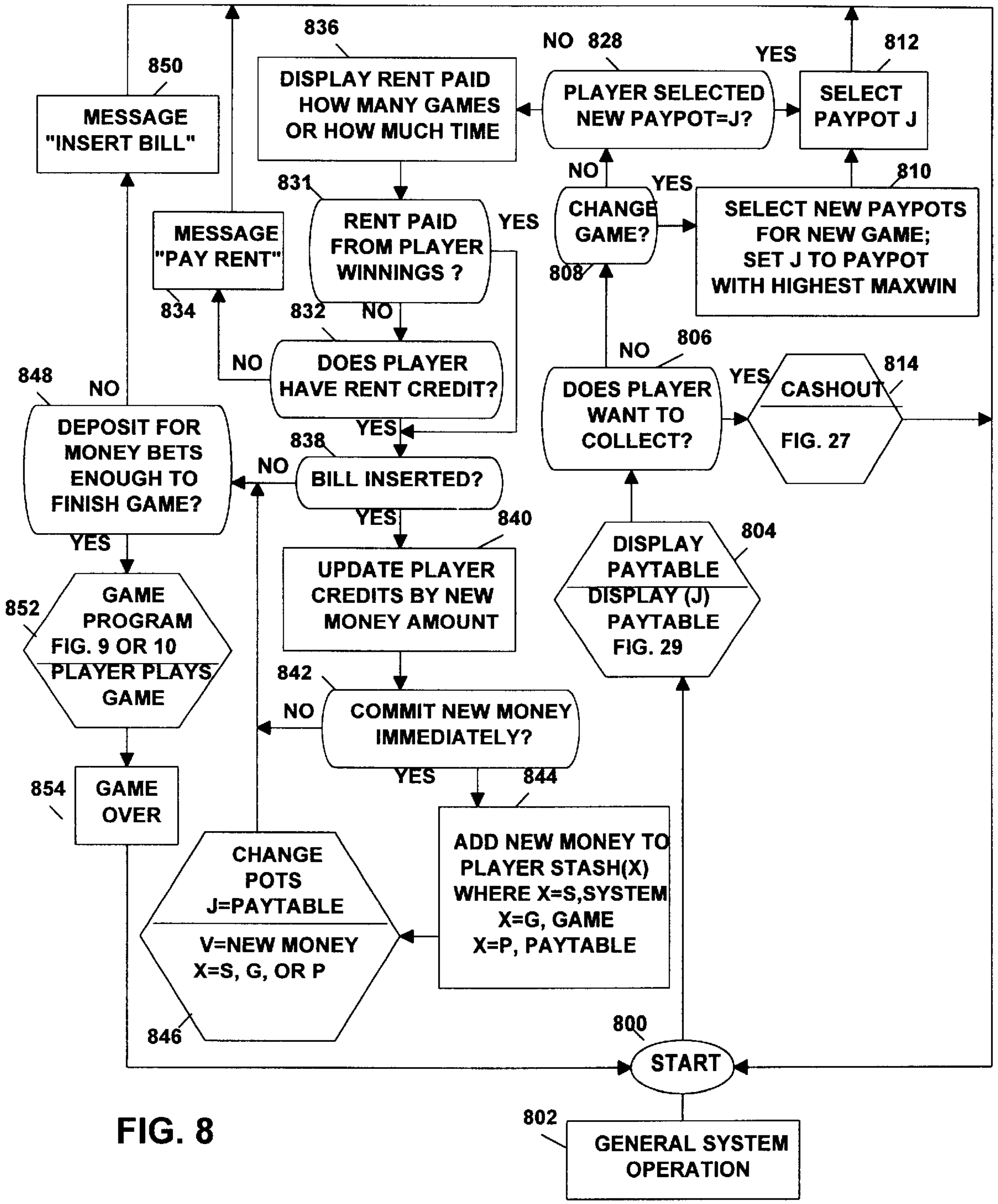
FIG. 8 is a flow chart which illustrates the method for the "General System Operations" performed by a central processor, in the game machine of FIG. 1.

FIG. 8 shows a flow chart which illustrates a typical set of logical operations for "General System Operations" controlling the game machine of FIG. 1, in accordance with our present invention. The sequence is presented for one player interacting with the system, and playing the game machine. The ensuing "General System Operation" description refers to the major steps of the flow chart, cited parenthetically.

The "General System Operation" flow begins at step 800, with a notation in box 802, identifying the routine. Step 804 calls subroutine "Display Paytable," FIG. 29 to display the (J) paytable for the current game and paytable paypot selected by the player. The constant presentation of the paytable (paypot) during each cycle insures that the player can catch the dynamic changes occurring in the Maxwin, allowing the player to change games or paytables, as needed.

Step 806, asks if player wants to collect credits. The player may have credits accumulated but might want to quit if the rent money has been used up. If no, go to step 808.

Figure 27:
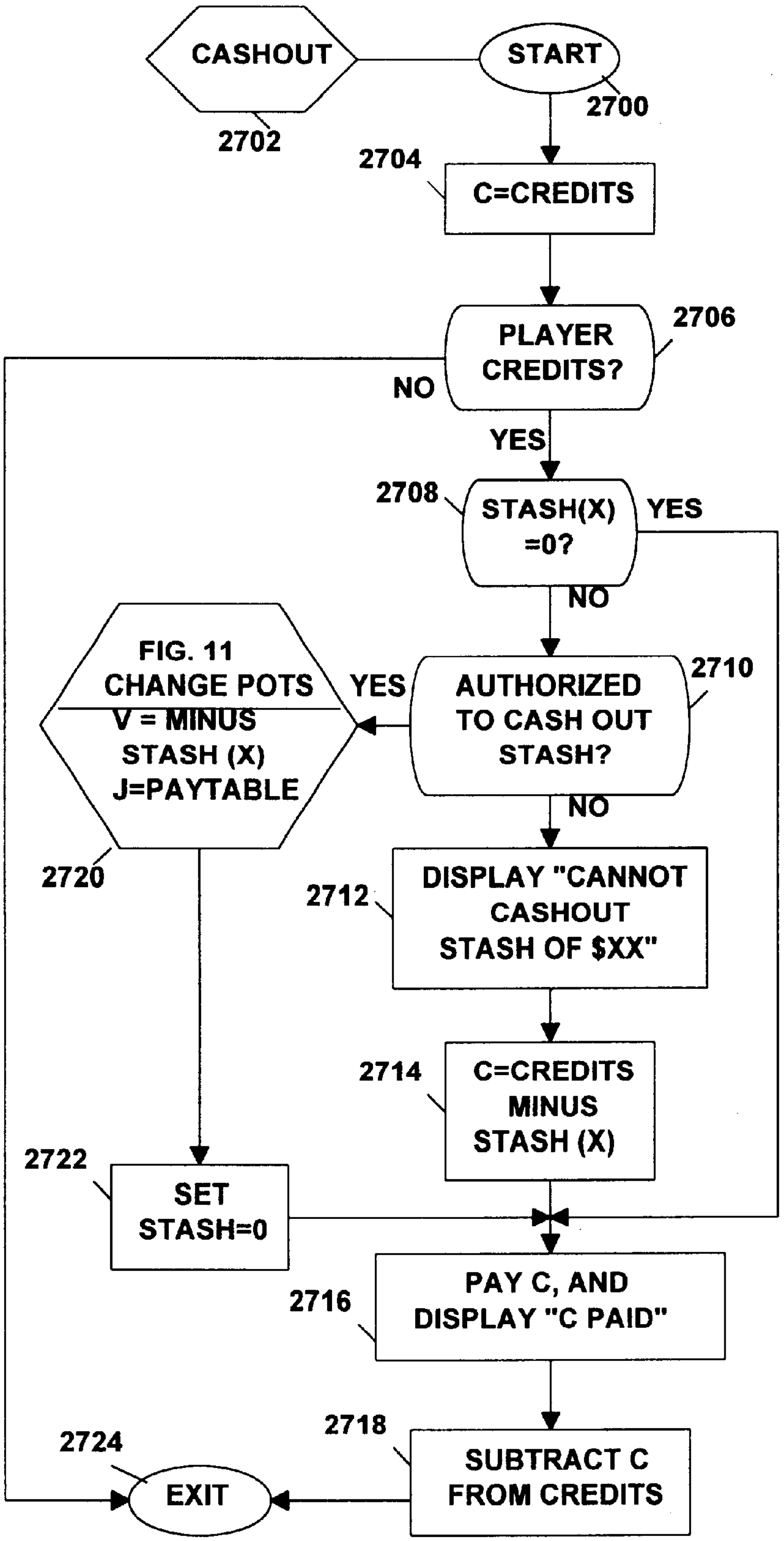
FIG. 27 is a flow chart subroutine showing what happens when a "cashout" occurs according to FIG. 1 of the present invention.

Step 814 calls subroutine "Cashout" at FIG. 27. Then proceed back to the start, step 800.

Step 808 asks if the player wants a different game? (Change game?) If no, go to step 828.

Step 810, selects the paypot group for the game type, and sets (J) to the paytable number with the largest Maxwin. Proceed to step 812.

Step 812 selects the paypot. Then proceeds back to step 800.

Step 828 asks if the player selected a different paypot J? If yes, Go to step 812, described above.

Step 836 displays the rent paid, and what it purchased: how many games, or how much time.

For rent, the player gets so many game plays or a certain amount of play time. Coins or tokens are inserted into COIN INLET 54 to pay rent. The display for games remaining or how much time left is updated constantly. Where legal, both rent and player pool money can be inserted into the same input device, to save money-handling steps during the play of the game, and afterwards in the cash cages.

Various credit/debit cards, player tracking cards, or coupons could pay both rent and players pool money. The computer would then maintain internal accounts to separate rent and players pool money. These monies are already displayed separately on a video screen and/or LED signs.

In the preferred embodiment, rent must be paid before the game can begin. However, other pay schemes may be used, such as paying rent as a percentage of player winnings (or of the bet).

Figure 14:
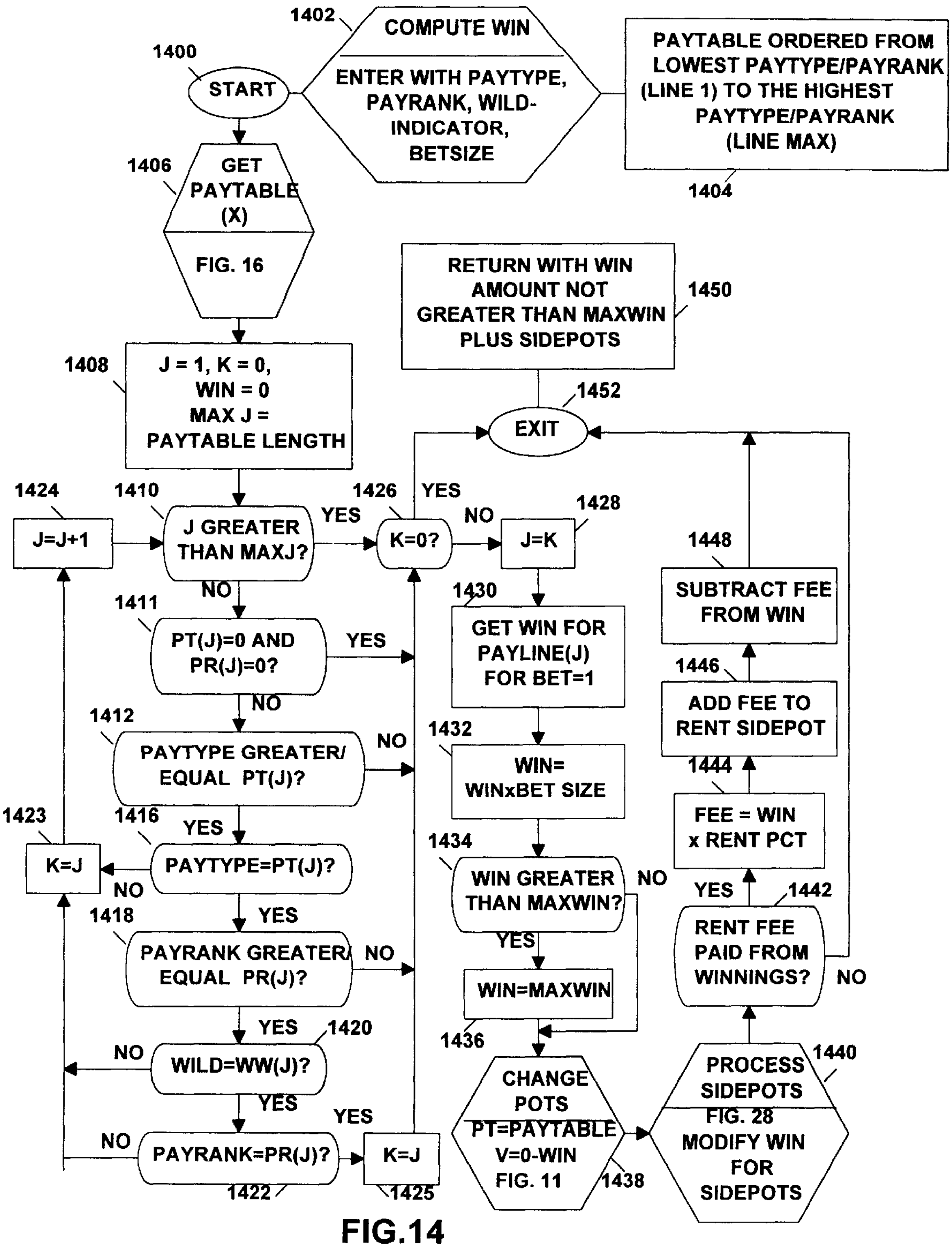
FIG. 14 is a flow chart of a typical subroutine that "Computes Wins" in an amount not to exceed a Maxwin value, in accordance with our present invention.

Step 831 covers this option, by asking, "Rent paid from player winnings?" If yes, continue to step 838; the rent will be collected later (FIG. 14 step 1442).

Step 832 asks if the player has paid rent? If yes, proceed to step 838.

Step 834 displays message "Pay Rent" on the screen to prompt the player to enter rent money. Proceed back to start, step 800.

Step 838 asks if a bill has been inserted? If none, go to step 848.

Step 840, after a bill was inserted, displays new player credits after they have been updated by the new money amount. All credits always belong to the player who can collect them anytime. When money is inserted, the player's credits display changes, and the current paytable is subsequently updated at step 804. The paytable is either visible on screen at all times or a paytable drops down at, the players request.

Step 842 asks if the new player money just entered, should be immediately committed to the player pool? If no, go to step 848.

Step 844 adds the new money to the player stash(x) variable, where the player's committed money is kept track of. As the player bets, this stash(x) variable will be reduced by the size of the bet. When stash(x) goes to zero, or less, then the committed money is consumed. Until consumed, however, player bets will not increase the player pool. Once stash (X) is zero, bets are added to the pool again.

This immediate commitment provides for a faster buildup of the player pool, especially when the pool is first started. A potential problem exists that the committed money might become larger than the pool itself. The player might not be allowed to cash out all accumulated credits when this happens. However, if the system operator selects the stash ticket option, uncashed stash credits are held in escrow for the player to use upon return. This keeps the player's good will and assures another visit to the casino, which always benefits the house.

Step 846 calls subroutine "Change Pots" to increase the pool by the new committed money. The pool, Maxwin, and paytables are updated to reflect new money, that has not yet been bet, but has just been committed to stash (X). The interesting thing to consider, is that players are playing for money that has not yet been bet. This has many ramifications. When the player attempts to cashout, the player pool might not be able to cover player credits.

Step 848 (entered from steps 838, 842, and 846) asks if there are enough credits to complete the selected game at the current bet size. The player chooses the wager, by repeatedly pressing BET 1 button 58 or by pressing MAX BET button 60 to the top wager limit. Once selected, there must be enough credits to cover the total expected bet, before play proceeds. If enough credits, go to step 852.

Step 850 flashes the message, "Insert Bill". The message will continue until the player inserts more money, or the bet is lowered. After the message is displayed, go back to the start (step 800).

Figure 9:
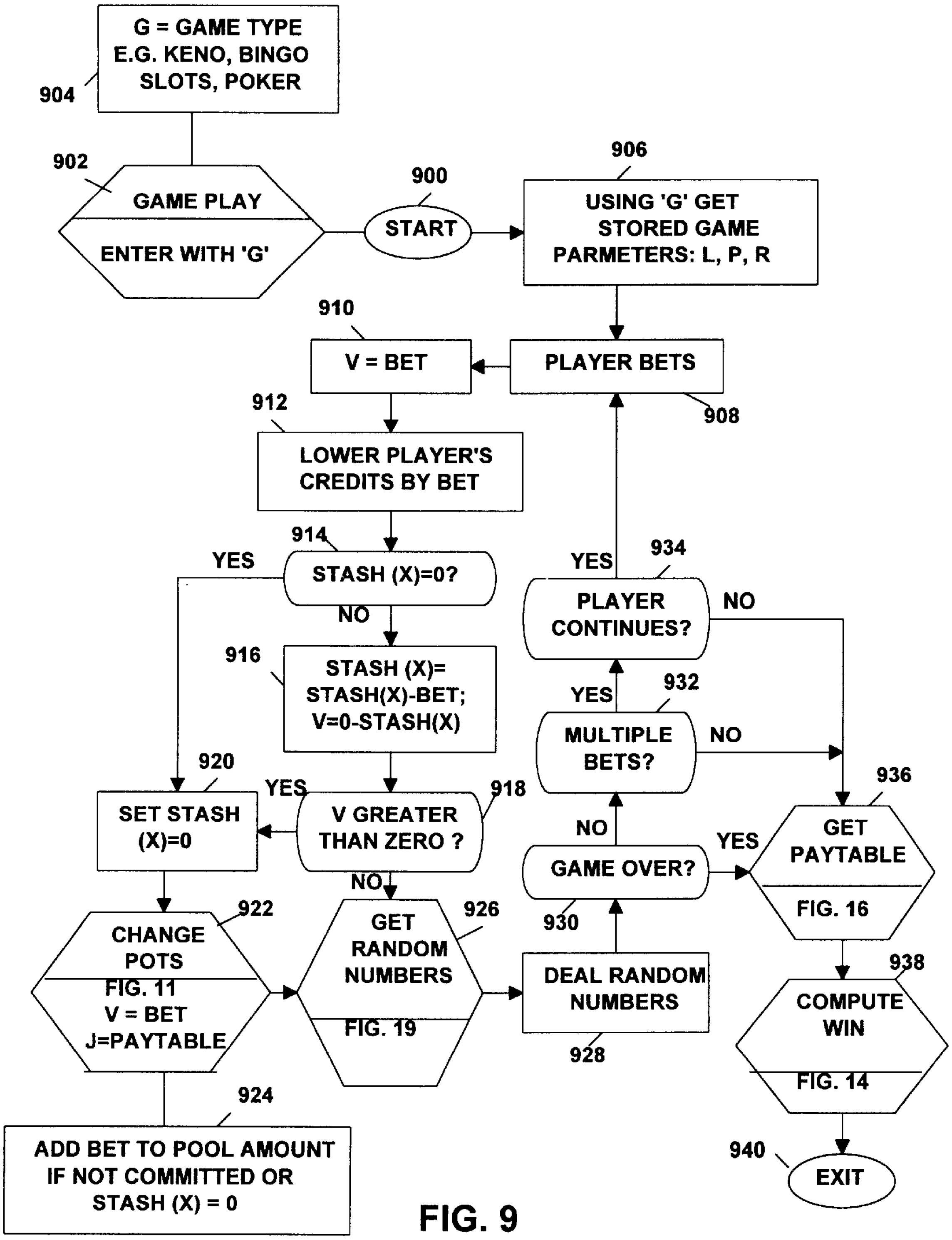
FIG. 9 is a flow chart for a typical game during a bet and win cycle, which uses the Maxwin paytable in accordance with our present invention.

Step 852 (entered from step 848) calls a specific game program to take over and the player plays a game to completion. Two typical game routines are shown in FIG. 9 "Game Play," and FIG. 10 "Keno". Once the game is played, proceed to step 854 (game over).

Step 854 returns to the start at step 800, where another game is played, after choosing the desired game and paytable.

DETAILED DESCRIPTION—FIG. 9

FIG. 9 is a flow chart for a typical game during a bet and win cycle, which uses a Maxwin paytable in accordance with our present invention. It illustrates that the game can operate as if it is always in the stand-alone mode, although linked with other game machines. The interface with the system hides machine configurations from the games. The games ask for and receive random numbers and cannot tell where they come from.

Routine "Game Play", step 900, starts the sequence of logical operations. Step 902 identifies the game subroutine.

Step 904 indicates this general routine is for a game type, identified as 'G', including: poker, keno, slots, bingo, or other viable games.

Step 906 uses 'G' (Game ID) to get stored game parameters: 'L' (Link mode), 'P' (Paytable mode) and 'R' (Random number mode). Each individual game interacts with the system in its own way, based on the settings of these parameters. One might operate a total stand-alone machine with no communications with any type of machines. Other games are totally interactive with other machines at every step (including having a central computer provide random numbers, determining wins, and otherwise controlling every phase).

Figure 19:
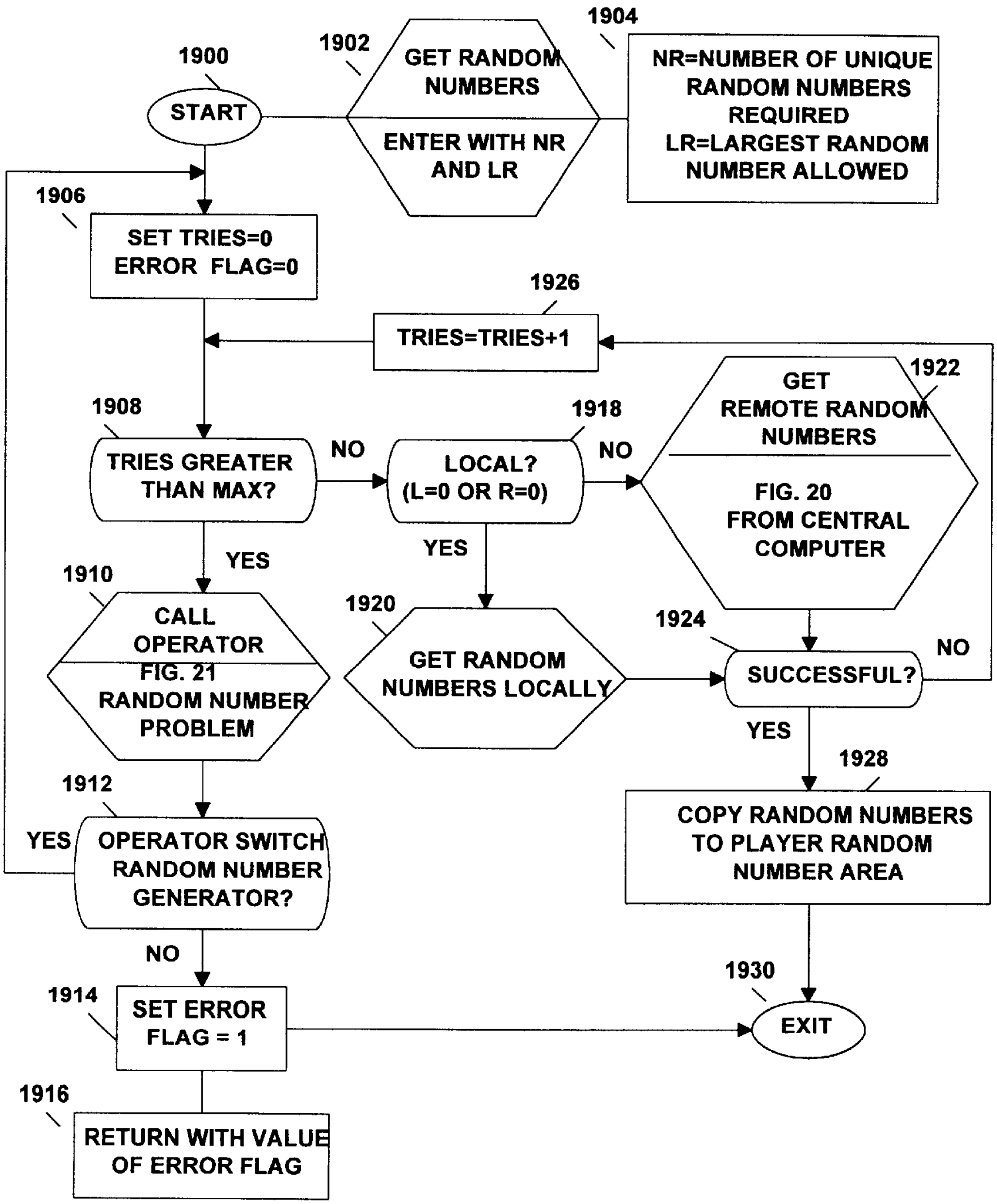
FIG. 19 is a flow chart subroutine to "Get Random Numbers" locally or remotely from a central computer in accordance with our present invention.

The parameters L, P, and R are not obvious here, but they come into play in called subroutines, "Get Random Numbers" (step 926) and FIG. 19), "Change Pots" (step 922, FIG. 11), "Get Paytable" (step 936, FIG. 16), and "Compute Win" (step 938, FIG. 14).

Step 908, the player commits a bet, thereby starting a round of play.

Step 910 sets the variable V equal to the bet. If rent is not paid, as a percentage of the bet, go to step 912. Otherwise, the bet is disallowed, if credits cannot pay for the total of rent, plus the bet (if this happens, return to step 908 after a message to the player). Rent is computed for the new player bet, and subtracted from the credits.

Step 912 subtracts the bet from player credits. The player pool will be subsequently increased by this bet, assuming the credits were previously not committed. (This means the credits were not previously used to increase the pool.)

Step 914 asks if the bet money was not committed earlier (stash (X) equals 0)? If yes, go to step 920. Otherwise, money that is bet has previously increased the player pool, when the player entered this money.

Step 916 reduces stash (X) by the bet size, using equation: "stash (X)=stash (X)—BET". Then, variable V is set to the negative value of stash (X), using equation "V=0-stash (X)".

Step 918 asks if V greater than zero? If no, proceed to step 926. A value of V greater than zero, means the committed money, stash (X), has been used up. In fact, the amount of positive V credits is what was bet after the stash (X) went to zero.

Step 920 sets stash (X) equal to zero.

Step 922 calls subroutine "Change Pots" (FIG. 11) to change the money committed into the player pool. Paypot (J) is changed by V, the bet amount, less be any remaining stash (X) amounts. Any money amounts in stash (X), were committed to the player pool, previously. So, we don't want to add it to the pool a second time. Paypot (J) is changed, by the amount 'V' equals bet and 'J' equals Paytable (P).

Step 926 (entered from steps 918 and 922) calls routine "Get Random Numbers" (FIG. 19) to acquire N unique numbers.

Step 928 uses the random numbers as playing cards, Keno balls, slot symbols, or other such symbols.

Step 930 asks if the game is over? If yes, go to step 936.

Step 932 asks if there are multiple bets. If no, go to step 936.

Step 934 asks if the player continues the game? If yes, go back to step 908 and let the player make another bet.

Figure 16:
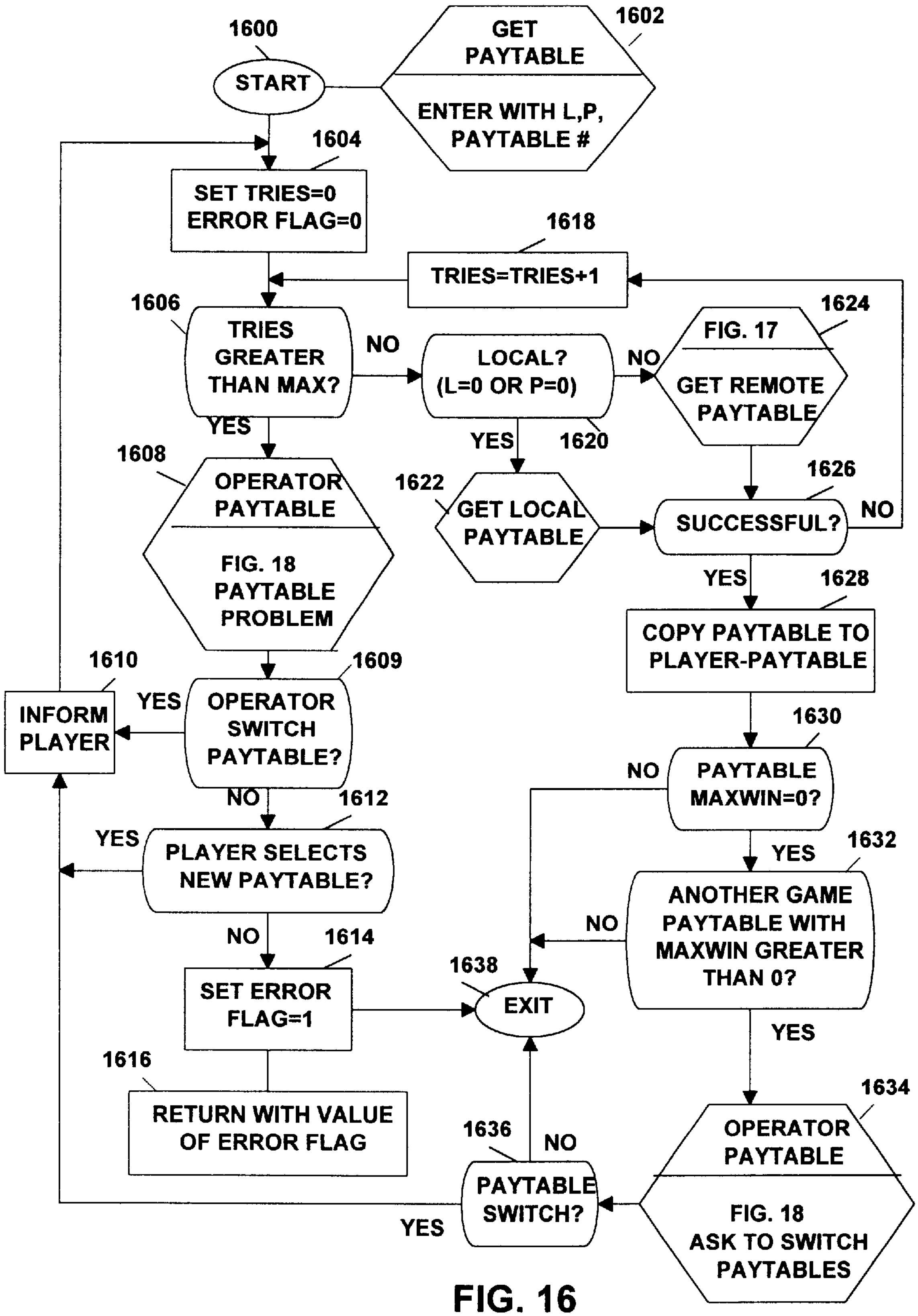
FIG. 16 is a flow chart of a subroutine to "Get Paytable" locally or remotely from a central computer in accordance with our present invention.

Step 936 calls subroutine "Get Paytable", FIG. 16, for player's paytable.

Step 938 calls subroutine, "Compute Win" (FIG. 14).

Step 940, exits the routine.

DETAILED DESCRIPTION—FIG. 16

Figure 10:
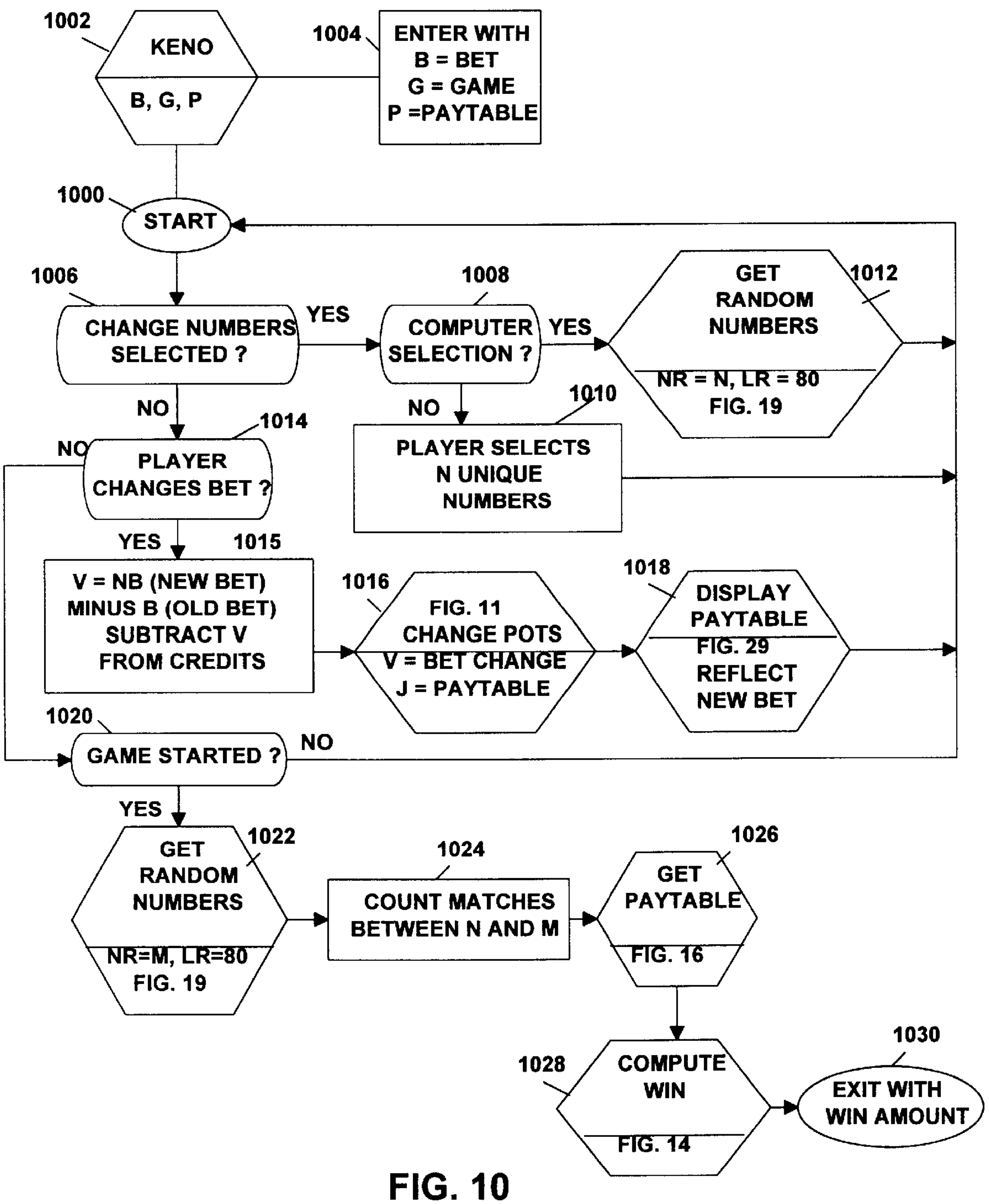
FIG. 10 is a flow chart of a "real-time Keno" system, illustrating typical game play, in accordance with our present invention.

FIG. 10 is a flow chart of a real time Keno game system in accordance with our present invention. It provides immediate win/loss results independent of any other players, or their actions. It does not require fixed intervals of time to allow players to get ready for the game start.

The Keno game starts at step 1000 after entry at step 1002. The Keno game uses parameters B, G, and P. Step 1004 explains the parameters with B=Bet, G=Game, and P=Paypot Number (Paytable interchangeable with paypot). Keno is simple. It is a game where a player decides how many numbers, and which numbers to play.

At step 1006, the CPU asks if the player wants to change the number selections. If no, go to step 1014.

Step 1008 asks if the new numbers are to be selected by the computer. If no, the player personally selects N unique numbers at step 1010, and goes back to the start (step 1000).

Step 1012 calls routine "Get Random Numbers", FIG. 19, and the computer selects N unique numbers. The routine requires parameters: number of random numbers needed (NR equal to N); and the largest random number allowed (LR equal to 80). After the N random numbers are selected, proceed back to the start, (step 1000).

Step 1014 (entered from step 1006) asks if the player want to change his bet? If no, proceed to step 1020.

Step 1015, which sets variable V to value of new bet, minus old bet. Subtract V from credits.

Figure 11:
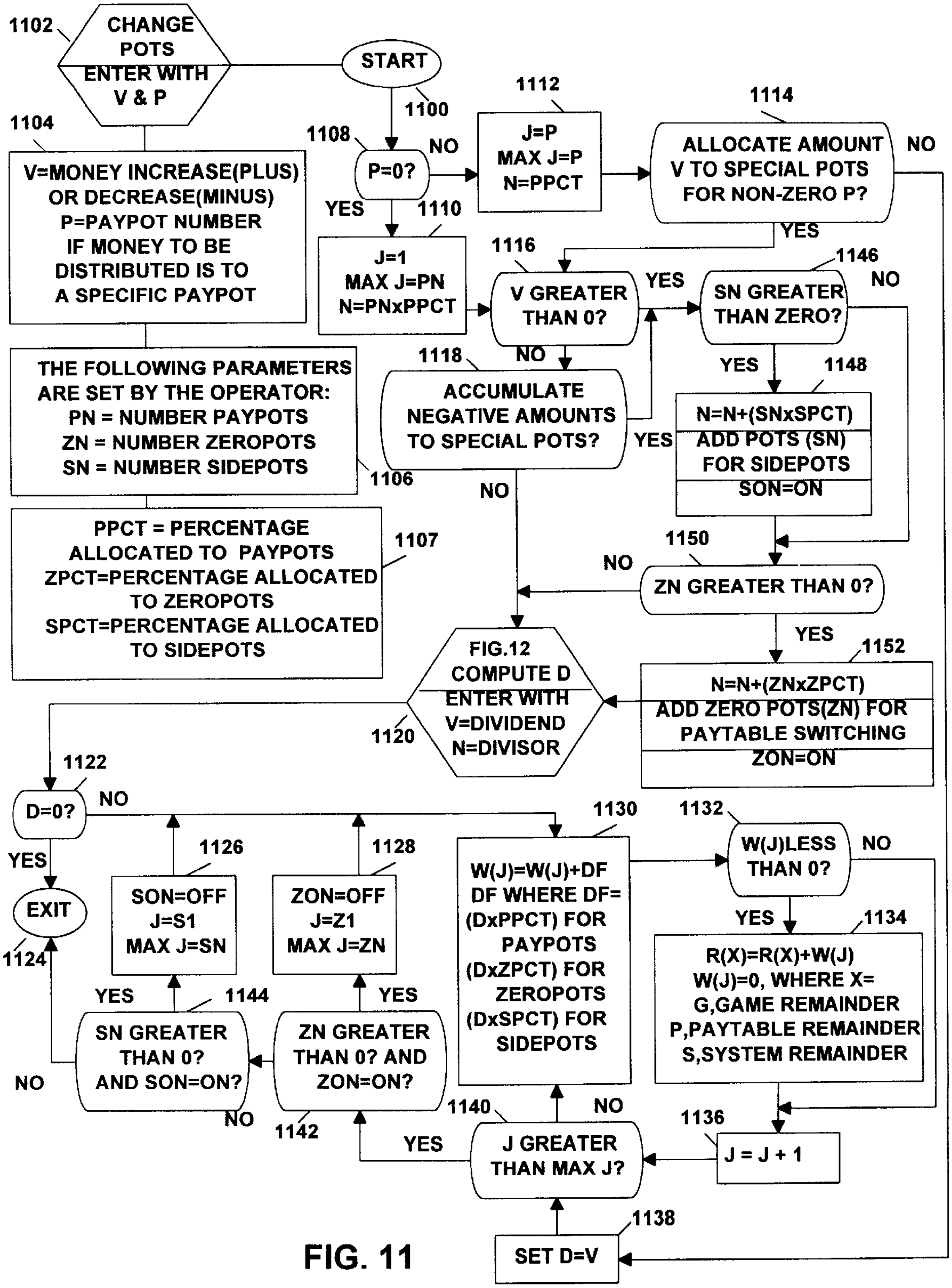
FIG. 11 is a flow chart of a subroutine which "Changes Pots" with varying Maxwins as player pools increase or decrease in accordance with our present invention.

Step 1016, calls "Change Pots", FIG. 11, routine with the newly computed V. This reduces the pool when the new bet is less than the old bet. The Old Bet (B), was committed before the call to the Keno routine, from FIG. 8, step 852. If the new bet is lower, the pool must be reduced, and vice versa.

Step 1018, calls a subroutine to display the paytable after the new bet, and goes back to start (step 1000).

Step 1020 (entered from step 1014) asks if the game has started? If not, proceed back to start (step 1000).

Step 1022, which calls routine "Get Random Numbers" (FIG. 19) with parameters: number of random numbers (NR=M); and the largest number allowed (LR=80).

Step 1024 counts the matches between N and M.

Step 1026 calls subroutine, "Get Paytable", FIG. 16, to receive a copy of the paytable.

Step 1028 call routine "Compute Win", FIG. 14, to compute the win.

Step 1030 exits with the win amount, if any.

DETAILED DESCRIPTION—FIG. 11

FIG. 11 is a flow of a subroutine "Changes Pots" to increase and decrease player pools, and allocate money among active pots in accordance with the present invention.

Subroutine "Change Pots" starts at Step 1100, with commentary boxes (step 1104, 1106 and 1107). Step 1102 specifies that this routine must be entered with variables V and P.

Step 1104 explains variable V is the change in money, that P is a specific (paypot is interchangeable with paytable) paytable number. If P is not a zero, money is distributed only to that specific paytable, and no others, unless there are overrides (set by system operator).

Step 1106 further explains the following parameters are set to control money pots by system operator. PN=active number of paypots; ZN=number of active zeropots, which are used to fill the paypots when they go to zero value; SN=number of active sidepots, used for special bonuses, jackpots, or progressives.

At step 1107, the system operator controls the percentage of money going to each of the pot types with the parameters: SPCT=Percentage going to sidepots; PPCT=Percentage going to paypots; and ZPCT=Percentage going to zeropots. The percentage parameters, such as SPCT, are generalized here to make the discussion easier. In actual practice, each individual pot of any type, has its own individual percentage figure, labeled as IPCT for ease of reference. When steps 1110, 1112, 1148, 1150 and 1130 state the use of PPCT, ZPCT, or SPCT, they actually used individualized IPCT prespecified for each individual pot.

Step 1108 asks if P=0? If no, go to step 1112.

Step 1110 sets variables J=1, Max J=PN, and N=PN×PPCT. Set N to number of paypots (PN) times the percentage for paypot allocation (PPCT). The expression "PN×PPCT" represents the summation of all paypot factors (one denoted by expression ("PN7×IPCT7"). Then proceed to step 1116.

Step 1112, sets variables: J=P, Max J=P and N=PPCT. This establishes the range of paypots as only one, since "N=1×PPCT".

Step 1114, asks if V is to be allocated to special pots for non-zero P (That is, allocate money to zeropots and sidepots?) If no, go to step 1138.

Step 1116 (entered from steps 1110 and 1114) asks if the change of money is positive (V is greater than 0?) If yes, go to step 1146.

Step 1118 asks if system operator authorized negative amounts to be cumulated in special pots? If yes, go to step 1146.

Step 1120 (entered from steps 1118, 1150 and 1152) calls subroutine, "Compute D (FIG. 12)", which enters with parameters: V=Dividend, and N=Divisor. The resulting D (total distribution factor) is the base amount to be allocated in some ratio to the various pots using the IPCT factor.

Step 1122, asks if there is no money to allocate (D=0?) If yes, proceed to the exit, step 1124. If no, continue to step 1130, where D is distributed, as discussed later.

Step 1138 (entered from step 1114) sets D to V, since all money goes to one pot only. No computations were necessary for D since only one paytable is involved.

Step 1140, asks if J is greater than Max J. If yes, go to step 1142, discussed later. If no, go to step 1130, discussed below.

Step 1146 (entered from steps 1116 and step 1118) asks if there are any sidepots (SN is greater than zero?) If no, go to step 1150.

Step 1148 computes the numbers of sidepots (SN) times the percentage for sidepot allocation (SPCT), and adds the product to variable N, it being the value to divide with in "Compute D" routine. Also, turn variable SON to ON state, indicating there are sidepots to consider. The expression "SN×SPCT" represents the summation of all side pot amounts, (one typical expression "S1×IPCT 1").

Step 1150 asks if there are any zeropots (ZN is greater than 0?) If no, proceed to step 1120.

Step 1152 computes active number of zeropots (ZN) times the percentage for zeropot allocation (ZPCT), and adds the product to variable N, it being the value of the total distribution factor (used as the divisor in determining D later).

The accumulated zeropot amount will be fed to the associated paypot when emptied. Also, turn ZON to ON state, indicating there are zeropots to consider. Again, the expression "ZN×ZPCT" represents the summation of all active zeropot percentage amounts (a typical one might be "Z3×IPCT 3"). Then proceed to step 1120.

Step 1130 (entered from steps 1122, 1126, 1128, and 1140) takes the percentage distribution factor of the newly computed variable D, for specific pots (DF). The equation "W (J)=W(J)+DF" accomplishes this. W(J) is the Maxwin amount for paypot (J). But, it represents something similar, but different, for sidepots. Remember that the expressions for computing DF are generalized, where the individual IPCT pot percentage. are actually used, such as "DF=Dx IPCT 89".

Step 1132 asks if a player win caused W (J) to go negative (W(J) less than 0?) If no, proceed to step 1136.

If yes, proceed to step 1134, which adds the negative W(J) to the remainder accumulator R(X) for that pot. This R(X) value is ultimately distributed to W(J) after it becomes sufficiently large and positive. Then W(J) is set to a zero value.

Step 1134 accomplishes this with two equations: R(X)=R(X)+W (J), and (J)=0. The J variable points to a specific pot (J). X is equal to P(=J) for a given paytable, when the remainder accumulates at the paytable level. When variable X is set to a specific X=G, game number, then use the remainder accumulator at the game level, R(G). If the remainder accumulates at the system level, X will point to the system remainder accumulator, R(S).

Step 1136 adds one to the variable J with the equation "J=J+1".

Step 1140 (entered from steps 1136 and 1138) asks if J is greater than max J? If no, proceed back to step 1130, and go through the same equations (step 1130 through step 1134) but with a new J value. If yes, proceed to step 1142, after all pots for the current cycle have been processed.

Step 1142 (entered from step 1140) asks if there are any active zeropots (ZN greater than 0?), and if ZON is in the ON state? If no, proceed to step 1144. If yes, proceed to step 1128.

Step 1128, sets ZON to the OFF state, so routine won't come again through here for the current call. Also, sets J=Z1 (1st zeropot entry); and sets Max J=ZN (last zeropot entry).

Then, proceed to step 1130, and go through the same equations outlined above, through step 1142, for Z1 through ZN. When the test fails at step 1140 come through step 1142, on the way to step 1144.

Step 1144 (entered from step 1142), asks if there are active sidepots (SN) and it if SON is in the On state. If no, proceed to step 1124, the exit. If yes, proceed to step 1126.

Step 1126 sets SON to the OFF state, so routine won't come again through here during the present call. Also, set J=S1 (1st sidepot entry), and set Max J=SN (last sidepot entry). Then, proceed back to step 1130 and go through the same equations (through step 1144) outlined above, for S1 through SN. Step 1124 exits the routine.

DETAILED DESCRIPTION—FIG. 12

Figure 12:
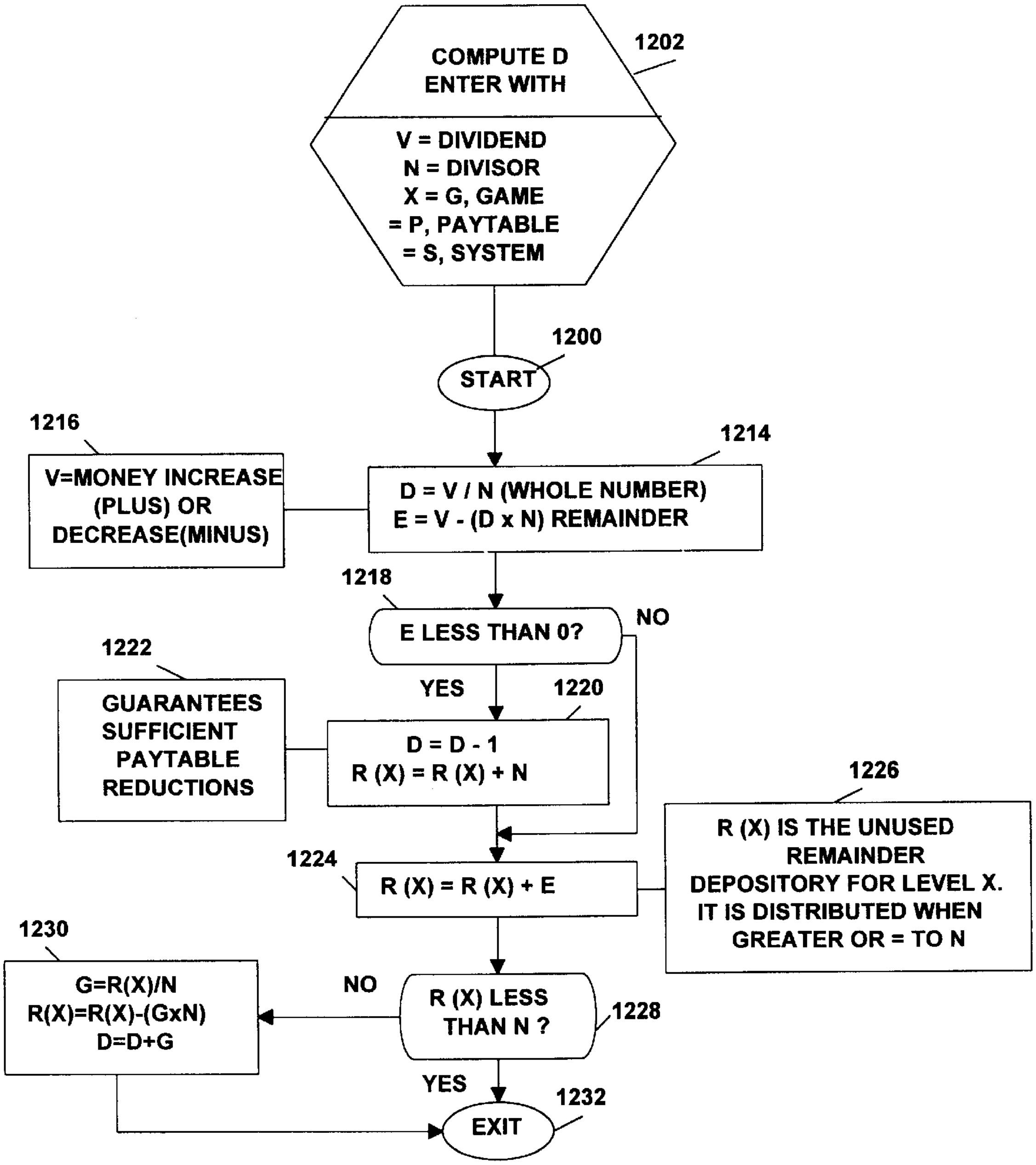
FIG. 12 is a flow chart of a typical subroutine that computes a "Distribution Factor", which is added or subtracted from pots, in accordance with our present invention.

FIG. 12 is a flow chart of a typical subroutine that computes a "Distribution Factor" which is added or subtracted from pots in accordance with our present invention. FIG. 12 presents a subroutine called in the FIG. 11 description. A routine similar to this, must insure that all monies are accounted for so that no banking violations or legal objections arise with our player pool invention. Subroutine "Compute D", starts at step 1200, with step 1202, which states that parameters N and V compute a pot distribution value, D. To compute D, it is necessary to have the following parameters: V=Dividend, N=Divisor, X=remainder level, where X is set to either the S, G or P level.

Step 1214, computes an initial D, a whole number, and E, a remainder. This first D value may change as the result of remainder accumulation factors discussed below. It is important that no quantity of money, however small, be lost in the player pool. The money belongs to players, and it must go back to them.

These values D and E result from two equations: (1) the division equation "D=V divided by N", and (2) the E remainder value is obtained by multiplying D times N, subtracting the product from the original V value. Commentary box at step 1216 explains that V is value for amount of money increase (Plus) or decrease (Minus).

Step 1218, asks if V is a negative value (E less than 0?) If no, go to step 1224.

Step 1220, subtracts one from variable D (rounding down), with the equation "D=D−1"; then the X remainder accumulator has to be compensated by adding equivalent of one (N divided by N). The equation "R(X)=R(X)+N" accomplishes this by adding the divisor N.

Commentary box 1222 explains that step 1220 guarantees sufficient paytable reductions, when a player wins, assuring pots a little low rather than a little high. Compensating the remainder with N is the same as adding D to R(X), since N/N equals one, the value subtracted from D. When N gets large and positive, the subtracted amount gets restored.

Step 1224, sets R(X)=R(X)+E, with a commentary box 1226, which states that the R(X) is the unused remainder depository for level X. It is distributed when greater or equal to Divisor N. Negative E would have reduced R(X) had it not been for the addition of N, causing a net increase in R(X) instead.

Step 1228, asks if R(X) is less than N? If yes, proceed to the exit (step 1232).

Step 1230, computes G, the whole number for the remainder accumulator. It then sets a new R(X) value, by subtracting out any whole numbers with the equation: R(X)=R(X)−(G×N). That is, get product G times N, and subtract that product from the R(X) remainder accumulator. Then increase variable D by the value in newly computed whole number G.

Proceed to step 1232, the exit.

DETAILED DESCRIPTION—FIG 13

Figure 13:
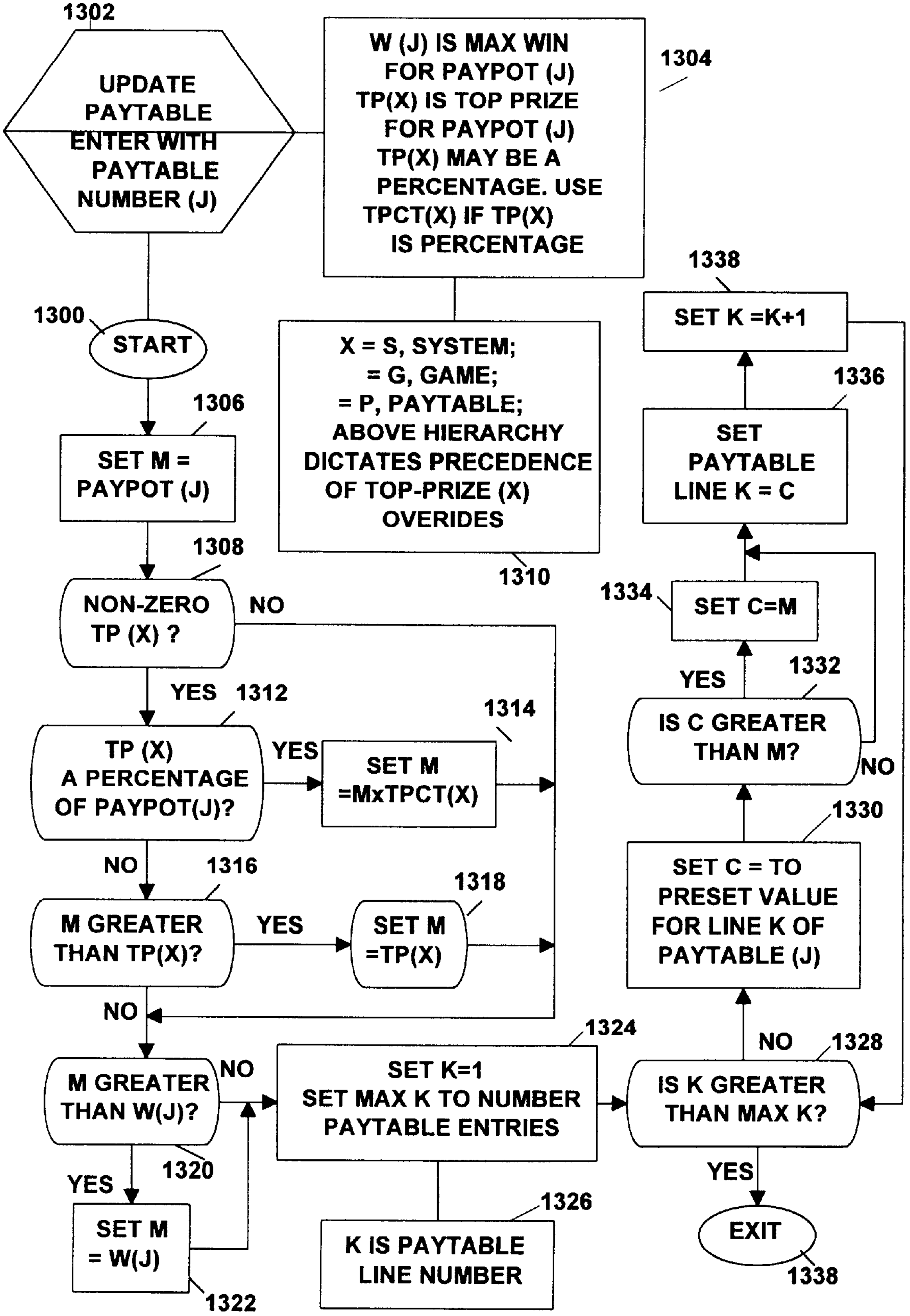
FIG. 13 is a flow chart of a subroutine that modifies a preset paytable and "Changes Paytable" lines displayed to the players in accordance with our present invention.

FIG. 13 is a flowchart of a subroutine that modifies and "Changes Paytable" lines displayed to the players in accordance with the present invention.

Subroutine "Update Paytable" starts at step 1300, with commentary boxes (steps 1302, 1304 and 1310).

Step 1302 specifies routine of "Update Paytable," must be entered with parameter for paytable number (J).

Commentary box 1310, explains that the system X-level parameter can be set to: S (System), G (Game) or P (Paytable) the precedence hierarchy for X being 'S' at the highest level, then 'G', with 'P' at the lowest level. Our invention allows for intermediate levels of X for the combining of pots, where appropriate. But these three X levels demonstrate the generality and flexibility of our new method.

Commentary box Step 1304, states that W(J) is Maxwin value for Paytable (J), and TP(X) is the top-prize for pot (J), where TPCT(X) is the top-prize percentage value when applicable.

Step 1306 sets variable M to value in paypot (J).

Step 1308 asks if paypot (J) has a top-prize limit (non-zero TP(X)? If no, go to step 1320.

Step 1312 asks if top-prize (X) is a percentage value? If no, go to step 1316.

Step 1314 sets variable M to the product of M times the top-prize percentage TPCT(X) using the equation: "M=M×TPCT(X), then go to step 1320.

Step 1316 asks if variable M is greater than fixed amount TP(X)? If no, go to step 1320. If yes, step 1318 sets variable M equals TP(X) to the top-prize (X).

Step 1320 asks if variable M is larger than W (J), the Maxwin value of paypot (J)? If no, go to step 1324.

Step 1322 sets variable M to the lower W(J) Maxwin value.

Step 1324 sets variables for payline numbers: K to 1, and MAX K to number paylines. Before allowing a preset payline prize we are going to search each payline and insure its prize does not exceed Maxwin.

Step 1328 asks if variable K is larger than MAX K? If yes, go to exit, step 1338.

Step 1330 sets C to preset payline (K) value, set by system operator for paytable (J).

Step 1332, asks if C is greater than M? If no, proceed to Step 1336.

Step 1334, which sets C to the value of M.

Step 1336 sets payline K of paytable (J) to the value of C. The value here will be the preset payline value if it does not exceed Maxwin (J) or top-prize(X).

Step 1338 adds one to variable K with equation: "K=K+1. Proceed back to Step 1328.

Step 1328 asks if K is greater than MAX K? If yes, go to the exit, step 1338.

DETAILED DESCRIPTION—FIG. 14

FIG. 14 is a flowchart of a typical subroutine that computes wins in an amount not to exceed a Maxwin value, in accordance with our present invention.

FIG. 14 is a subroutine called in FIG. 9 (step 938) and FIG. 10 (step 1028), where a win computation is necessary using the Maxwin paytable of our invention. The player wins at our non-banking machine of FIG. 1 and must be paid from a player's pool. The routine "Compute Win" presented here shows the processing of on-line paytables when the Maxwin is changing dynamically.

Subroutine "Compute Win" starts at step 1400, with commentary boxes at steps 1402 and 1404.

Commentary box step 1402 specifies that the routine requires the following variables: paytype, payrank, wild-indicator, and the betsize.

Commentary box step 1404 instructs that the paytable is ordered from the lowest paytype/payrank (at line 1) to the highest paytype/payrank (line max).

Step 1406 calls subroutine, "Get Paytable", FIG. 16, to acquire the Maxwin paytable (X) for game presently being played.

Step 1408 initializes variables J=1; K=0; and win=0; and sets Max J to the length of the paytable.

Step 1410 asks if J is greater than max J? If no, go to step 1411.

Step 1426 asks if no paylines satisfied the paytable search (does K=0?) If yes, go to the exit (step 1452) with information box step 1450, stating that "Compute Win" returns with a win amount not greater than the Maxwin, plus sidepots. If no, proceed to Step 1428.

Step 1411 (entered through step 1410) asks if the payline (J) is an empty entry? (Paytype and payrank both zero, which is not allowed). If yes, go to step 1426, described above.

Step 1412 asks if paytype is greater or equal to PT(J)? (where PT(J) is the paytype value in payline J of the paytable.) If no, proceed to step 1426, explained above. That is, we have reached a payline with a greater paytype value, which pay amount we are not entitled to.

Step 1416 asks if the paytype equals PT (J)? If no, proceed to Step 1423.

Step 1418 asks if payrank is greater or equal to PR(J)? PR(J) is the payrank value in payline J of the paytable. If no, go to step 1426, which was explained earlier. We arrived at payline with matching paytypes, but the variable payrank is less than required for payline. So, we cannot be paid for this line.

Step 1420 asks if parameter "WILD entered to this routine equals WW (J), the wild indicator for payline J of the paytable. If no, go to step 1423, to possibly find a better payline, that is not wild.

Step 1422 asks if payrank=PR (J)? If no, go to step 1423. Otherwise, it appears that an exact fit has occurred between the input variables, and the payline (J) parameters.

Step 1425 sets variable K to J. (K is the payline satisfying paytable search.) Proceed to Step 1426, described above.

Step 1423, (entered from steps 1416, 1420, and 1422,) sets variable K to J indicating that payline K is the best payline to meet the search criteria at this time. This allows the win compute logic to fall back to the previous payline when the next payline test fails.

Step 1424 adds one to variable J with the equations "J=J+1". The variable J controls the search for the payline entry with the highest pay. Proceed to step 1410, described above.

Step 1428 (entered from step 1426) sets variable J to the present K value, the best fit from the paytable search.

Step 1430 sets into variable win the bonus value from payline (J) for a bet of one.

Step 1432 multiplies variable win by the bet size to get a new win value.

Step 1434 asks if the win amount is greater than the Maxwin for paypot (J)? If no, go to step 1438.

Step 1436 sets variable win to the Maxwin amount for the paytable, then proceed to step 1438.

Step 1438 calls subroutine "Change Pots", FIG. 11, to modify paypots, and other pots, for the new (negative of) win amount. PT=Paytable, V=0−Win.

Figure 28:
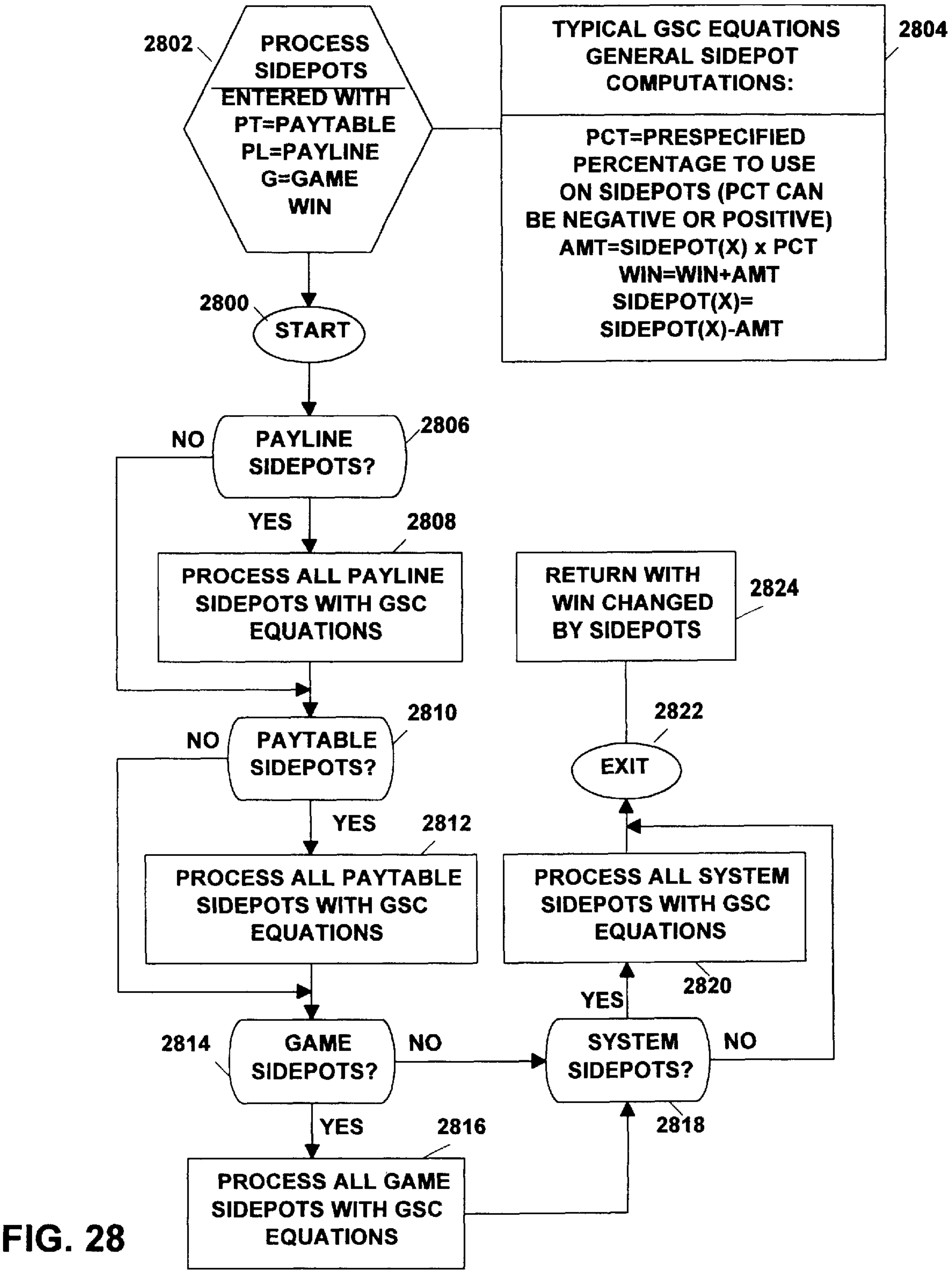
FIG. 28 is a flow chart subroutine that performs "General Sidepot Computations" according to non-banking player pool method of FIG. 1, of the present invention.

Step 1440 calls subroutine "Process Sidepots", FIG. 28, to add or subtract sidepot values that have been hooked to specified payline, paytable, game and system levels. Also, see FIG. 28. Modify win for sidepots.

Step 1442 asks if rent (usage fee) as directed by system operator, is to be paid from player winnings? (or player bet totals?). If no, go to exit, step 1452. If yes, go to step 1444.

Step 1444 computes the rent fee, by multiplying winnings times the rent percentage factor, RENT PCT, with the equation: "FEE=WIN×RENT PCT?".

Step 1446 adds the rent to the rent sidepot.

Step 1448 subtracts rent from the winnings (win).

Then proceed to exit at step 1452.

DETAILED DESCRIPTION—FIG. 15

Figure 15:
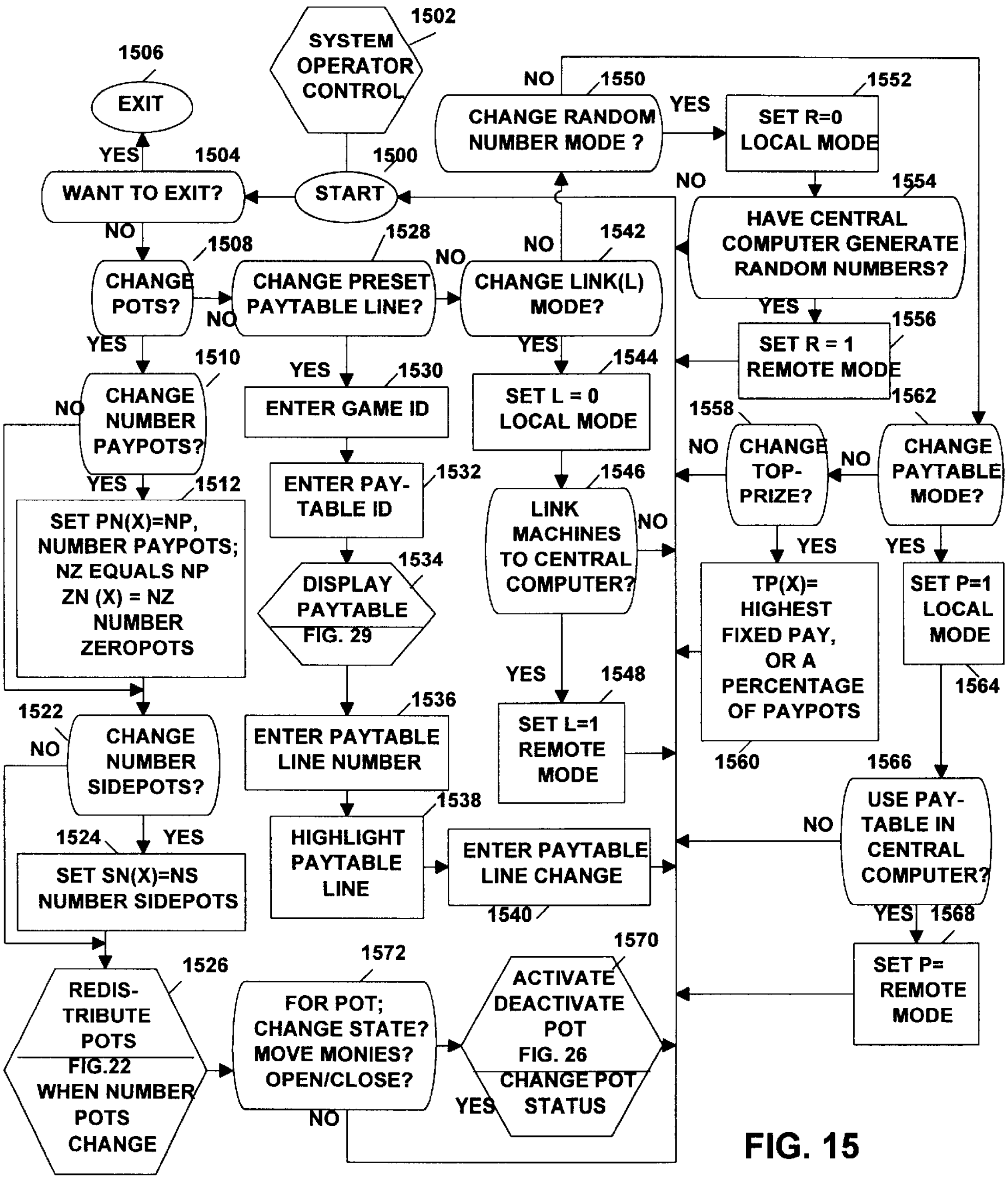
FIG. 15 is a flow chart of typical "Operator Control" capabilities over the system, in accordance with our present invention.

FIG. 15 is a subroutine that provides "System Operator Control" over the system of player pools according to our present invention. Subroutine "System Operator Control" starts at step 1500, with commentary box (step 1502) identifying the name of the subroutine.

The starting step 1500 goes directly to step 1504, which asks, 'Want to exit?" If yes, go directly to the exit (step 1506).

Step 1508 asks if pots are to be changed? If no, go to step 1528. Step 1510 asks if number of paypots is to increase or decrease? If no, go to step 1522.

Step 1512 sets the X-level variables: PN(X)=number paypots (NP), and ZN(X)=number zeropots (NZ). The system operator controls the setting of the system variables NP and NZ. The two variables, NP and NZ, will normally be the same value as NP, since each paypot has a related zeropot. However, paypots and zeropots can be set 'OFF' inactive, independently of each other. This allows an 'active' pot to accrue pool money, while the related 'inactive' pot gets no money until it is turned back 'ON'.

Step 1522 asks if number of sidepots is to change? If no, go to step 1526.

Step 1524 sets the X-level variable: SN(X)=number of sidepots(NS), where the system variable NS is controlled by the system operator. Proceed to step 1526.

Step 1526 calls subroutine "Redistribute Pots" (FIG. 22) when number of any pots change.

Step 1572 asks if the system operator wants to change the ON/OFF (open/close) state for a pot? Or does the system operator want to move pot monies to another pot? Or does the system operator want to open/close some pot slots? If no, go back to start, step 1500.

Figure 26:
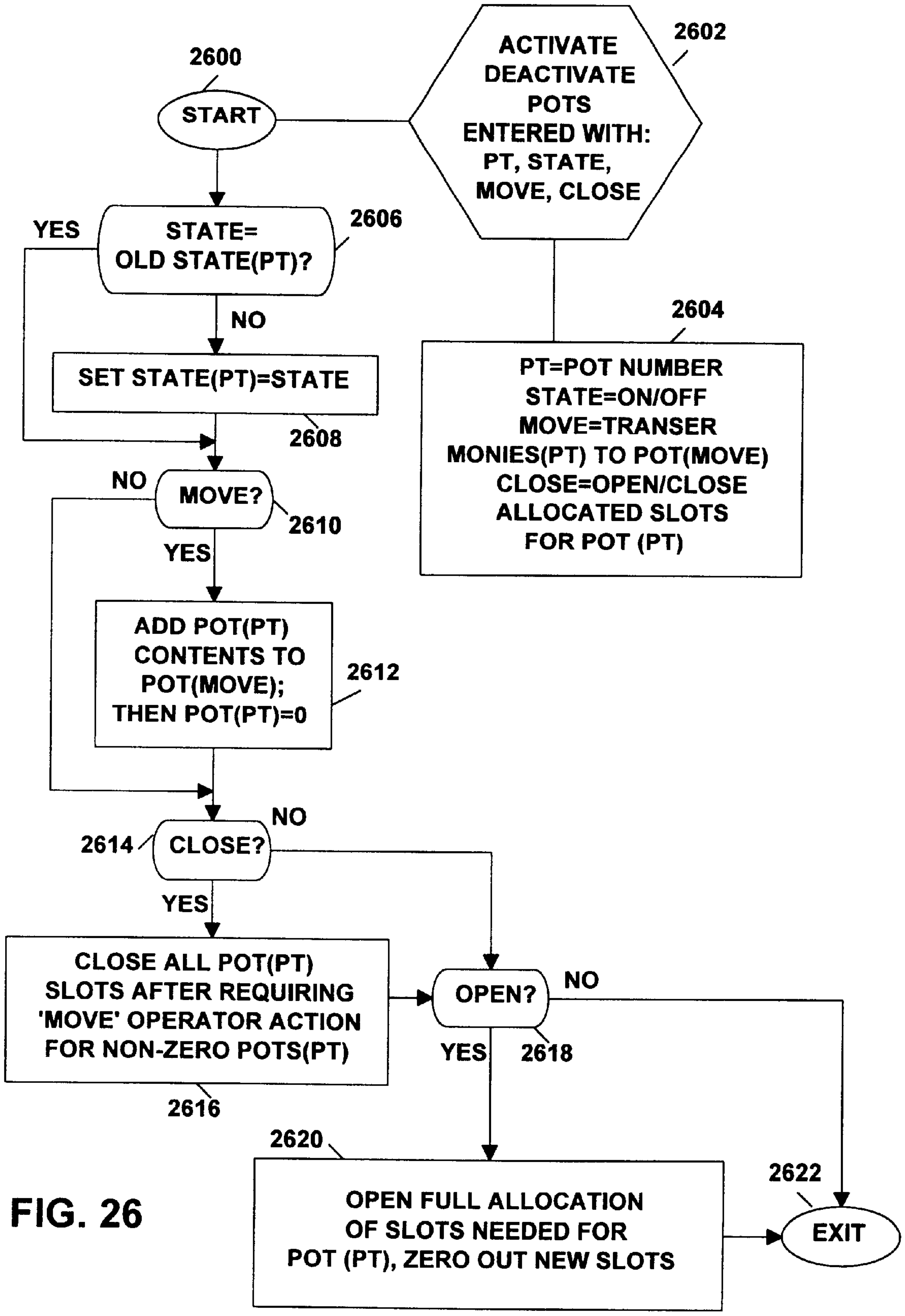
FIG. 26 is a flow chart subroutine to "activate and deactivate pots", or transfer their money to other pots according to the present invention.

Step 1570 calls subroutine "Activate Deactivate Pot", FIG. 26, to change pot status and conditions. Proceed back to step 1500, the start.

Step 1528 (entered through step 1508) asks, "Change a preset paytable line?" If no, proceed to step 1542.

Step 1530 asks operator to enter the game ID.

Step 1532 asks operator to enter the paytable ID.

Figure 29:
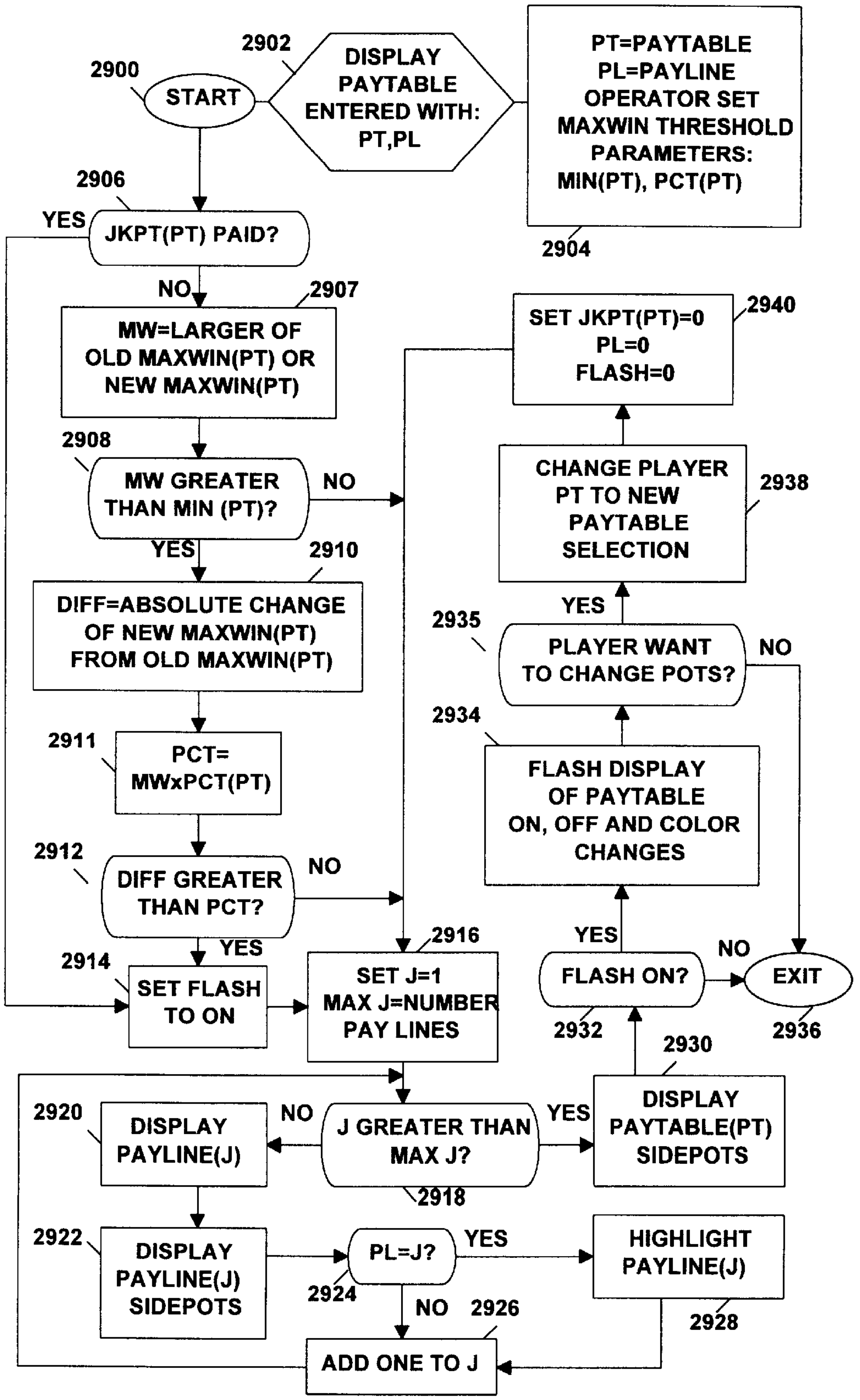
FIG. 29 is a flow chart subroutine to display a paytable, with related sidepots, and paytable switching when Maxwin change exceeds threshold.

Step 1534 calls subroutine "Display Paytable", FIG. 29.

Step 1536 asks operator to enter the paytable line number.

Step 1538 highlights the paytable line for operator specified line number entered by the operator.

Step 1540 lets the operator enter any desired changes to the paytable line, then proceed back to the start step 1500.

Step 1542 (entered through step 1528) asks, "Change link (L) mode? If no, proceed to Step 1550.

Step 1544 sets the link indicator L to local state (L=0).

Step 1546 asks if game machines are to be linked over an on-line network to a central computer. If no, proceed to starting step 1500.

Step 1548 sets the link indicator L to remote state (L=1). Proceed back to the start, (step 1500).

Step 1550 (entered through step 1542) asks, "Change the random number mode?" If no, proceed to Step 1562.

Step 1552 sets the random number mode to local state (R=0).

Step 1554 asks if the central computer is to generate random numbers for the game? If no, go back to the Start (Step 1500).

Step 1556 sets the random number mode to remote state (R=1). Proceed back to the Start (step 1500).

Step 1562 (entered through step 1550) asks, "Change the paytable mode?" If no, go to Step 1558.

Step 1564, sets paytable mode to local state (P=0). Proceed to step 1566.

Step 1566 asks, "Use the paytable in the central computer?" If no, go back to the start step 1500, explained before.

Step 1568 sets paytable mode to remote state (P=1). Then, proceed back to the start, step 1500.

Step 1558 (entered from step 1562) asks, "Change top-prize?" If no, proceed the start, (step 1500) which has been explained before.

Step 1560 sets the top-prize for X-level to the operator directed value. This is accomplished by the general equation TP (X)=operator specified top-prize". This operator specified value can be a Fixed value, or a percentage of paypot value. A hierarchy exists for X, where S (System top-prize), overrides the G(Game top-prize), which overrides the P(Paytable top-prize). Proceed back to the start step 1500, explained before. This completes the description of FIG. 15.

DETAILED DESCRIPTION—FIG. 16

FIG. 16 is a subroutine used in FIGS. 9, 10, and 14 to handle many aspects of retrieving Maxwin paytables according to our present invention.

Start at step 1600 subroutine, "Get Paytable," with commentary box (step 1602), specifying that parameters L, P, and the paytable number are required by the routine.

Step 1604, sets the variable TRIES to zero and the error flag to zero. Step 1606 asks if, "TRIES greater than Max", where Max is a value set by the system operator. If no, go to step 1620.

Step 1608 calls subroutine, "Operator Paytable" (FIG. 18) to alert the operator that there is a paytable problem.

Step 1609 asks if the operator switched the paytable? If yes, the player is informed at step 1610, and the sequence goes back to the start (step 1600).

Step 1612 asks if the player selected a new paytable? If yes, the player is informed at step 1610 and the sequence goes back to the start, step 1604.

Step 1614, sets an error flag to a value of one. A commentary box at step 1616 states that the subroutine returns with the error flag set On or OFF depending on its success. Then go to step 1638, the exit.

Step 1620 (entered from step 1606) asks if the paytable is to be found locally (L=0 or P=0)? If yes, retrieve the local paytable at step 1622 and go to step 1626.

Figure 17:
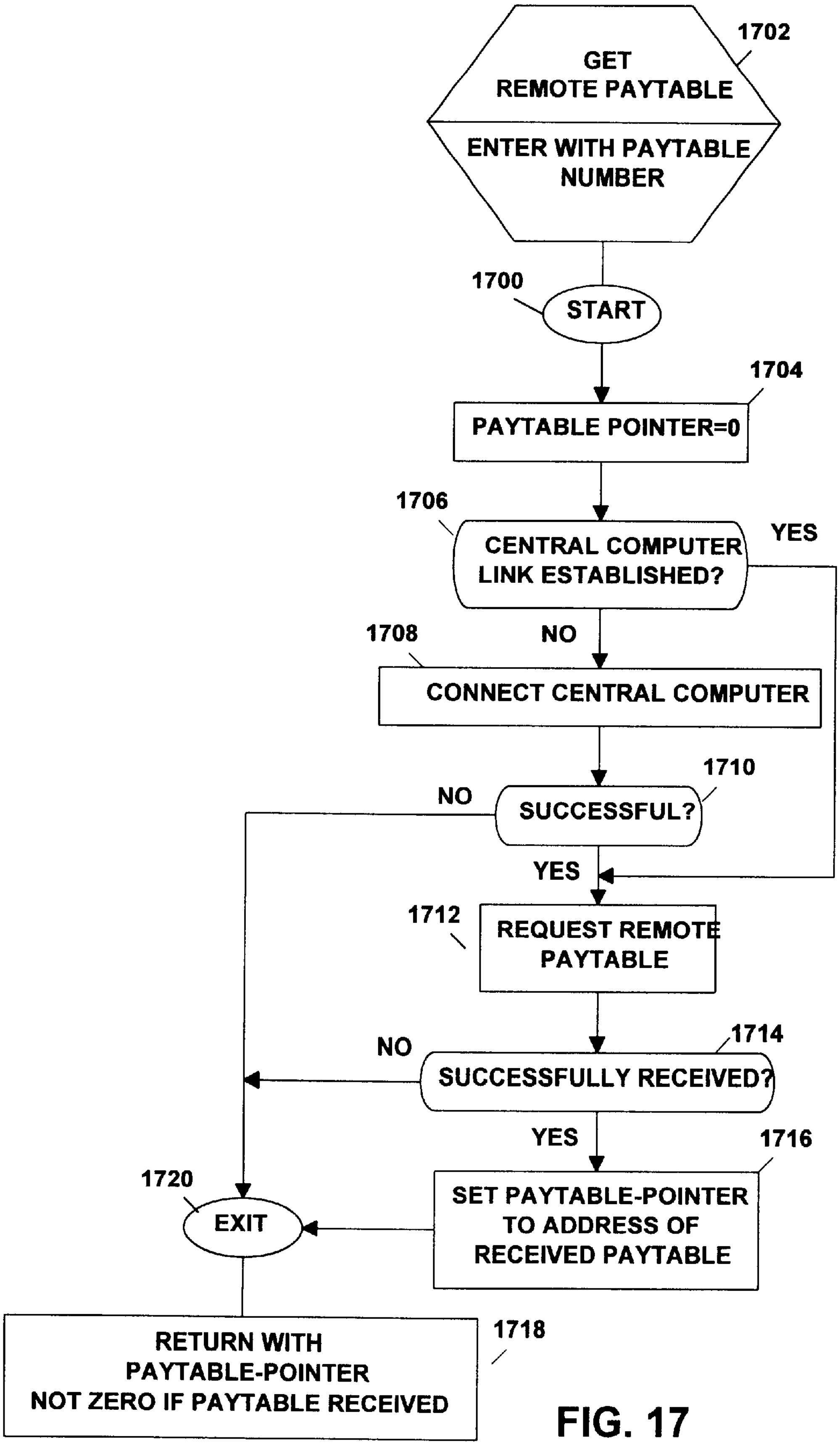
FIG. 17 is a flow chart of a subroutine which receives a "Remote Paytable" from a linked central computer in accordance with our present invention.

Step 1624 calls subroutine, "Get Remote Paytable", FIG. 17, then proceeds to step 1626.

Step 1626 asks if paytable retrieval was "Successful?" If no, go to step 1618, where one is added to the variable TRIES, then to step 1606.

Step 1628, copies the acquired paytable to the player area paytable. Proceed to step 1630.

Step 1630 asks if the paypot Maxwin equals 0? If no, exit at step 1638. If yes, step 1632 asks, "is there another paypot Maxwin greater than 0?" If no, exit at step 1638.

Step 1634 calls subroutine "Operator Paytable" (FIG. 18) to ask the system operator if paytable should be switched to another paytable?

Step 1636 asks if a paytable switch did occur? If yes, inform the player at step 1610 and start the sequence over at step 1600. If no, exit at step 1638.

DETAILED DESCRIPTION—FIG. 17

FIG. 17 is a flowchart of a subroutine that controls' a linked machine environment where a central computer maintains centralized paytables according to our present invention.

Subroutine "Get Remote Paytable", starts at Step 1700, with a commentary box, step 1702, stating that the routine requires paytable number. Proceed to step 1704.

Step 1704 sets the remote paytable pointer to zero. After the remote paytable is retrieved from the central computer, this paytable pointer will be set to a non-zero address.

Step 1706 asks if a link to the central computer is already established? If yes, Proceed to step 1712.

Step 1708, attempts to connect a link to the central computer.

Step 1710 asks if the attempted linkup to the central computer (at Step 1708) was successful? If no, proceed to step 1720, the exit.

Step 1712, requests the remote paytable from the central computer.

Step 1714 asks if remote paytable was successfully received? If no, then proceed to step 1720, with paytable pointer equal to zero.

Step 1716, which sets the paytable-pointer to the address of the received paytable.

Step 1720 is the exit for FIG. 17, with a commentary box 1718, explaining that a non-zero paytable-pointer indicates success.

DETAILED DESCRIPTION—FIG. 18

Figure 18:
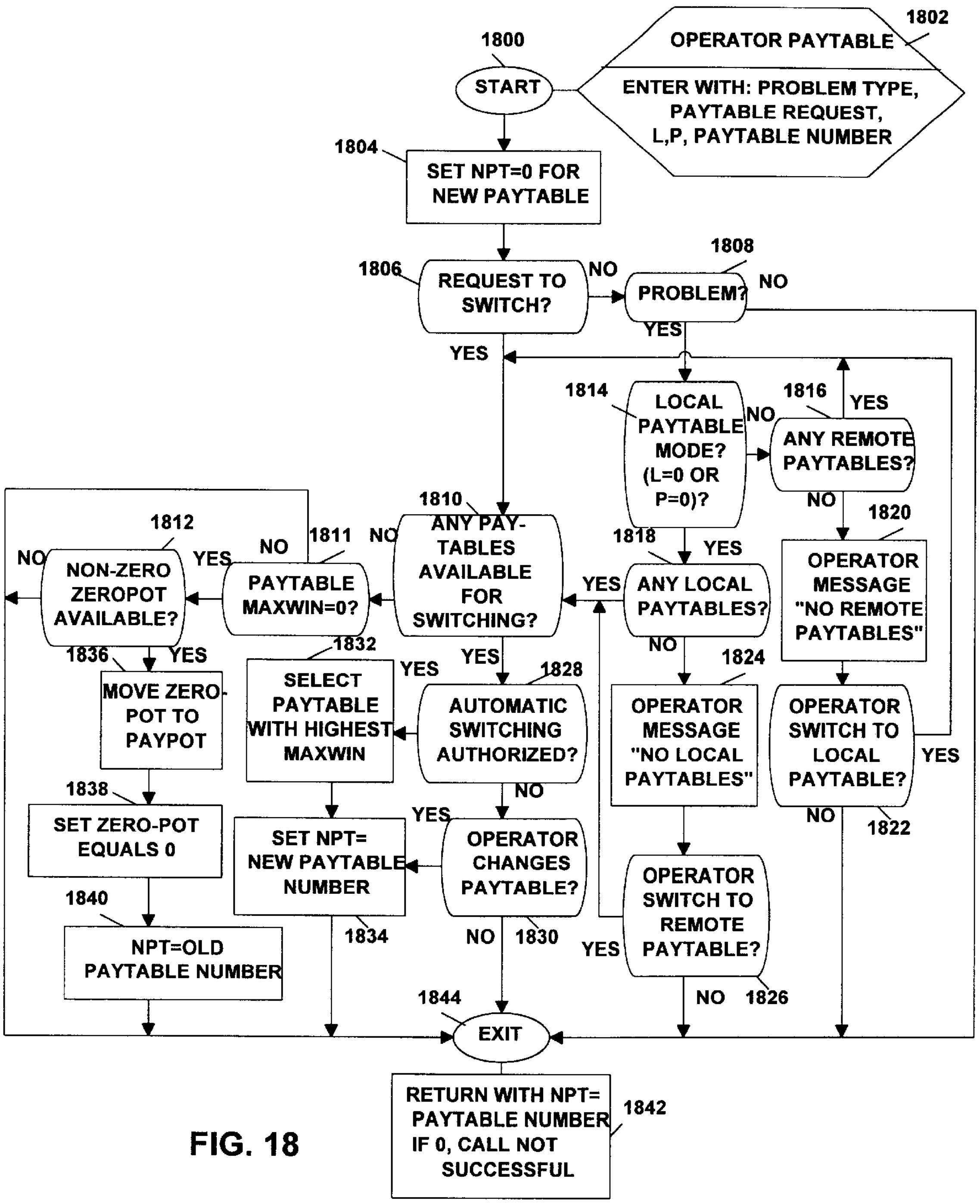
FIG. 18 is a flow chart subroutine of an "Operator Paytable Control" that gives the operator control over the system of player pools according to FIG. 1, in accordance with our present invention.

FIG. 18 is a subroutine "Operator Paytable" to allows a system operator to control and manage paytables (paypots) according to our present invention.

Subroutine "Operator Paytable", starts at step 1800, with a commentary box 1802, which states this routine requires a problem type or paytable request, along with parameters: L, P, and Paytable Number.

Step 1804, sets the new paytable number to zero.

Step 1806, asks if the routine was entered with a request to switch? If yes, proceed to step 1810.

Step 1808 asks if there is a reported paytable problem? If no, proceed to the exit (Step 1844). If yes, proceed to step 1814.

Step 1810 (entered from step 1806) asks if any paytables are available for switching in the current paytable mode? If yes, go to step 1828.

Step 1811 asks if current paytable Maxwin is 0? If no, go to 1844, the exit.

Step 1812 (entered from step 1811) asks if an active non-empty zero-pot is available for the specified paytable which has a Maxwin of zero? If no, proceed to the exit (step 1844) with an NPT of zero, indicating that the call was unsuccessful.

Step 1836 moves the money in the zero-pot to its associated paypot, which had a Maxwin of zero.

Step 1838 causes the emptied zero-pot to be cleared to zero.

Step 1840 sets NPT to the old paytable number. The paytable number remains the same, because it has been refilled with money from its associated zeropot. This non-zero value is a success indicator, although the new paytable number (NPT) equals the old one. Proceed to step 1844.

Step 1814 (entered from step 1808) asks if either the paytable mode or the link mode is in local mode (L=OFF or paytable mode P=OFF?) If yes, Proceed to step 1818.

Step 1816 asks if there are any remote paytables? If yes, proceed to step 1810, explained above.

Step 1820 displays the operator message, "No remote paytables".

Step 1822 asks if operator has switched the paytable P mode from remote to local? If yes, proceed to step 1810, explained above. If no, go to the exit (step 1844) with an NPT of zero, indicating call failed.

Step 1818 (entered from step 1814) asks if there exist any local paytables? If yes, go to step 1810, explained above.

Step 1824 displays the operator message "No local Paytables".

Step 1826 asks if the operator has switched the paytable P mode from local to remote? If yes, go to step 1810, explained above. If no, go to exit (step 1844) with an NPT of zero, indicating call failed.

Step 1828 (entered from step 1810) asks if automatic paypot switching has been authorized by the system operator? If no, proceed to 1830.

Step 1832 automatically selects a new and different paytable with the highest Maxwin available for the game type.

Step 1834 (entered from steps 1830 and 1832) sets NPT to the New Paytable Number. Proceed to the exit (step 1844) with a successful return indication, since NPT is not zero.

Step 1830 (entered from step 1828) asks if the operator changed to a new paytable? If yes, go to step 1834, above. If no, go to the exit (step 1844) with an NPT of zero, an error return.

Step 1844 is the exit, with an attached commentary box 1842 stating that a non-zero NPT means success.

DETAILED DESCRIPTION—FIG. 19

Subroutine, "Get Random Numbers" starts at step 1900 with commentary boxes (steps 1902 and 1904). Step 1902 declares it is to be entered with parameters NR and LR. Step 1904 explains that, NR equals the number of unique random numbers required, and LR is the largest random number allowed.

Step 1906 sets the variable TRIES to zero and the error flag to zero.

Step 1908 asks if, "TRIES greater than MAX?" (the MAX variable setting is controlled by the system operator). If no, proceed to step 1918.

Step 1910 calls subroutine "Operator Random Numbers" (FIG. 21), to alert the operator that there is a random number problem.

Step 1912 asks if the operator switched the random number generator to a different mode, that is from local to remote, or vice versa? If yes, go back to step 1900 and start over.

Step 1914, sets error flag to one, an error (step 1914). Commentary box, step 1916, states return with value of error flag. Exit the program at step 1930.

Step 1918 (entered from step 1908) asks if the random number mode is local (L=0 or R=0?) If remote mode, go to step 1922.

Step 1920, gets the random numbers locally, and then proceeds to step 1924.

Step 1922 calls subroutine, "Get Remote Random Numbers", (FIG. 20) to get random numbers from the central computer, then proceeds to step 1924.

Step 1924 asks if retrieval of random numbers was successful? If not, go to step 1926.

Step 1928 copies the random numbers to the player random number area, then exits the program at step 1930, with error flag set to zero.

Step 1926 (entered from step 1924) adds one to variable TRIES. Then proceed to step 1908.

Step 1930 is the exit, entered from step 1914 or step 1928.

DETAILED DESCRIPTION—FIG. 20

Figure 20:
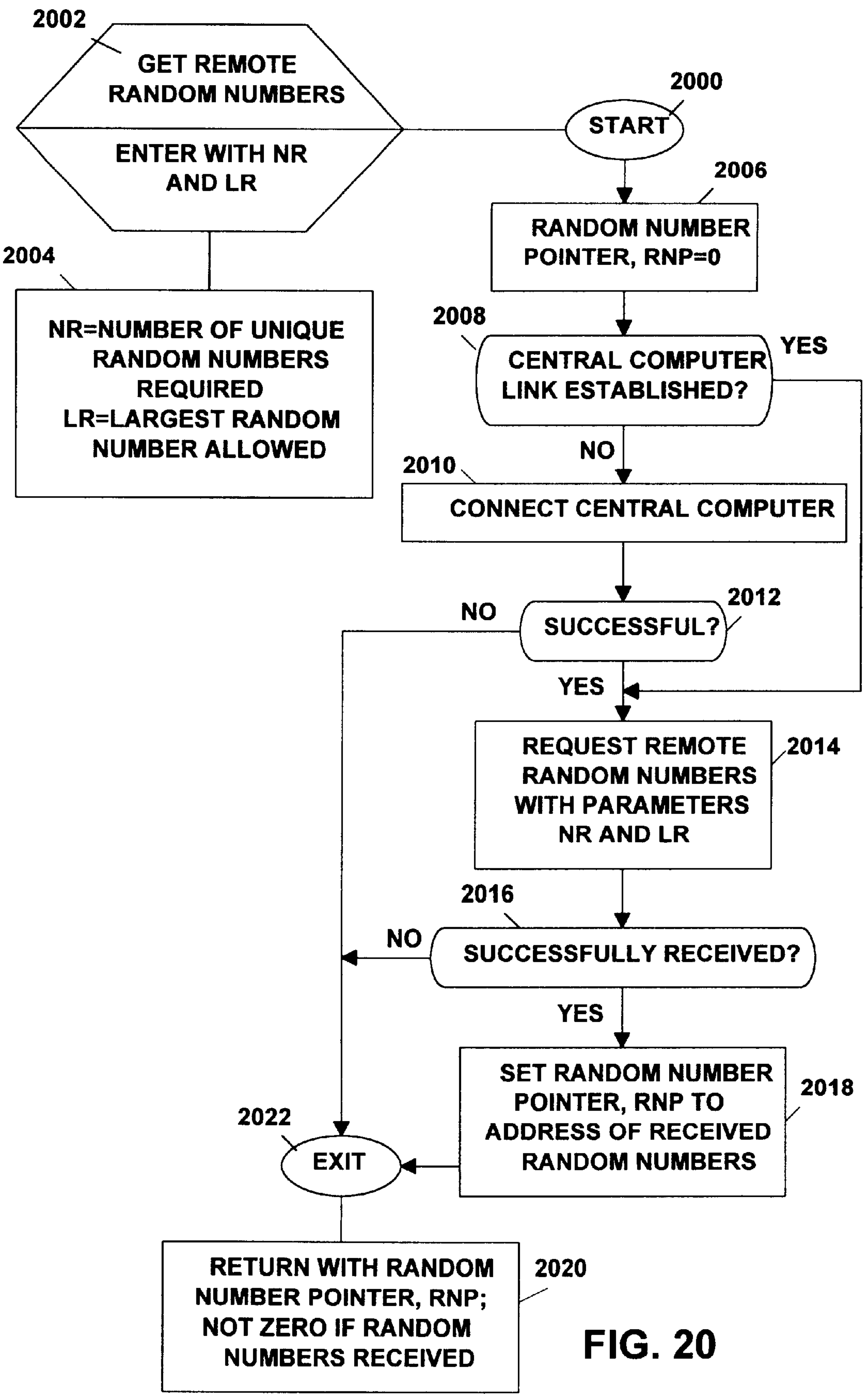
FIG. 20 is a flow chart subroutine, which requests and receives "Remote Random Numbers" from a linked central computer in accordance with our present invention.

FIG. 20 is a flow chart subroutine which requests and receives "Remote Random Numbers" from a linked central computer in accordance with our present invention.

Subroutine "Get Remote Random Numbers" starts at step 2000, with commentary boxes (steps 2002 and 2004). Step 2002 is a commentary that the subroutine is to be entered with parameters NR and LR. Step 2004, defines NR as the number of unique random numbers required, and LR as the largest random number allowed.

Step 2006, sets the random number pointer (RNP) to zero.

Step 2008 asks if the link to the central computer has already been established? If yes, proceed to step 2014.

Step 2010, attempts to establish a communication link with the central computer.

Step 2012, asks if the communications linkup with the central computer, was successful? If no, proceed to exit (Step 2022), with RNP equal to zero (error indicator).

Step 2014 requests remote random numbers from the central computer with parameters NR and LR.

Step 2016 asks if remote random numbers were successfully received? If no, proceed to the exit (Step 2022) with a zero random number pointer (an error return).

Step 2018 sets the random number pointer to the address of the random numbers received, a success return indicator.

Step 2022 exits the routine. At step 2020, return with RNP (random number pointer) with RNP set to zero, if call unsuccessful.

DETAILED DESCRIPTION—FIG. 21

Figure 21:
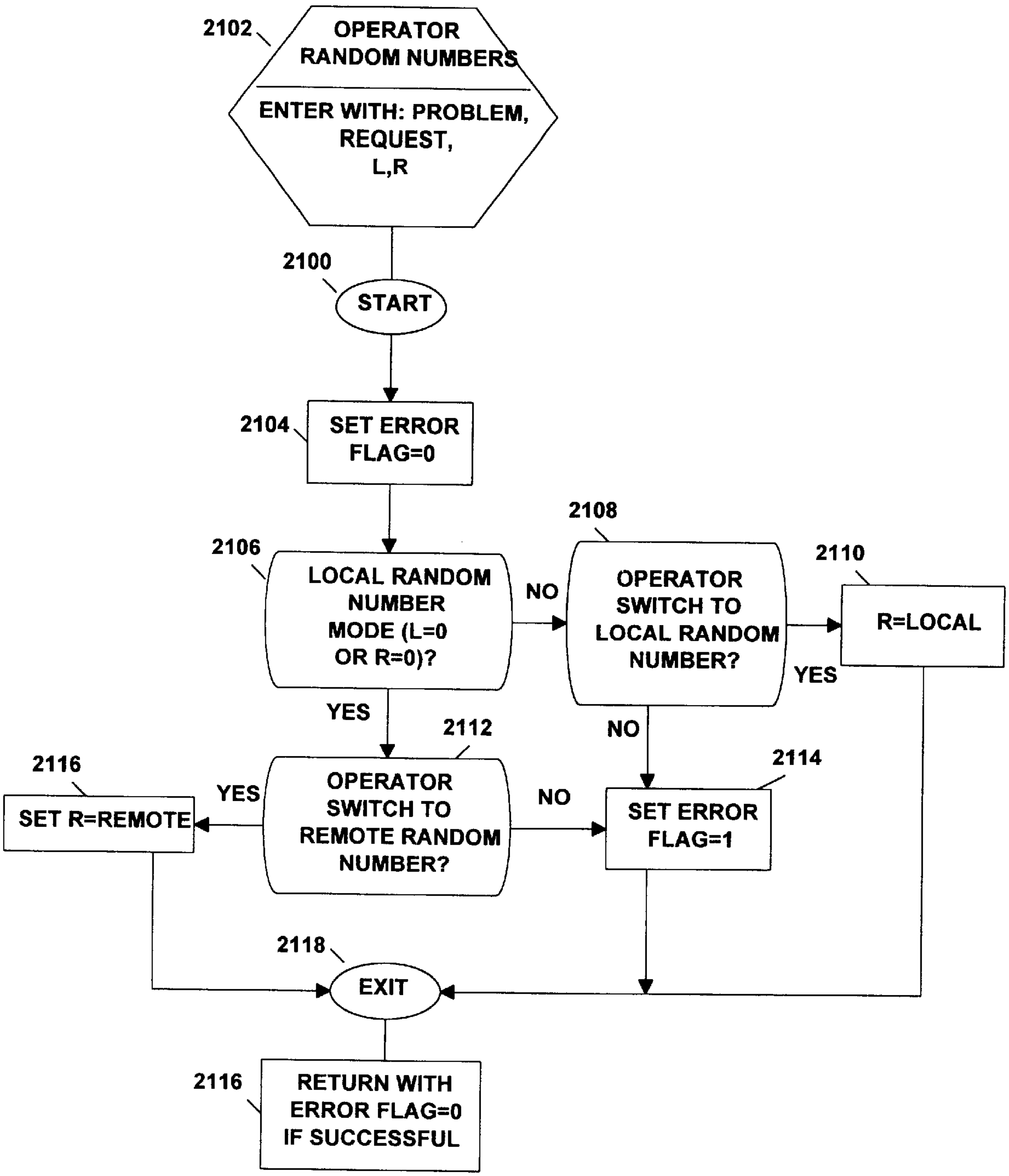
FIG. 21 is a flow chart subroutine of some typical operator "Random Number Controls" over the location of random number generators used by the system in accordance with our present invention.

FIG. 21 is a flow chart subroutine examining some controls for "Operator Random Numbers" problems with a linked central computer in accordance with our present invention.

Subroutine "Operator Random Numbers" starts at step 2100, with an attached commentary box (step 2102).

Step 2102 specifies that the routine must be entered with parameters: problem indicator, or mode change request for random number mode; along with L, and R. L is the link mode and R is the random number mode.

Step 2104 sets the error flag to zero.

Step 2106 asks if the random number mode is local (L=0) or (R=0?) If yes, proceed to Step 2112, to handle the local mode.

Step 2108 asks if the operator switched the random number mode, from remote to local? If no, proceed to Step 2114.

Step 2110 sets R to the local mode, then proceeds to the exit at Step 2118, with an error flag of 0, a successful result.

Step 2112 (entered from step 2106) asks if operator switched the random number remote mode, from local to remote? If no, proceed to step 2114.

Step 2116 sets R to remote mode, then proceeds to the exit (Step 2118), with an error flag of 0, a successful result.

Step 2114 (entered from steps 2108 and step 2112) sets the error flag to 1. Proceed to the exit (step 2118), with an error flag of 1, which indicates call failed.

Step 2118 exits routine, with error flag of 1, if call was unsuccessful.

DETAILED DESCRIPTION—FIG. 22

Figure 22:
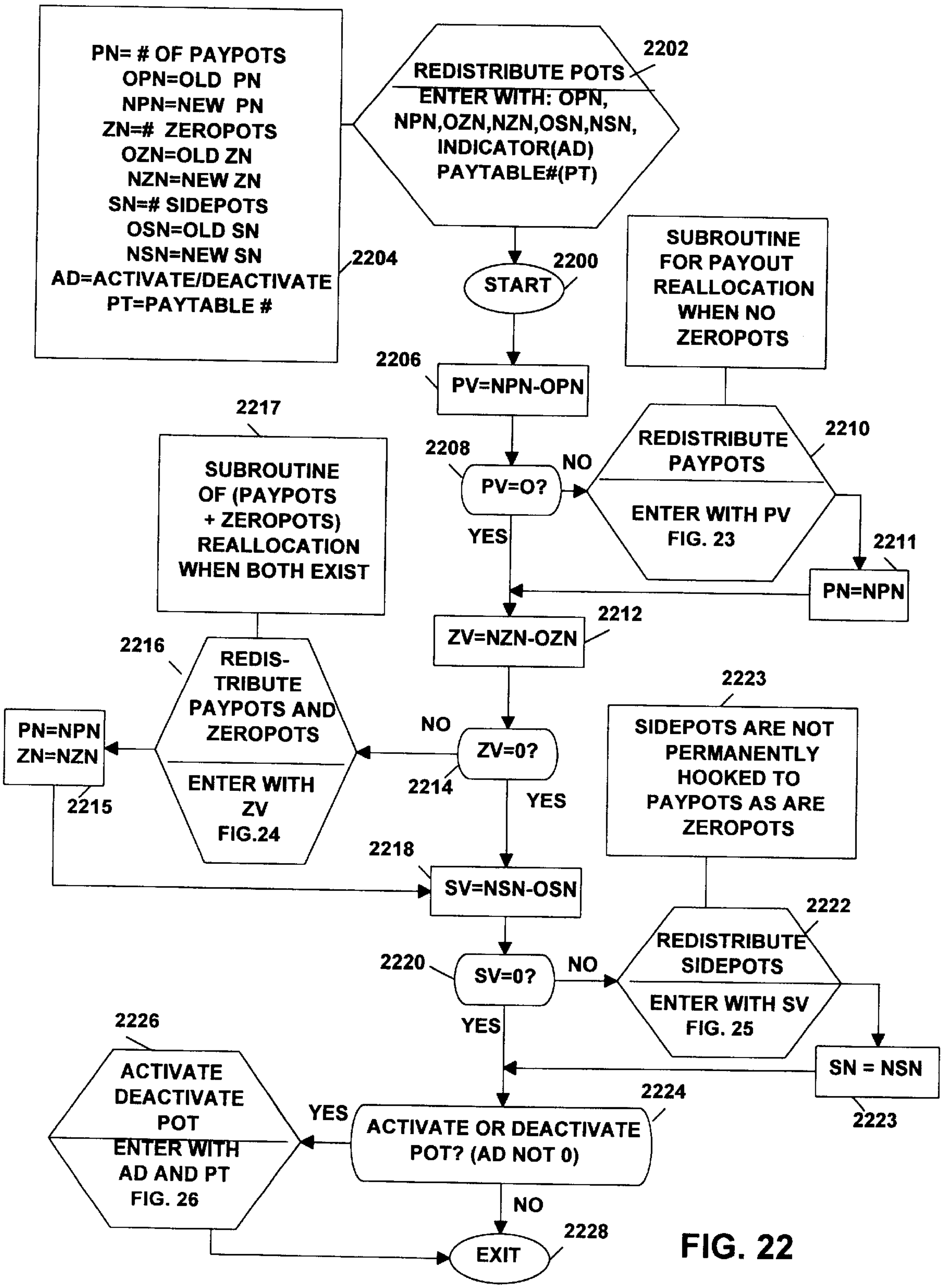
FIG. 22 is a flow chart subroutine to "Redistribute Pots" according to the present invention.

FIG. 22 is a flowchart subroutine to "Redistribute Pots" according to the player pool of FIG. 1.

Subroutine "Redistribute Pot" starts at Step 2200), with two commentary boxes (steps 2202 and 2204).

Step 2202 specifies this subroutine must be entered with parameters: OPN, NPN, OZN, NZN, OSN, NSN, indicator (AD) and paytable number #(PT).

Step 2204 defines the parameters: PN=number of paypots, OPN=Old PN, NPN=New PN; ZN=number of zeropots, OZN=Old ZN, NZN=New ZN; SN=Number of sidepots, OSN=Old SN, NSN=New SN; AD=Activate//Deactivate, PT=paypot (or paytable number).

Step 2206 sets variable PV to the value of NPN minus OPN, change in number of paypots.

Step 2208 asks if no change in number of paypots (PV=0?) If yes, go to Step 2212.

Step 2210 calls subroutine "Redistribute Paypots" (FIG. 23), which increases or decreases number of paypots (with their paytables) by the number in PV.

Step 2211 sets parameters (PN=NPN).

Step 2212 sets variable ZV to the value of NZN minus OZN, change in number zeropots.

Step 2214 asks if no change in zeropots (ZV=0?). If yes, go to Step 2218.

Step 2216 calls subroutine, "Redistribute Paypots and Zeropots" (FIG. 24), which changes number of both paypots and zeropots by number value found in ZV.

Step 2217 sets parameters PN=NPN and ZN=NZN.

Step 2215 (commentary box) explains that step 2216 is a subroutine of "Paypots+Zeropots" reallocation when both exist.

Step 2218 sets variable SV to the value of NSN minus OSN, change in number of sidepots.

Step 2220 asks if no change in sidepots (SV=0?). If yes, proceed to Step 2224.

Step 2222 calls subroutine "Redistribute Sidepots" (FIG. 25), which increases or decreases number of sidepots by number value found in SV.

Step 2225 sets SN=NSN.

Step 2224 asks if "Parameter AD is set?" and "Activate or Deactivate pot? (AD not 0.)" If no, proceed to the exit (Step 2228).

Step 2226 calls subroutine "Activate/Deactivate Paytable" (FIG. 26), which sets the ON/OFF state for a specific paytable (PT). Enter with variables AD and PT. Also, the system operator can open/close slots for pots; and can transfer monies from one pot to another.

Step 2228, the exit, completes the detailed description of FIG. 22.

DETAILED DESCRIPTION—FIG. 23

Figure 23:
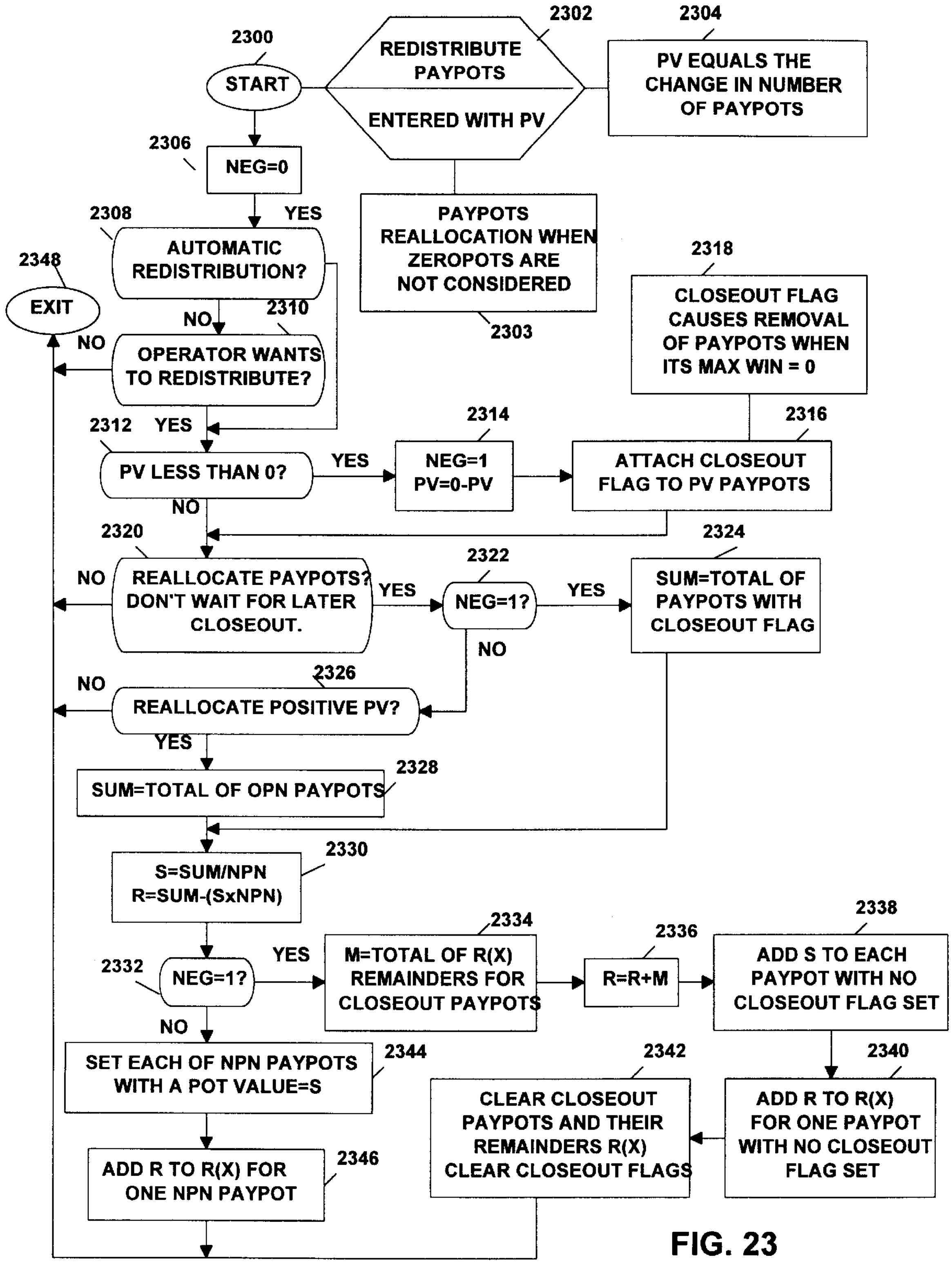
FIG. 23 is a flow chart subroutine to "redistribute paypots" when there is a change in the number of paypots according to the present invention.

FIG. 23 is a subroutine to "Redistribute Paypots" when a change occurs in the number of paypots in the player's pool, according to the present invention of FIG. 1.

Figure 24:
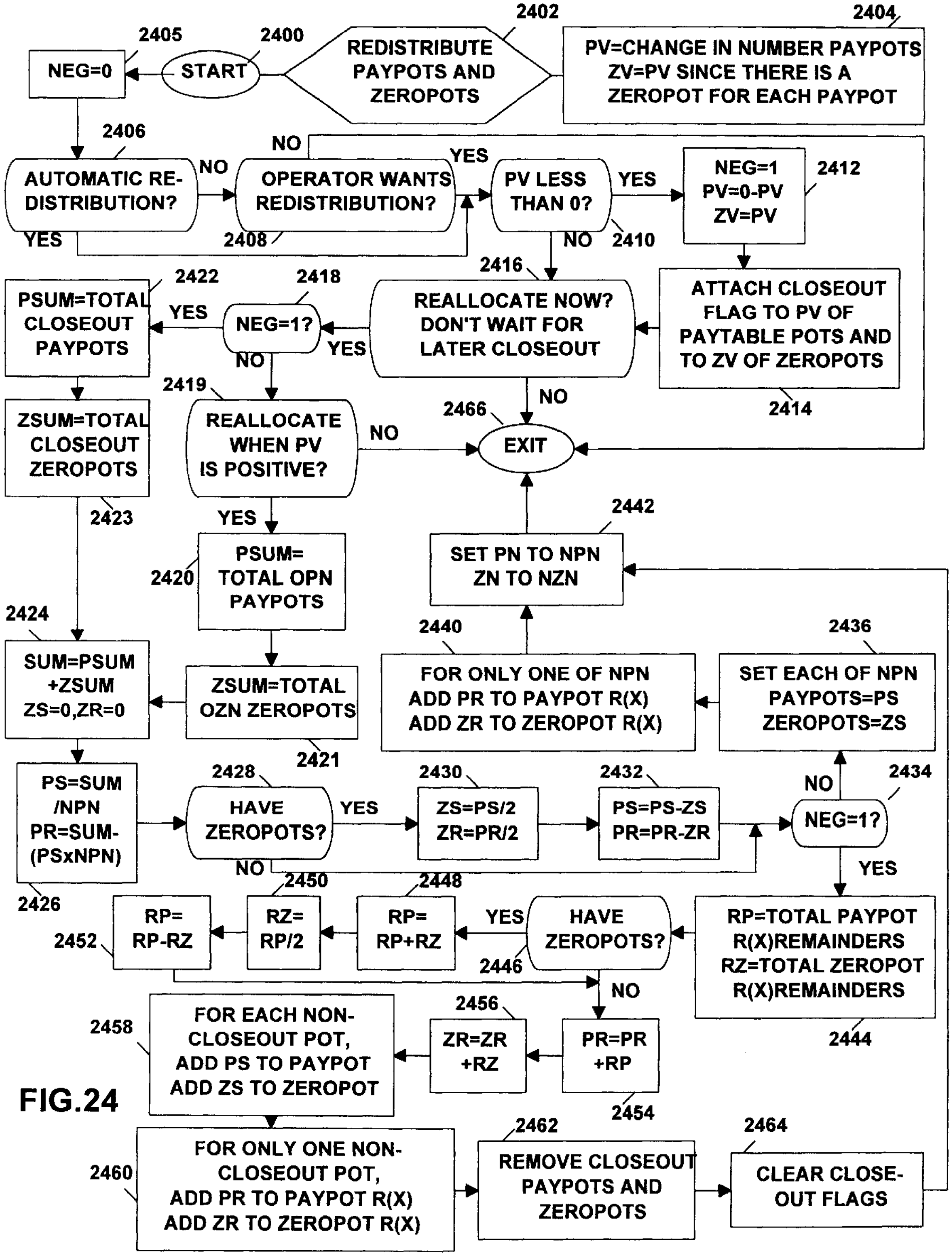
FIG. 24 is a flow chart subroutine of how to "Redistribute and Reallocate Both Paypots and Zeropots" according to the present invention.

FIGS. 23 and 24 are mutually exclusive of each other. If one is executed the other subroutine will not be.

Subroutine "Redistribute Paypots" starts at step 2300, with commentary boxes, steps 2303 and 2304. Step 2302 states that the routine is entered with parameter PV. At step 2303 the paypots are reallocated when zeropots are not considered. Step 2304, explains PV is the change in number of paypots.

Step 2306 sets NEG to 0.

Step 2308 asks if system operator has directed automatic redistribution of paypots? If yes, proceed to step 2312.

Step 2310 asks if system operator wants to redistribute? If no, go to step 2348, the exit.

Step 2312 asks if number of paypots is reduced (PV less than 0)? If no, go to step 2320.

Step 2314 sets NEG=1, and "PV=0 minus PV".

Step 2316 attaches closeout flags to a number (equal to PV) of paypots. Commentary box 2318, states that the closeout flag causes the removal of the paypot from the system when Maxwin goes to 0.

Step 2320 asks whether to reallocate paypots now, that is, do not wait for later closeout? If no, proceed to step 2348, the exit.

Step 2322 asks if Neg=1? If no, go to step 2326.

Step 2324 sets SUM=summation of (total) (PV) paypots with closeout flag. Proceed to step 2330.

Step 2326 (entered from step 2322) asks if positive PV is to be reallocated? That is, should the old number of paypots have their contents be averaged, to be spread equally among all the new number of paypots? If no, proceed to step 2348, which is the exit.

Step 2328 sets SUM=total contents of the old paypots, before their number expanded.

Step 2330 computes an even distribution for the change in number of paypots over the new number of paypots by the equation: "S=SUM divided by NPN", where S is a whole number. When SUM is not evenly divisible by NPN, there is the remainder R, computed by the equation: "R=SUM minus the product of S times NPN".

Step 2332 asks if NEG=1. If no, proceed to step 2344.

Step 2334 sets M=summation of (total) R(X) remainders for closeout paypots.

Step 2336 sets R=R+M.

Step 2338 adds S to each paypot with no closeout flag set.

Step 2340 adds R to one paypot R(X) with no closeout flag set.

Step 2342 removes the closeout paypots and their remainders R(X). Then closeout flags are cleared. Proceed to step 2348, which is the exit.

Step 2344 (entered from step 2332) sets each NPN paypots to pot value of S.

Step 2346 adds R to only one R(X) of the NPN paypots. Then, proceed to step 2348, the exit.

DETAILED DESCRIPTION—FIG. 24

FIG. 24 is a flowchart subroutine of how to "Redistribute and Reallocate Both Paypots and Zeropots" according to our present invention.

FIGS. 23 and 24 are mutually exclusive of each other. If one subroutine is executed then the other will not be.

Subroutine "Redistribute Paypots and Zeropots" starts at step 2400 with commentary boxes (steps 2402 and 2404).

Step 2402 identifies the subroutine. Step 2404 defines parameters required by the subroutine: PV equals (plus or minus) change in number paypots; and ZV=PV, since there is a zeropot for each paypot. However, one or both of the pair paypot/zeropot might be set inactive at any time by the system operator.

Step 2405, sets NEG=0 (indicating PV is positive. number, reset below if PV is negative).

Step 2406 asks if there is automatic redistribution? If yes, go to step 2410.

Step 2408 asks if operator wants redistribution? If no, go to step 2466, the exit.

Step 2410 asks if PV is less than 0? If no, go to 2416.

Step 2412 sets NEG=1 (indicator PV was negative). Then set PV with the equation: "PV=0 minus PV" (so that PV is positive for later computations). Then set ZV=PV.

Step 2414 attaches closeout flag to PV paypots and to ZV zeropots. The closeout flag delays shut down of pots until their money contents go to zero.

Step 2416 asks, "Reallocate now, that is don't delay closeout? If no, go to step 2466, the exit. The system operator wants to shut down some pots, possibly so that the remaining pots will increase faster for larger payoffs.

Step 2418 asks if the number of pots are to be reduced (NEG=1?). If yes, go to step 2422.

Step 2419 asks, "Reallocate when PV is positive? If no, go to the exit (step 2466) That is, do we want to reallocate to new pots, some of the money from old pots? This allows new pots, to start with money, immediately.

Step 2420, sets PSUM=sum of OPN (old) paypot monies.

Step 2421 sets ZSUM=sum of OZN (old) zeropot monies. Go to step 2424.

Step 2422 (entered from step 2418) sets PSUM=sum of money in PV paypots to be closed out.

Step 2423 ZSUM=sum of money in ZV zeropots to be closed out. Go to step 2424.

Step 2424 (entered from steps 2421 and 2423) sets SUM=PSUM+ZSUM; and in case there are no zeropots, housekeep ZS and ZR, (ZS=0, ZR=0).

Step 2426 sets PS=SUM/NPN, the whole number to be distributed equally among the new number (NPN) of paypots; and PR=SUM−(PS×NPN), the remainder from above division to get PS. The remainder cannot be lost, for the remainders account to a significant amount of money over time. Remainder accumulators are maintained for all pots, and their contents (when large enough), get distributed to their main pots.

Step 2428 asks if there are zeropots? If no, proceed to step 2434. The averaged monies when zeropots exist, means that monies will be disbursed over both paypots and zeropots.

Step 2430 sets ZS=PS/2, (half of whole numbers monies will go to zeropots). Then, ZR=PR/2 (half of remainders monies will go to zeropots). Proceed to step 2432.

Step 2432 sets PS=PS−ZS (paypots get half of whole number monies, rounded up) and PR=PR−ZR (paypots get half of remainders monies, rounded up). When number of pots is being reduced, take the average of monies from pots being closed, and distribute to remaining pots.

Step 2434 asks if the number of pots is reduced (NEG=1?). If no, go to step 2436.

Step 2444 sets RP=sum of R(X) remainders for paypots to be closed out. Then set RZ=sum of R(X) remainders, for zeropots to be closed out. When pots are closed, these remainder R(X) accumulators, must be disbursed to other remainder R(X) accumulators.

Step 2446 asks if there are zeropots? If no, go to step 2454. When zeropots exist, they receive remainder R(X) monies disbursements.

Step 2448 sets RP=RP+RZ. The remainder from step 2426.

Step 2450 sets RZ=RP/2, to allocate half remainders to one of the (NZN) remainders R(X), for a remaining zeropot.

Step 2452 sets RP=RP minus RZ. This allocates half remainders to one of the (NPN) remainders R(X), for a remaining paypot.

Step 2454 (entered from steps 2446 and 2452) sets PR=PR+RP. This is a total paypot remainder.

Step 2456 sets ZR=ZR+RZ. This is a total zeropot remainder.

Step 2458 adds to all non-closeout pots: add PS to each paypot, and add ZS to each zeropot.

At step 2460 PR is added to only one non-closeout paypot remainder R(X). Then ZR is added to only one non-closeout zeropot remainder R(X). The selection of the receiving R(X) accumulators is arbitrary.

Step 2462 removes closeout paypots and closeout zeropots, and their remainder accumulators.

Step 2464 clears closeout flags from the pots that have been removed. They are already closed out. Proceed to step 2442.

Step 2436, (entered from step 2434) sets contents of each of NPN paypots to PS and contents of each of NZN zeropots to ZS. That is, each of the paypots, (old and new) have the same money contents after the reallocation, and all zeropots have the same monies in them.

At step 2440, PR is added to only one (NPN) paypot remainder R(X). And ZR is added to only one NZN zeropot remainder R(X). Then go to step 2442.

Step 2442 sets PN to NPN, and ZN to NZN.

Step 2466 (entered from steps 2408, 2416, 2419 and 2442) exits the routine.

DETAILED DESCRIPTION—FIG. 25

Figure 25:
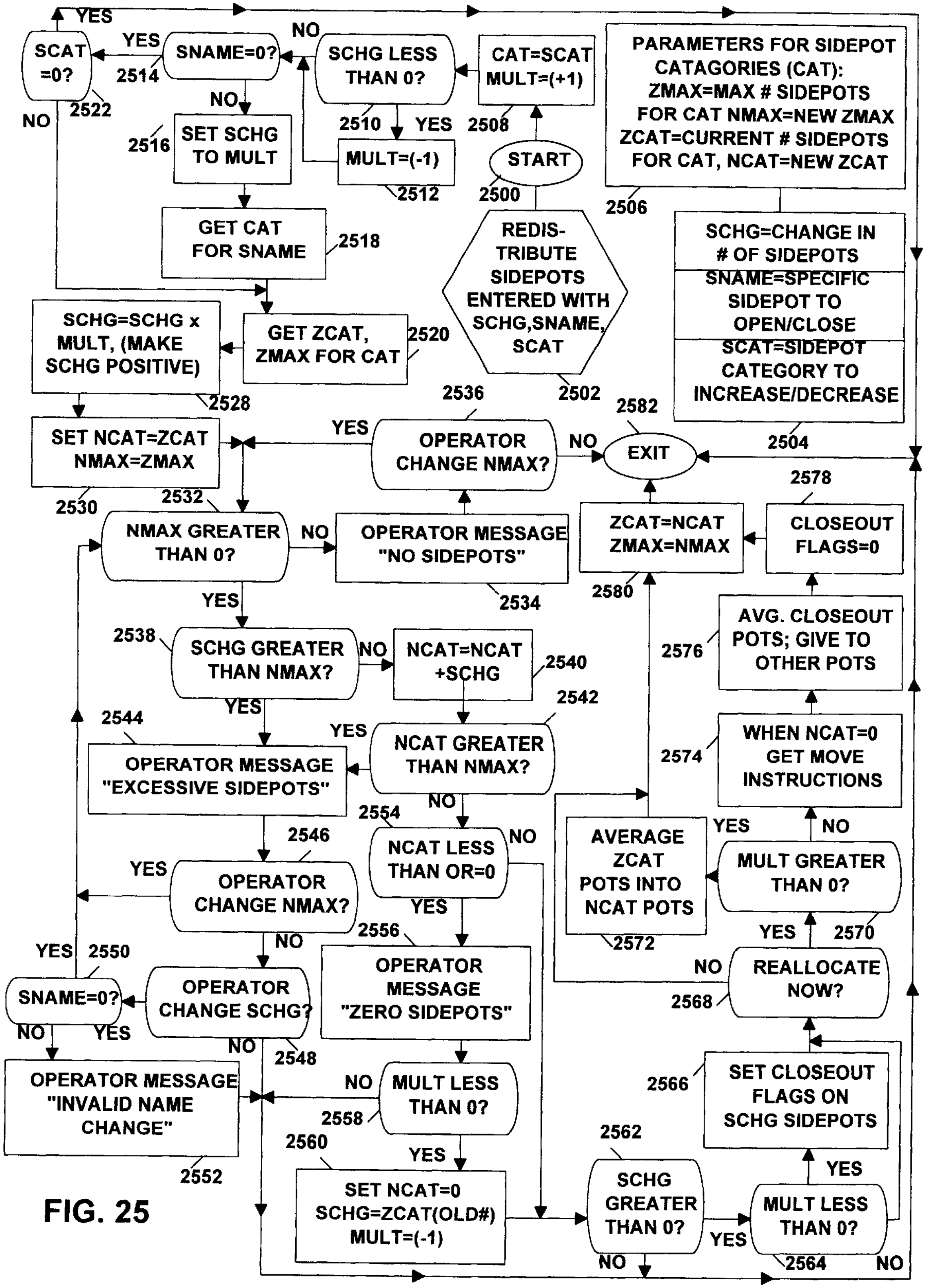
FIG. 25 is a flow chart subroutine to "Redistribute Sidepots" when there is a change in the number of sidepots according to the present invention.

FIG. 25 is a flowchart of subroutine to "Redistribute Sidepots" starts at step 2500, with commentary boxes (steps 2502 2504, and 2506).

This routine changes the number of sidepots, in a specified category. The 'category' is a grouping of like sidepots, and these sidepots are manipulated as a category group. One category might include payline row progressives, one for each payline. Another category might be size bet progressives, one sidepot for each betsize. Still another, might be for a category including various mystery bonuses.

Step 2502 specifies that routine must be entered with parameters: SCHG, SNAME, SCAT.

Step 2504 defines parameters: SCHG is the change in number of sidepots; SNAME is a specific sidepot to open or close; SCAT is a sidepot 'category' to increase or decrease in number.

Step 2506 defines system parameters for sidepot categories: ZMAX=the current maximum number of sidepots; NMAX=the changed new value of ZMAX; ZCAT=current number of sidepots; NCAT=the changed (new) value of ZCAT. Go to step 2508.

Step 2508 defines and sets temporary variables, CAT and MULT, as follows: "CAT"="SCAT"; "MULT=(+1)".

Step 2510 asks if the number of sidepots decreases (SCHG is less than 0?) If no, proceed to step 2514.

Step 2512 sets parameter "MULT=(−1)". The MULT indicator is used as an increase/decrease indicator.

Step 2514 asks if SNAME=0? If a specific sidepot name is provided, this means only one specific named sidepot is to be added or deleted. If no, go to step 2516.

Step 2522 asks if SCAT=0? If yes, go to exit, step 2582. Both the sidepot name and category are not supplied. We can't do anything with this call. If no, go to step 2520.

Step 2516 (entered from 2514) sets SCHG to MULT. When SNAME is set, the number of sidepots can only increase/decrease by 1.

Step 2518 gets the "CAT category for the sidepot specified by SNAME". Proceed to step 2520.

Step 2520 (entered from steps 2518 and 2522) gets the current CAT category parameters: ZCAT (current number sidepots) and ZMAX (maximum number sidepots).

Step 2528 makes SCHG positive by equation: "SCHG=SCHG×MULT". Thus, the absolute increase or decrease will be expressed as a positive number.

Step 2530 sets the initial settings for the variables equal to the current values: NCAT=ZCAT and NMAX=ZMAX. These variables may change during the operation of the routine, and will be set in ZCAT and ZMAX at step 2580.

Step 2532 asks if the maximum number is large enough (NMAX greater than 0?). If yes, go to step 2538.

Step 2534 displays operator message "No sidepots".

Step 2536 asks if operator changed the value of NMAX? If no, go to the exit, step 2582. If yes, go back to step 2532.

Step 2538 (entered from step 2532) asks if change number is too large (SCHG greater than NMAX?). If no, go to step 2540.

Step 2544 displays operator message "Excessive side-pots"

Step 2546 asks if operator changed NMAX? If yes, go back to step 2532.

Step 2548 asks if operator changed SCHG? If no, go to exit, at step 2582.

Step 2550 asks if SNAME=0? If yes, go to step 2532. We already came to this step with the legitimate setting for SCHG, namely '1', if SNAME is set.

Step 2552 displays operator message "Invalid name change". Then, proceed to the exit, step 2582.

Step 2540 (entered from 2538) adds the increase/decrease number to get the new number. "NCAT=NCAT+SCHG".

Step 2542 asks if the new current number is too large (NCAT is greater than NMAX?). If yes, go to step 2544, discussed earlier.

Step 2554 asks if NCAT is less than or equal to 0? If no, go to step 2562, discussed later.

Step 2556 displays operator message "Zero sidepots".

Step 2558 asks if MULT is less than 0? If no, proceed to the exit, step 2582. It is invalid to increase (MULT greater than 0) number sidepots to zero. This implies the number was negative before.

Step 2560 sets the following parameters: NCAT=0; SCHG=ZCAT; (old number), MULT=(−1).

Step 2562 (entered from steps 2554 and 2560) asks if SCHG is greater than 0? If no, go to exit, at step 2582. Obviously, no change would occur.

Step 2564 asks if MULT is less than 0? If no, proceed to step 2568.

Step 2566 sets closeout flags on number SCHG sidepots. Closeout flags cause sidepots to be removed from the system when their contents go to zero value.

Step 2568 (entered from steps 2564 and 2566) ask if sidepots should be reallocated immediately. If no, go to step 2580. Otherwise, we want to disburse the existing monies in the category to the new number of sidepots, and do it immediately.

Step 2570 asks if number sidepots are being increased (MULT is greater than 0?). If no, go to step 2574.

Step 2572 averages all of the old pots and disperses the average value into each of the new pots. There are more pots. The average value is computed by summing the (number of) old pots and dividing by the number of new pots.

Step 2580 (entered from steps 2568, 2572, and 2578) resets the category count parameters to the new values: "ZCAT=NCAT; ZMAX=NMAX". Proceed to step 2582, the exit.

Step 2574 (entered from step 2570) gets instructions from the operator how to transfer the monies when NCAT=0. The new number of sidepots is zero, and any monies have to be transferred to non-sidepots. So, the system operator must definitely provide direction.

Step 2576 averages the pots being closed out and distributes the money equally to the remaining pots, as directed by the system operator. There are fewer pots. The average value is computed by summing the closed out pots dividing by the number of new (remaining) pots.

Step 2578, clears the closeout flags, since the closeout function has already been accomplished. Proceed to step 2580, explained above.

Step 2582 exits from this routine.

DETAILED DESCRIPTION—FIG. 26

FIG. 26 is a subroutine to handle system management functions to "Activate Deactivate Pots" according to the player pool of FIG. 1. They can be activated (ON) or deactivated (OFF) according to our present invention of FIG. 1. The system operator can move monies between pots, as necessary; open pot slots; close pot slots after moving any monies to other pots. Non-player money pots will be handled separate from player pots; possibly, accounting personnel will control non-player monies.

Start at step 2600 with the attached commentary boxes, steps 2602 and 2604.

Step 2602 states routine is entered with parameters: PT, state, move, and close.

Step 2604, explains that PT=pot number, state=on/off, move=transfer monies (PT) to pot (move), close=open/close allocated slots for pot (PT).

Step 2606 asks if ON/OFF state has not changed (state=old state (PT)?) If yes, go to step 2610.

Step 2608 sets Pot state (PT)=state.

Step 2610 asks if money is not to be transferred? (Move not equal to 0?) If no, go to step 2614.

Step 2612 adds contents of pot (PT), to pot (move); then sets pot (PT) to 0.

Step 2614 asks if the close parameter directs close of Pot (PT)? If no,

Step 2616 closes all pot (PT) related slots after requiring operator 'MOVE' actions (see step 2612, above) for non-empty pots (PT).

Step 2618 asks if open? If no, proceed to step 2622, the exit.

Step 2620 opens full allocation of slots needed for pot (PT), then the new slots are zeroed.

Step 2622, exits the routine.

DETAILED DESCRIPTION—FIG. 27

FIG. 27 is a subroutine of how to "Cashout" according to the player pool method of the present invention.

Subroutine "Cashout" starts at step 2700 with commentary box at step 2702, to identify subroutine.

Step 2704 sets variable C to current value of player credits.

Step 2706 asks if there are player's credits? If no, go to the exit at step 2724.

Step 2708 asks if all committed funds have been bet, used up (stash (X)=0?). If yes, go to step 2716.

Step 2710 asks if player is authorized to cash out stash? Where allowed, system design allows for uncashed stash (X) credits to be escrowed for the player at a later time. If yes, go to step 2720. There is a possibility that committed money cannot be backed out, and if so, proceed to step 2712.

Step 2712 displays message, "Cannot cashout stash of $xx."

Step 2714 sets C equal to number of credits minus stash (X). Thus, only the credits greater than the stash (X) are paid. Proceed to step 2716.

Step 2720 (entered from step 2710) calls subroutine "Change Pots" from FIG. 11, to adjust the pool downward by setting to the negative stash amount (backs out stash), and sets "V=minus stash (X) and J=paytable.

Step 2722, after the paytable is updated, set stash (X)=0. The operation continues to step 2716.

Step 2716 (entered from steps 2714 and 2722) pays C, the number of credits which can be cashed, and a message is displayed, "PLAYER PAID C".

Step 2718 subtracts amount paid 'C' from the credits. This leaves only uncashed stash (X) monies remaining in the credits variable. The system operator can authorize the player to receive escrow credits, so play can be resumed at a later time. This can be done through computer accounting, or through printed tickets to be used with proper identification.

Step 2724 exits the routine.

DETAILED DESCRIPTION—FIG. 28

FIG. 28 is a subroutine that performs general sidepot computations, according to the non-banking player's pool method of FIG. 1.

Subroutine "Process Sidepots" starts at step 2800, with commentary boxes (steps 2802 and 2804).

Step 2802 specifies the parameters needed: PT=paytable, PL=payline, G=game, and win (the win amount, without sidepots).

Step 2804 describes equations for some typical generalized sidepot computations (GSC equations). PCT=a prespecified (negative or positive) percentage for a specific sidepot. AMT=sidepot (X) times PCT. Win=WIN plus AMT. The sidepot amount remaining is calculated: "Sidepot (X)= sidepot (X) minus AMT". That is, new sidepot value equals old value, less the amount paid.

Sidepot ID identifies specific sidepot data. These pool types are for Jackpots, and other important events. They accumulate progressives for certain paytable cells, defined by bet amount and paytype. For example, a pair handtype with a betsize of 250, may trigger a sidepot payout for that event.

Even more startling, each specific symbol in a game may have its own sidepot. For a card game, the 9 of hearts sidepot, is different than the 4 of dubs sidepot. In a slot game, a cherry symbol sidepot is not the same as the orange symbol sidepot. When there are multiple cherry symbols, each cherry symbol has its own sidepot.

Player winnings could be based upon the sidepot combinations (additive or multiplicative) for the symbols drawn, rather than for a handtype, such as a "full house". Similarly, symbols in slots, Keno, Bingo, scratchers, etc. can carry sidepots along with them for extra excitement.

Two examples follow for the use of symbol sidepots:

Slot Reel "line-sample" is drawn, such as "cherry, seven, bell", and displayed along with the "sample-amount" computed for that symbol combination. When the final slot game reel spin, matches the "line-sample", the player wins the "sample-amount".

Video Draw Poker 5-card "hand-sample" is drawn and shown to the player (along with the "sample-amount" computed for that symbol combination), before cards are discarded. If the final player cards (regardless of order) after discards, matches the "hand-sample" cards, the player wins the "sample-amount".

Step 2806 (entered from step 2800) asks "Are there Payline Sidepots?" If no, drop down to step 2810.

Step 2808 processes all payline specified sidepots with GSC equations.

These payline sidepots can be used for progressives, different bonuses based on the betsize, and so on.

Step 2810 asks, "Are there any paytable sidepots?". If no go to step 2814.

Step 2812 processes all paytable sidepots with GSC equations. Paytable sidepots may contain some special bonus, such as mystery bonuses.

Step 2814 asks, "Are there Game Sidepots?" If no, go to step 2718.

Step 2816 processes all game sidepots with GSC equations. Game sidepots provide for super Jackpots for the specific game being played across many computer linkups.

Step 2818 asks, "Are there System sidepots?" If no, exit the program at step 2822.

Step 2820 processes all system sidepots with GSC. System sidepots are appropriate for the collection of rent monies. If appropriate, a rent sidepot could be used to collect rent as a percentage player winnings. The player pays rent only after wins. Less rent is paid, when the pool is small, since the winnings are less with a smaller Maxwin.

Exit at step 2822. A commentary box at step 2824, explains routine returns with the win amount changed by the sidepots.

DETAILED DESCRIPTION—FIG. 29

FIG. 29 is a subroutine to instruct when and how to display paytables according to our present invention.

Subroutine "Display Paytable" starts at steps 2900, with two commentary boxes (steps 2902 and 2904).

Step 2902 identifies the routine entered with: PT and PL.

Step 2904 defines parameters; PT=paytable and PL=payline. The system operator sets the Maxwin threshold parameters for flashing the monitor that a significant change occurred to Maxwin: MIN (PT) minimum Maxwin value; and PCT (PT) the required percentage change.

Step 2906 asks if jackpot (PT) was paid? If yes, go to step 2914.

Step 2907 defines and sets MW equal to the larger of the previous Maxwin (PT) or the current Maxwin (PT).

Step 2908 asks if MW is greater than MIN(PT)? This step is preparing for the Maxwin threshold test. It causes a flashing screen when the Maxwin changes by more than a certain percentage. This alerts the player, who might want to switch game types or paytables. If no, go to step 2916.

Step 2910 computes DIFF=the absolute change of the current Maxwin (PT) minus the previous Maxwin (PT). This absolute value for DIFF is always a positive number.

Step 2911 calculates PCT, with equation: PCT=MW×PCT (PT).

Step 2912 asks if DIFF is greater than PCT? If no, go to step 2916.

Step 2914 sets FLASH to ON.

Step 2916 sets J=1, Max J=number of paylines.

Step 2918 asks if J is greater than Max J? If yes, go to step 2930.

Step 2920 displays payline (J).

Step 2922 displays the payline (J) sidepots.

Step 2924 asks if PL=J? This PL parameter informs the routine which payline won, so it can be highlighted. If no, go to step 2926.

Step 2928 highlights the display of payline (J).

Step 2926 adds one to J. Proceed to step 2918.

Step 2930 (entered from step 2918) displays paytable (PT) sidepots which are associated with paytable (PT). This step shows the special Jackpots which appear at the paytable level.

Step 2932 asks if FLASH is ON? If no, go to the exit (step 2936).

Step 2934 flashes the display of the paytable "ON and OFF" while alternating color changes.

Step 2935 asks if player wants to change pots? If no, proceed to step 2936, the exit.

Step 2938 lets player change Paytable PT to a new paytable selection. The player was alerted that a significant change occurred in the Maxwin for the current selection. The player has decided to change to another available paytable.

Step 2940 sets JKPT (PT)=0, PL=0 and FLASH=0. Go back to step 2916, explained earlier, and follow the steps as outlined before, to the exit (step 2936).

Step 2936 exits from routine.

DETAILED DESCRIPTION—FIG. 30

Figure 30:
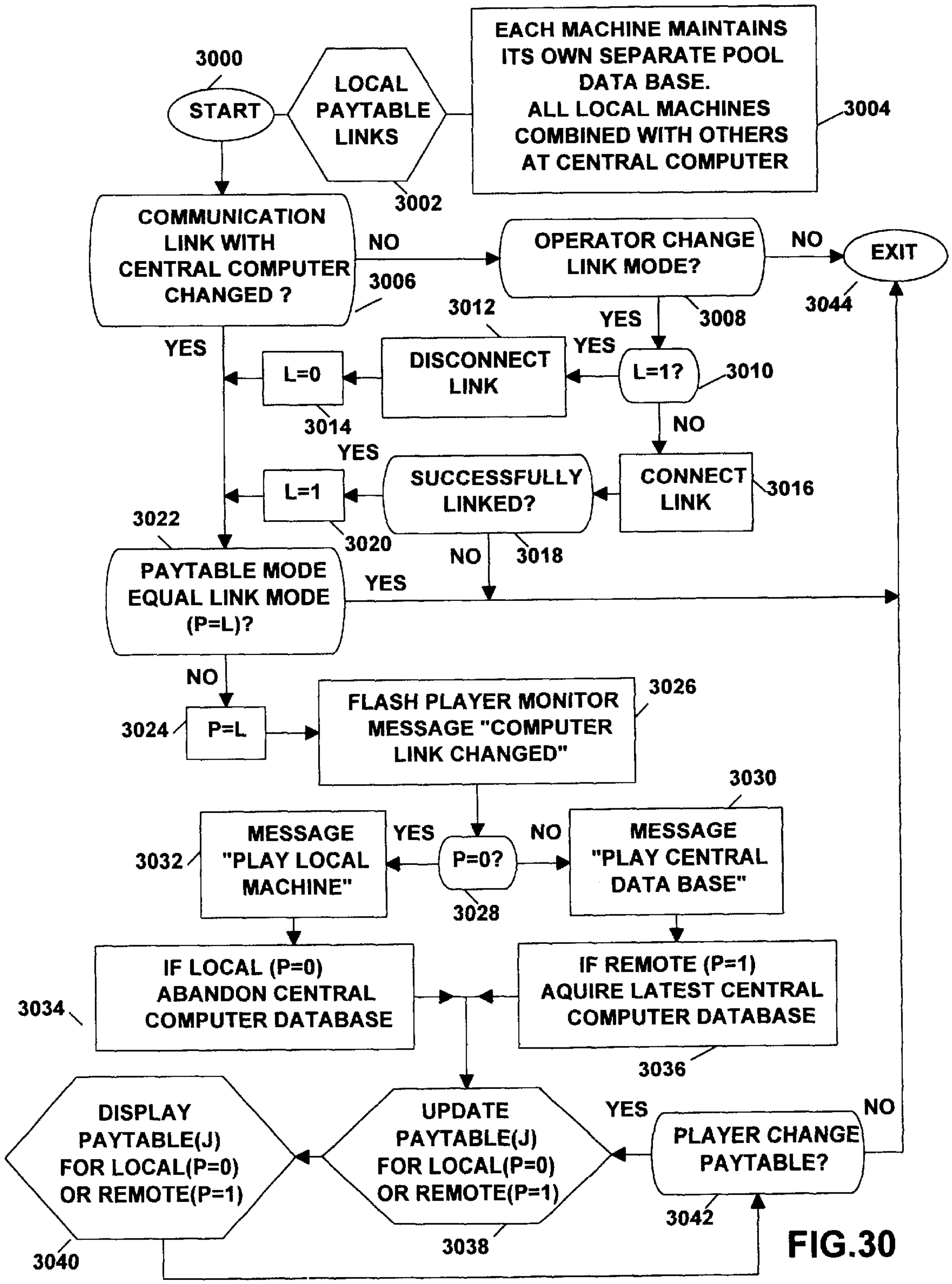
FIG. 30 is a flow chart subroutine showing how a machine of FIG. 1 uses a Local paytable linked to a central computer according to our invention.

FIG. 30 is a flowchart of subroutine "Local Paytable Links". This routine requires that the pool data base structures be, generally, the same in the central computer and local game machines of FIG. 1. The central computer combines the pool amounts from linked game machines. Each game machine uses the central pool when communication links are active. When communication is disabled, the game machine uses its own pool data.

When communication links are active, game machine activity is sent to the central computer. This pool change information is combined with similar data from other game machines. This creates the centralized pool data base. This centralized pool allows bigger jackpots and progressives, so linked game machines can attract more players.

Communication links with the central computer can be broken. This routine disengages the game machine and gives it a separate pool. Pre-established protocols allow the local machine to take part of the centralized pool, when it disconnects from the central computer.

The primary restriction is that no banked money can be introduced into the local machine's pool. Only player money from the central pool can be used. Whatever the game machine claims for its pool, the central computer subtracts from the central pool. The local machine won't give extremely large jackpots (as when connected), but it will provide entertainment and reasonable payoffs.

The central computer, under pre-established rules, knows how much of the pool the local game machine took with it. So, when communications are severed, the central computer removes that part of the pool from its data base (either automatically or under system operator direction).

When computer links come up again, the two systems compare notes. Each believed the other used certain parts of the pool. Now, it can validate this assumption, and make necessary adjustments. The central computer adjusts for the change in local machine data. Thereafter, centralized pool amounts are constantly supplied to the local machine, to protect against similar communication breakdowns, in the future.

In summary this routine insures that a stand alone game machine has a sufficient pool, without violating the non-banking rule, when the central computer is lost.

FIG. 30 starts at step 3000, with commentary boxes (steps 3002 and 3004), which identify this routine and summarize the above dissertation.

Step 3006 asks if the communication link with the central computer has changed (interrupted or re-established)? If yes, go to step 3022.

Step 3008 asks if the operator has changed the link mode? If no, go to step 3044, the exit.

Step 3010 asks if the link mode was remote (L=1?), that is communicating with the central computer? If no, go to step 3016.

Step 3012 disconnects the link with the central computer.

Step 3014 sets the link mode to local status, L=0. Then proceed to step 3022.

Step 3016 (entered from 3010) attempts to establish a communication link with the central computer.

Step 3018 asks if the communication link was successfully established? If no, go to step 3044, the exit.

Step 3020 sets the link status to remote, (L=1) to inform that the game machine is now communicating with the central computer.

Step 3022 asks if the previous paytable mode equals the current link mode? (P=L?). If yes, there is nothing to do, so exit at step 3044.

Step 3024 sets the paytable mode to the link mode, to bring them into conformity (P=L).

Step 3026 flashes a message that the computer link changed.

Step 3028 asks if the new paytable mode is in local state (P=0?) If no, go to step 3030.

Step 3032 displays a message, "Play local machine".

Step 3034 resets the local pool to a pre-specified portion of the central pool. It abandons the central computer (pool data) until the communication links are re-established.

Step 3038 updates the paytable to reflect the current paytable mode to use the data base appropriate at this time.

Step 3040 displays the paytable (J) to the player for the appropriate data base this time.

Step 3042 asks the player if he wants to change the paytable selection. The change in paytable data bases (from remote to local, or vice versa) may cause the player to have a preference for another game or another paytable. If no, go to the exit, step 3044. If yes, go to step 3038, which was discussed above.

Step 3030 (entered from step 3028) displays the message, "Play central Database".

At step 3036 if remote (P=1) acquire the latest central computer data base by sending change information for the local game machine since communications were broken. In return, receive the new combined data base from the central computer. After necessary exchange of information, the game machine re-enters combined pool play with the other game machines. The central computer pool is designed to improve player appeal with larger jackpots and other features. Proceed to step 3038, which was discussed earlier.

Step 3044 exits the routine.

DETAILED DESCRIPTION—FIG. 31

Figure 31:
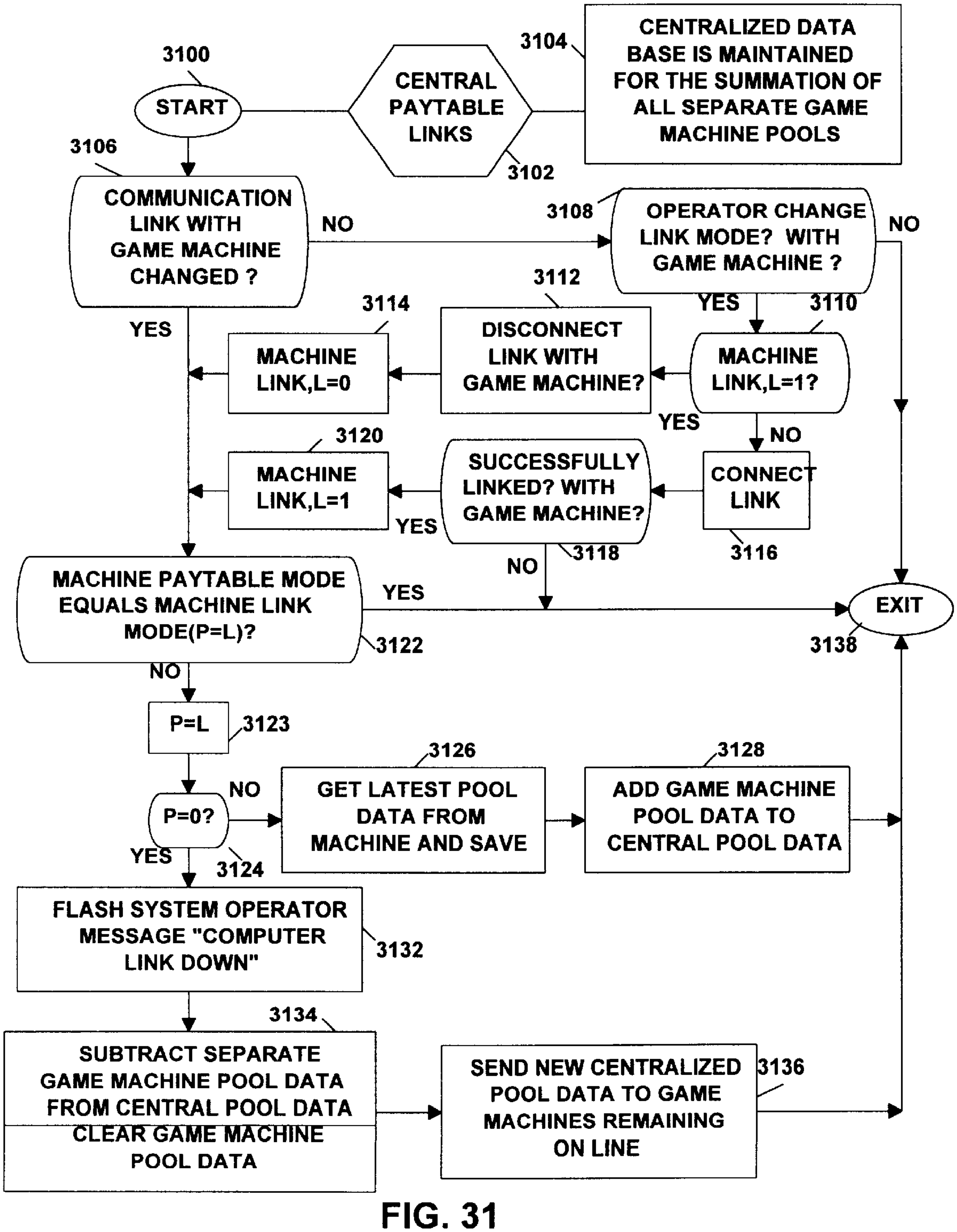
FIG. 31 is a flow chart subroutine that resolves conflicts between the central computer and the linked local computer according to the machine of FIG. 1 according to our invention.

FIG. 31 subroutine "Central Paytable Links" determines usage of the pool data (centralized) at the central computer. This is critical when the central computer and game machine of FIG. 1 change their communication link status.

When the two are communicating, the central computer pool data prevails. However, certain conditions cause the central computer to terminate the link with the game machine. No communication for X (system defined) seconds, causes termination. So will system operator action.

This central computer routine makes data base decisions when local game machines are taken off-line. Then, the central computer deducts a portion of the centralized pool from the combined data pool.

The game machine continues play with an amount equal to the deducted pool. The separated game machine adapts to its smaller pool, and operates, as if the central computer doesn't exist. This allows both ends of the spectrum to continue servicing customers, with minimal down time.

When the two systems re-engage (link-up), this central computer routine adjusts the centralized pool for the game machine activity, that occurred while separated.

The newly synchronized pool data is then sent to all game machines. Thereafter, the central computer constantly supplies central pool information to all game machines. This readies them for any communication interrupts, in the future.

Start at step 3100 with commentary boxes at steps 3102 and step 3104 identifying the routine with a summary of the above discussion.

Step 3106 asks if communication link status (interruption, re-establishment) with a game machine has changed. If yes, go to step 3122.

Step 3108 asks if the operator has changed the link mode with a game machine? If no, go to step 3138, the exit.

Step 3110 asks if the link with the game machine (L=1?) is active? If no, go to step 3116.

Step 3112 disconnects the communication link with the game machine.

Step 3114 sets the machine link (L=0) status to local, that is the machine is now off-line to the central computer. Proceed to step 3122.

Step 3116 (entered from step 3110) attempts to connect a link with a game machine.

Step 3118 asks if the link was successfully achieved with the game machine? If no, go to step 3138, the exit.

Step 3120 sets the game machine (L=1) link status to remote, that is the game machine is communicating with the central computer.

Step 3122 (entered from steps 3106, 3114, and 3120) asks if the game machine paytable mode equals the game machine link mode (P=0), so far as the central computer is concerned. If yes, paytable mode and link mode are already synchronized, therefore, go to step 3138, the exit.

Step 3123 sets the paytable mode for the game machine to the value of its link mode (P=L).

Step 3124 asks if the paytable mode is local (P=0?). If yes, go to step 3132.

Step 3126 acquires the latest pool data from the game machine over the communication lines. It uses the latest pool data from the game machine to synchronize the two systems back in phase with each other. That is, the change in local pool data will update the central pool data base, relative to pool amounts (won or lost) from the time the communications were severed. Then the new centralized pool data information is sent to all game machines.

Step 3128 adds the new pool data from game machine to the central pool data, restoring the data as if the communication link was never disrupted. Proceed to step 3138, the exit.

Step 3132 (entered from step 3124) flashes the message to the system operator, "The computer link is down".

Step 3134 subtracts the pre-specified agreed amount allocated to the game machine pool, from the combined central pool data. This allows the central computer to go on servicing the other game machines with a reduced pool. And the specific game machine still has enough pool monies to attract players. The central pool will re-acquire much of the lost pool data when the communication link is up again.

Step 3136 sends new centralized pool data to those game machines still remaining on-line. Then proceed to step 3130, discussed above.

Step 3138 exits the routine.

DETAILED DESCRIPTION—FIG. 32 PLAYER POOL NETWORKS

Figure 32:
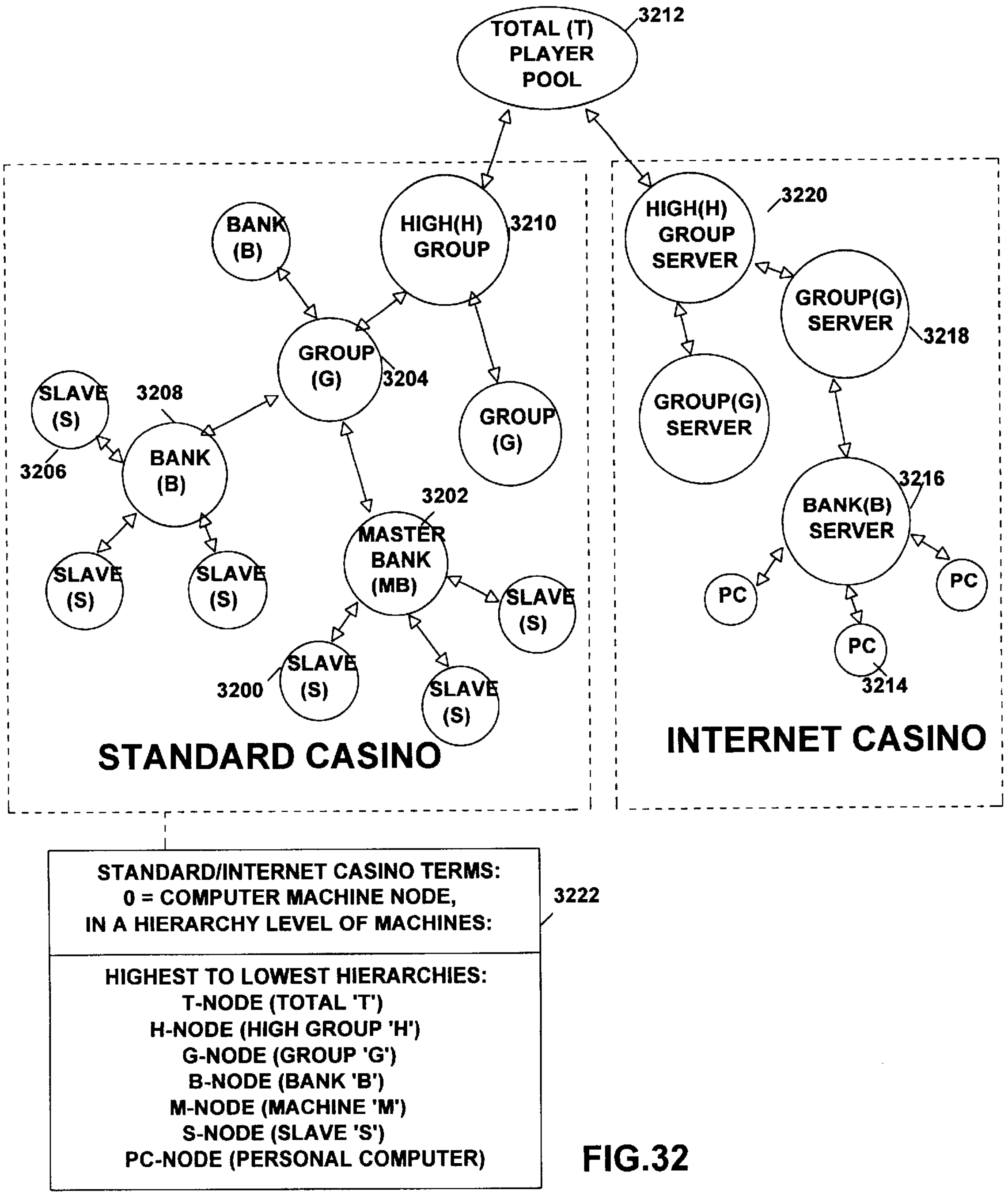
FIG. 32 shows a player pool network which supports both a standard casino, and an Internet casino according to our invention.
Figure 34:
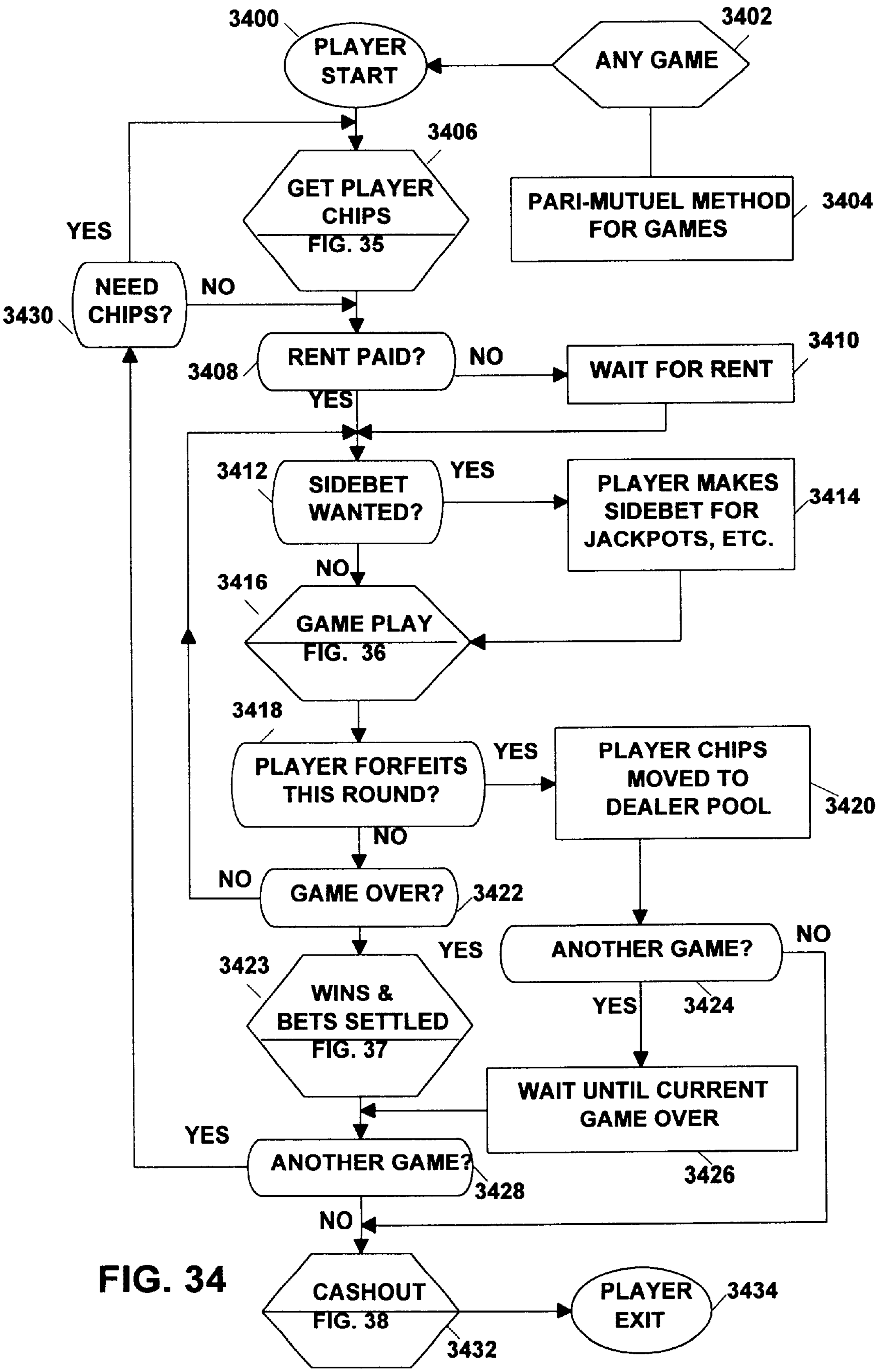
FIG. 34 is a flowchart which shows the methodology for "Any Pari-Mutuel Game" according to our present invention.

FIG. 32 shows a player pool network which supports both a standard casino, and an Internet casino with a commentary box (step 3222) which gives the (Standard/Internet) casino terms: 0=Computer Machine node, in a hierarchy level of machines. Also, the highest to lowest hierarchy levels are listed as; T-node (Total 'T'); H-node (High Group 'H'; G-node (Group 'G'); B-node (Bank 'B'); M-node (Machine 'M'); S-node (Slave 'S'); PC-node (Personal Computer The data flow diagram for the standard casino environment shows two-way flow of data between all hierarchy levels in the system. This is not typical for casino systems. Most casino management systems capture one-way data flow from machines, and then provide summary management information. There is limited, or no, communication from the highest hierarchy level back down the line to individual machines.

A Pari-Mutuel management system requires that pool totals be reported in both directions. Lower level pool data must be uploaded to contribute to the total player pool. The highest level "total pool" summaries must be downloaded to lower levels for paytable displays, and win computations.

Machine slave (S) 3200 reports to a Master/Bank (M/B) machine 3202, which controls the bank (B) of machines, which includes itself. Node 3202 totals the pool data for all slaves (S's) and itself. This summary pool data is then sent to each of the slave (S) machines. It is also sent to Group-node 3204.

Master bank (M/B) 3202 is an example of one machine functioning simultaneously at two hierarchy levels, both as a machine (M) and a bank (B). Contrast this with bank (B) machine 3208. (It does not operate at two hierarchy levels). It a bank-node only, and its main function is to control slave (S) machines, e.g. node 3206.

Group (G) machine 3204, combines pool data from two banks, bank (B) 3202 and bank (B) 3208. This combined (G) 3204 pool data is uploaded to the High-Group (H) 3210 node, which combines it with other Group (G) pool data. In turn, the combined High-Group (H) 3210 pool data is uploaded to the T-node (T) 3212, for inclusion in the Total Player Pool. In return, the Total Player Pool (T) data at 3212, is downloaded to its connecting nodes. Each (T, H, G, B, M) node downloads the total player pool amount (PPA) to each of its connecting nodes. For example, the T-node 3212 supplies the PPA to all H-nodes (3210 and 3220). The H-nodes sends the PPA to each of their connected G-nodes (3204, 3218, etc). Then, the G-Nodes transmit the PPA to each of their connected B-nodes (3202, 3208, 3216, etc.). Finally, the B-node sends the PPA on to each of their connected S-nodes and PC-nodes (3200, 3206, 3214, etc.). In this way, all machine nodes report the same PPA throughout the Pari-Mutuel system.

Notice the similarity in Internet hierarchy levels with that for a standard casino. The addressing scheme used to transmit pool data is essentially a duplicate of the Internet.

In fact, the Internet protocols can be used unchanged. Therefore, the same player pools can be used simultaneously for a standard casino and an Internet casino.

DETAILED DESCRIPTION—FIG. 33A (LAYER POOL DATA PACKET)

FIG. 33A shows a typical data packet for a Player Pool System. It includes the information needed to report Player Pool Data that is uploaded and downloaded through the communication network. There is at least one data line entry in the data packet, for each existing hierarchy level (T, H, G, B, M). Each level of machine in the Pari-Mutuel system picks off the information it needs. Or it contributes to it, and passes on the updated pool information.

TYPE CATEGORY

The Type category identifies the level of pool data. This Type can be the same as the communication address for the node. For instance, it is often the Internet address for the machine.

ID-1 through ID-N, are entries for the immediately lower, hierarchy nodes. Added together, their data does total to the pool summary data for this packet, hierarchy level. The lowest type category (T, H, G, B, M) which is non-zero identifies the packet hierarchy level. Zero value type categories, imply those types have their data included in the higher level summary data, of this data packet.

Each L-level (except total 'T') can be configured to have the next higher level contained within a machine from the L-level. For example, a set of machines (M's) can form a bank (B). The bank (B) level could be co-resident in one Machine (M) from the bank (B) machines. This is accomplished by designating one machine (M), as the sole 'bank' machine for that bank (B). It is classified the 'master' (MB) machine, while the other bank machines are classified as 'slaves' (S).

The Master bank (MB) machine receives and accumulates pool data from all machines in the bank (including itself) to form the combined Bank (B) Pool. The Master machine transmits this bank (B) pool total to each of the slaves, and also to the group (G) level, as well. Of interest, the group (G) machine could be a designated Master machine from a set of bank (B) machines.

Master machines and Slave Machines are interchangeable. That is, a Slave machine can become a Master machine, and vice-versa. This is transparent to the system, since pool data is always being exchanged between a Master machine and its Slave machines. Simultaneously, pool data is continuously being shared with higher hierarchy level machines. Constant sharing of information insures that all machines have current pool data.

OTHER CATEGORIES

The other categories represent a sample of the data included in the player pool data packets, for each hierarchy level:

*Number of Machines—Count of Machines;

*PPA $—Player Pool Amount (dollars);

*# UP Operating—Count of operating machines;

*Being Played—Count of machines now being played;

*Master/Slave—Node acting as 'master' for machines at same level, or as 'slave';

*Game/Paytable—Each Game/Paytable combination may have a separate and distinct Player Pool, that is different from all other Game/Paytable combinations. The total pool for all Game/Paytable combinations has a zero value for both Game ID and a paytable ID.

*Sidepot ID—This identifies that the pool data relates to a specific sidepot. These pool types are for Jackpots, and other important events. They accumulate progressives for certain paytable cells, defined by bet amount and paytype. For example, a pair handtype with a betsize of 250, may trigger a sidepot payout for that event.

Even more startling, each specific symbol in a game may have its own sidepot For a card game, the 9 of hearts sidepot, is different than the 4 of clubs sidepot. In a slot game, a cherry symbol sidepot is not the same as the orange symbol sidepot. When there are multiple cherry symbols, each cherry symbol has its own sidepot.

Player winnings could be based upon the sidepot combinations (additive or multiplicative) for the symbols drawn, rather than for a handtype, such as a "full house". Similarly, symbols in slots, Keno, Bingo, scratchers, etc. can carry sidepots along with them for extra excitement.

*Zeropot ID—ID for refresher pools that refill other pools, which go to zero.

*Other Data—Rent data, and other management information is not shown.

The full player pool management system necessarily includes operator control data, such as machine status for: door open, management key turned, bill acceptor errors, communication line down, etc.

DETAILED DESCRIPTION—FIG. 33B PACKET LEVEL SETTINGS

FIG. 33B illustrates how Type categories are set, depending on the hierarchy level of the data packet (described for FIG. 33A).

T-LEVEL (TOTAL)

For example, a total 'T' packet level (non-zero T-ID) has zero settings for H-ID, G-ID, B-ID and M-ID. And ID-1 through ID-N are 'H-level' (Internet address?) identifiers, with accompanying H-level data, which totals to the T-level.

H-LEVEL (HIGH GROUP)

Similarly, a high-group 'H' packet level (non-zero T-ID and H-ID) has zero setting G-ID, B-ID, and M-ID. And ID-1 through ID-N are 'G-level' (Internet address?) identifiers, with accompanying G-level data, which totals to the H-level.

G-LEVEL (GROUP)

Likewise, a group 'G' packet level (non-zero T-ID, H-ID and G-ID) has zero settings for B-ID and M-ID. And ID-1 though ID-N are 'B-level' (Internet address?) identifiers, with accompanying B-level data, which totals to the G-level.

B-LEVEL (BANK)

It follows that, a bank 'B' packet level (non-zero T-ID, H-ID, G-ID and B-ID) has M-ID set to zero. And ID-1 through ID-N are 'M-level' (Internet address?) identifiers, with accompanying M-level data, which totals to the B-level.

M-LEVEL (MACHINE)

But, a machine 'M' packet level (non-zero T-ID, H-ID, G-ID, B-ID and M-ID) identifies one sole machine with an (Internet address?) identifier equal to M-ID. And ID-1 through ID-N are all set to zero. The required accompanying data is already contained in the one M-ID line entry. The M-level is equivalent to one I-level (individual machine, M).

S-LEVEL (SLAVE)

A slave (S) machine does not require entries for ID-1 through ID-N. It is primarily interested in the total Player Pool Amount (PPA$) for the T-Level. It uses this PPA for paytable displays and Win computations. But, the slave (s) uplinks its individual M-Level PPA to the bank machine, to contribute to the 'total' PPA.

DETAILED DESCRIPTION—FIG. 34

FIG. 34,

Step 3400 begins a flowchart which shows the methodology for "ANY Pari-Mutuel GAME", with two commentary boxes (steps 3402 and steps 3404).

Step 3402 indicates the flowchart is applicable for any game that can use the Pari-Mutuel method.

Step 3404 states the game uses a Pari-Mutuel method.

Figure 35:
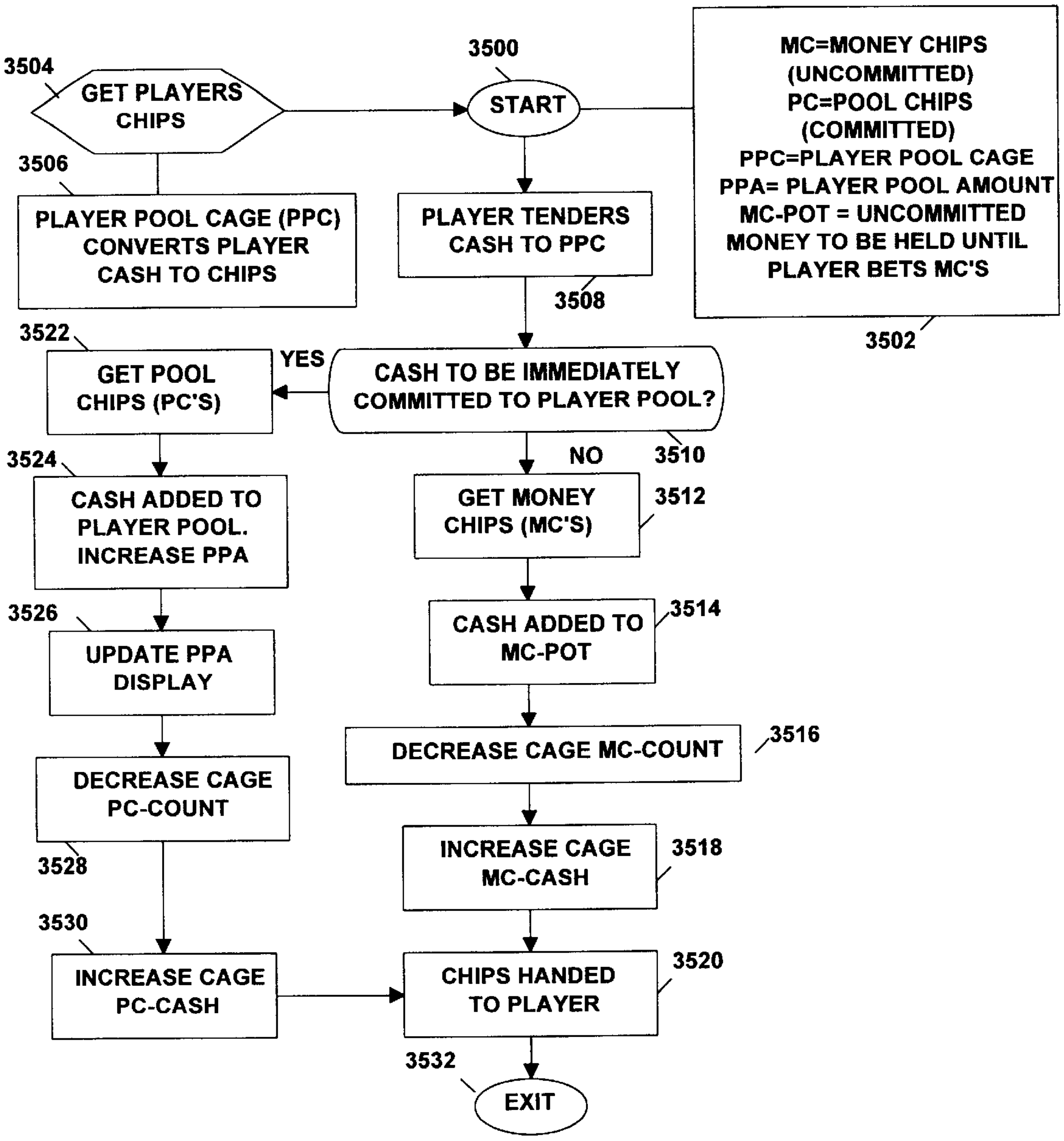
FIG. 35 is a flowchart of the methodology of money and chip handling according to our invention for table games.

Step 3406 (entered from step 3400) has the player use methodology "Get Player Chips" (FIG. 35), before playing the game.

Step 3408 asks if rent has been paid? If yes, go to step 3412.

Step 3410 waits for the player to pay the rent, unless the rent is to be paid out of bets (or winnings).

Step 3412 asks if a sidebet is wanted? If no, go to step 3416.

Step 3414 accepts player sidebets for any event appropriate for the game being played: Jackpots; guessing dice roll outcomes; betting on other players; (ad infinitum).

Step 3416 starts "Pari-Mutuel Game Play" (FIG. 36) methodology.

Step 3418 asks if player wants to forfeit this round? If no, go to step 3422.

Step 3420 moves the forfeited player's chips to the dealer pool.

Step 3424 asks if the player wants to play another game? If no, go to

Step 3432.

Step 3426 waits for the current game to be over. After the other players finish their turns, proceed to step 3428.

Step 3422 (entered from step 3418) asks if game is over? If no, go back to step 3412.

Figure 37:
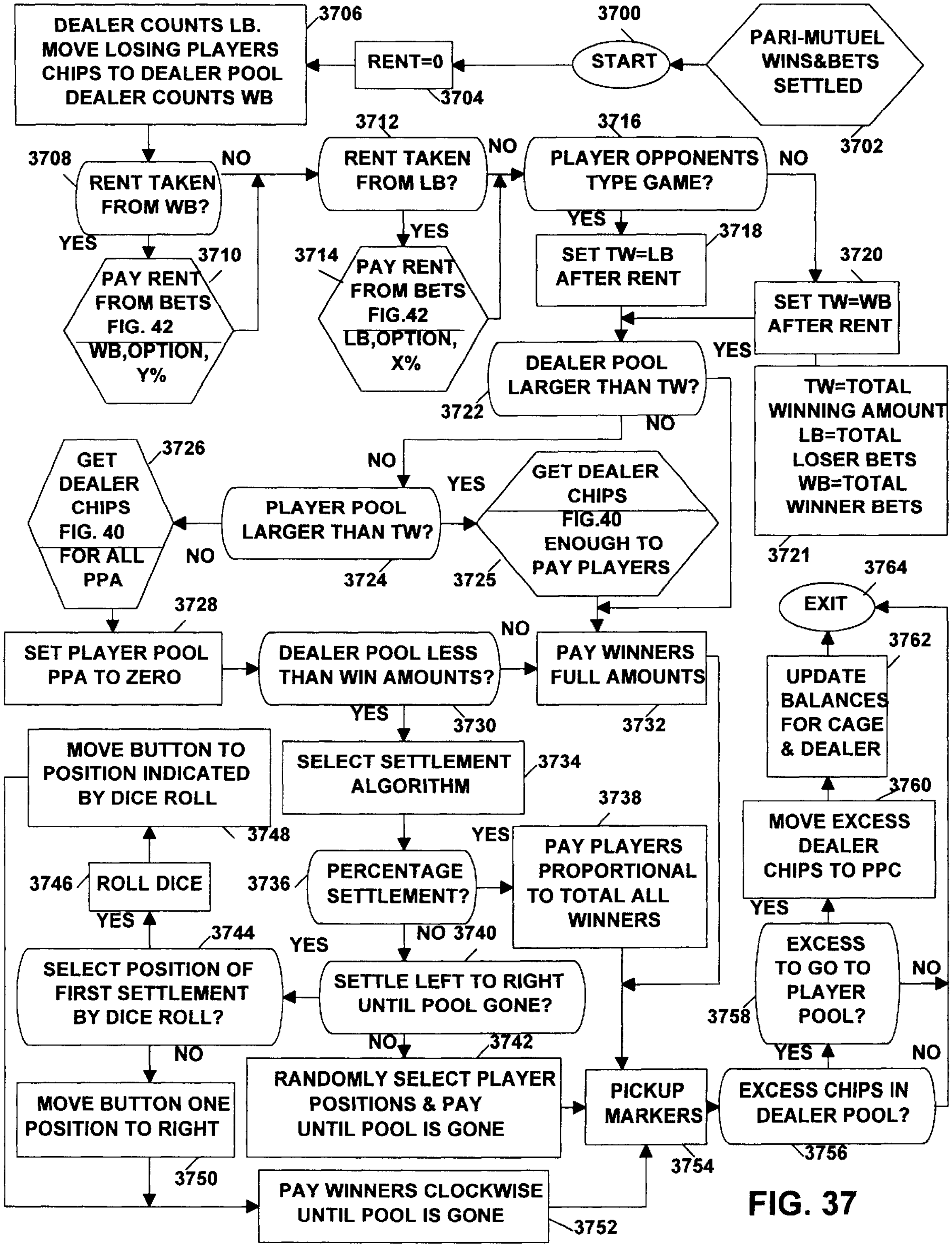
FIG. 37 is a table game method from used to pay winners from player pools according to our invention.

Step 3423 pays winners by using methodology of, "Pari-Mutuel Wins and Bets Settled" (FIG.37).

Step 3428 asks if player wants another game? If no, go to step 3432.

Step 3430 asks if more chips are needed. If yes, go back to step 3400. If no, go to step 3408 to see if more rent is needed.

Figure 38:
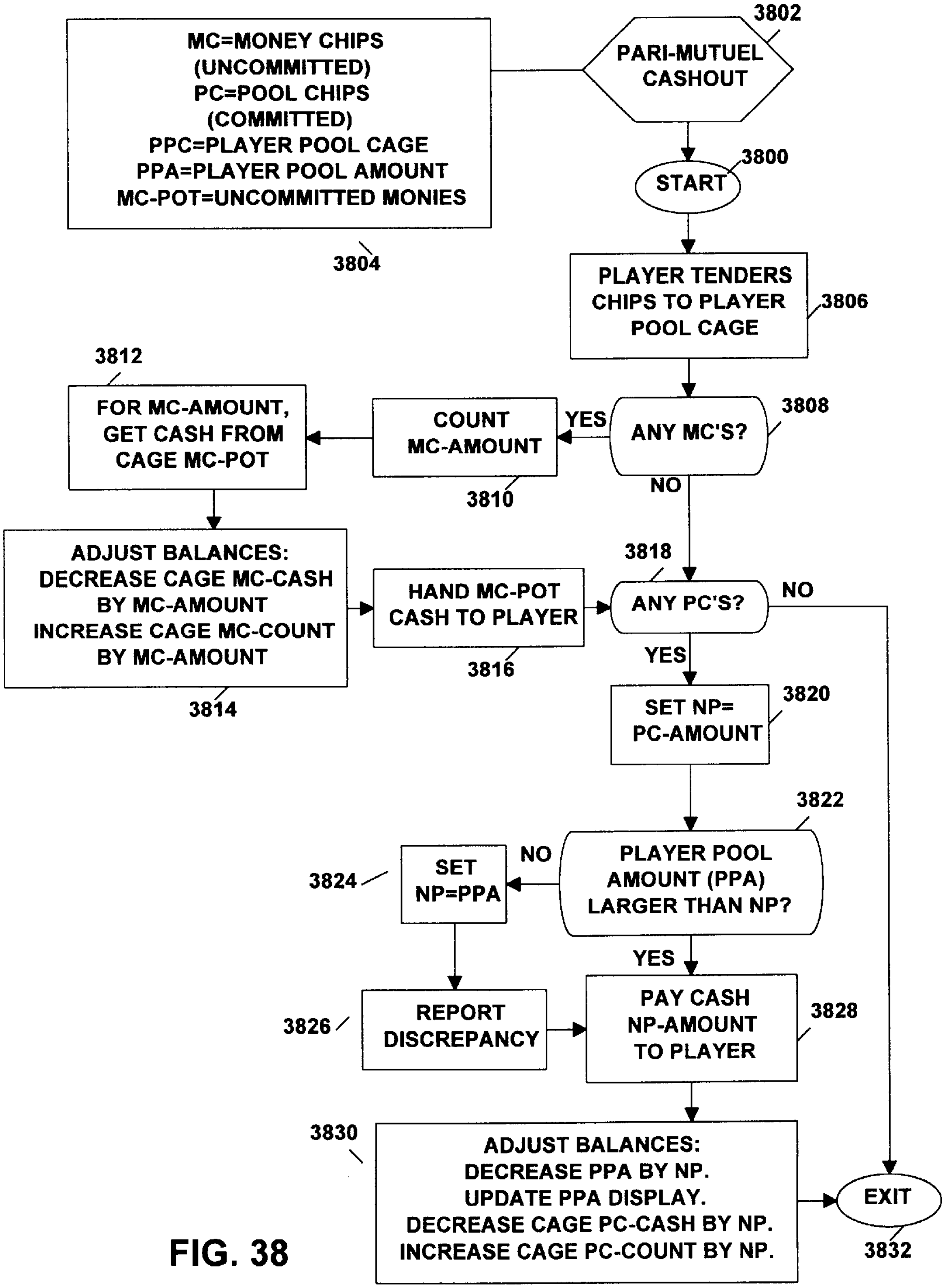
FIG. 38 is a flowchart depicting how a player cashes out using the Pari-Mutuel method according to our invention.

Step 3432 (entered from steps 3424 and 3428) lets the player cash in chips by using methodology of "Cashout" (FIG. 38).

Step 3434, exits the player from the Pari-Mutuel game.

DETAILED DESCRIPTION—FIG. 35

The methodology used to "Get Player Chips" starts flowchart at step 3500, with attached commentary boxes (steps 3502, 3504 and 3506).

Step 3502 defines abbreviations used in the flowchart: MC=Uncommitted Money Chips; PC=Committed Money Pool Chips; PPC=Player Pool Cage; PPA=Player Pool Amount; MC-Pot=Uncommitted Money to be held until the player bets MC's (thereby converting them to PC's).

Step 3504 identifies the flowchart logic as "Get Player Chips".

Step 3506 states the purpose of this flowchart; to show how the player pool cage (PPC), converts player cash to chips.

At step 3508 (entered from step 3500), the player tenders cash to the player pool cage (PPC). The PPC functions can also be performed by the dealer at the table. Player cash would be deposited in a money slot, and the dealer would give the player either MC's, or PC's.

Step 3510 asks if player cash is to be immediately committed to the player pool? That is, increase the player pool before the player bets the money (or equivalent chips). If yes, go to step 3522.

Step 3512 gets uncommitted money chips (MC's), which can be converted to cash at anytime. This is true, regardless of the size of the player pool, since MC's represent money that has not entered the player pool.

Step 3514 places the player money in the MC-POT (the cash reserves used to cash MC's).

Step 3516 decreases the value of the cage MC-Count, which is the count of MC's held by the PPC.

Step 3518 increases the amount of cage MC-Cash, which is the recorded accounting value for monies in the MC-POT.

Step 3520 (entered from steps 3518 and 3530) hands either money chips (MC's), or pool chips (PC's), to the player in exchange for tendered cash. Proceed to the exit, Step 3532.

Step 3522 (entered from step 3510) gets pool chips (PC's), to be exchanged for player pool monies.

Step 3524 adds the player cash immediately to the player pool, and the player pool amount (PPA) is increased.

Step 3526 updates the PPA display.

Step 3528 decreases the value for cage PC-Count, which is the count of PC's held by the PPC.

Step 3530 increases the amount of the cage PC-cash, which is the recorded monetary value for PC's released from the cage. Then proceed to step 3520, which is described above.

Step 3532 (entered from step 3520) exits the flowchart.

DETAILED DESCRIPTION—FIG. 36

The methodology for "Pari-Mutuel Game Play" starts flowchart at step 3600, with two commentary boxes (step 3602 and 3603).

Step 3602 identifies the name of the flowchart.

Step 3603 gives the purpose of the flowchart.

Figure 44:
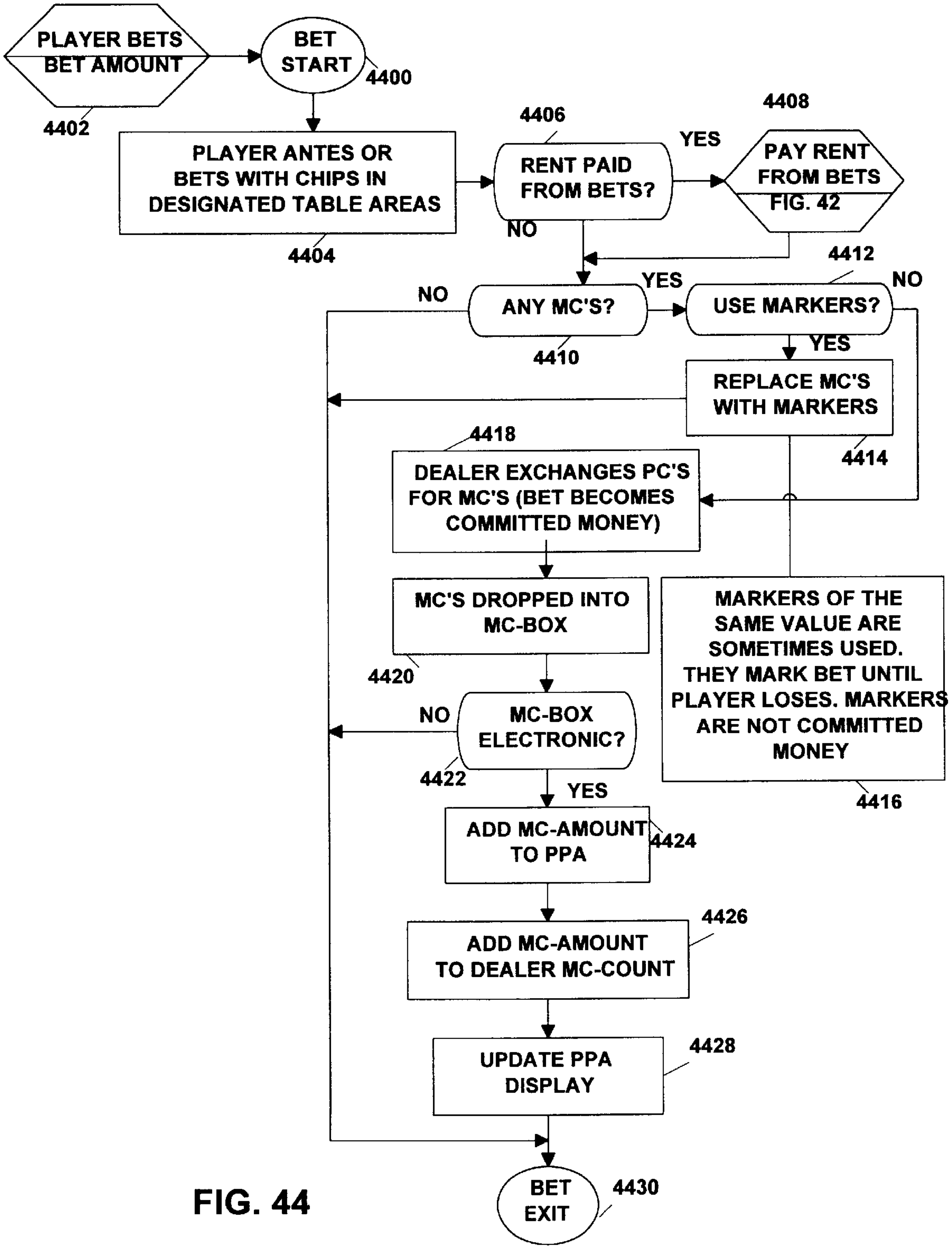
FIG. 44 shows the method of how to handle player bets according to our invention.

Step 3604 (entered from step 3600) has the player make a bet using the methodology of "Player Bets" (FIG. 44).

Figure 43:
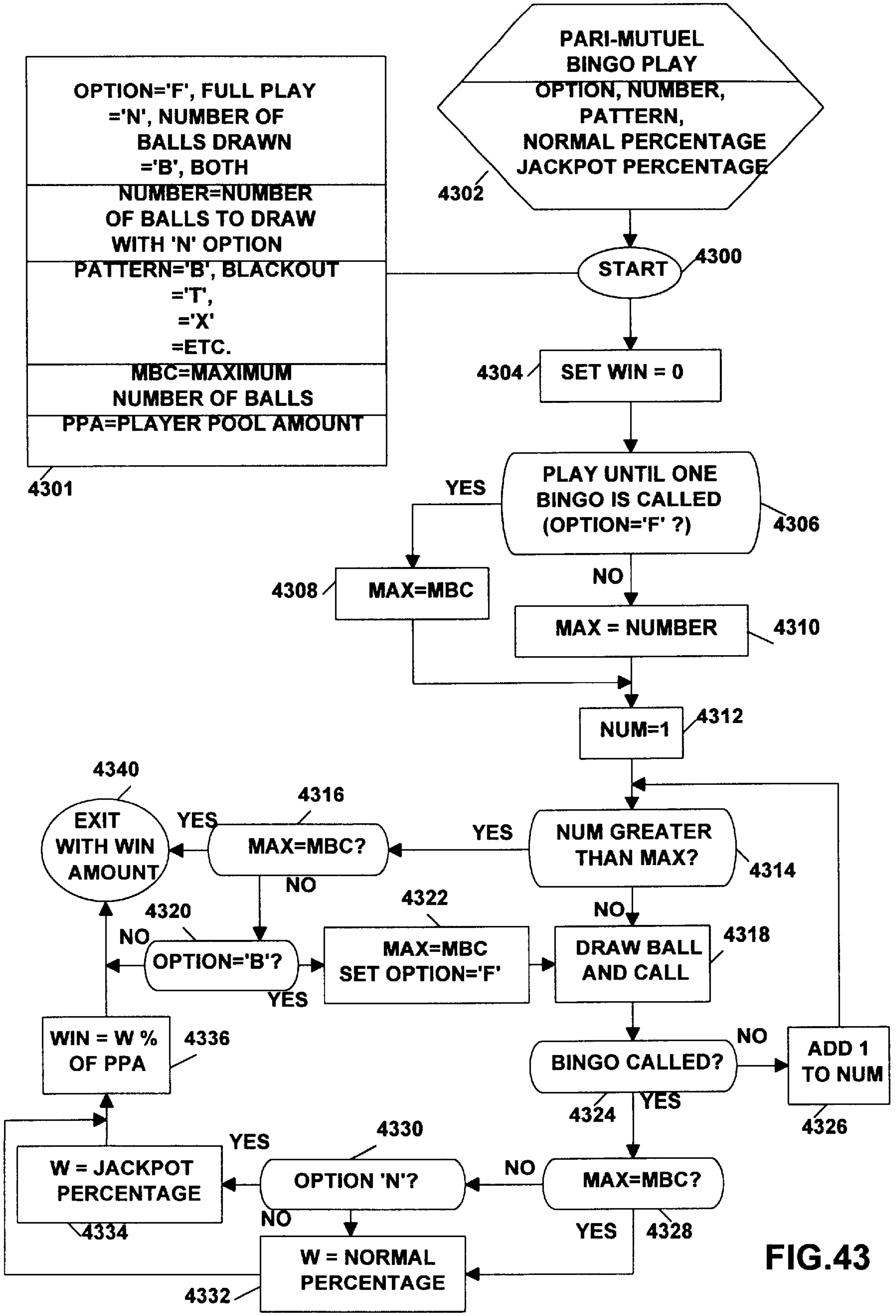
FIG. 43 is a flow chart for a Pari-Mutuel Bingo game according to our invention.

Step 3606 asks if it is Bingo game? If yes, step 3620 calls methodology "Bingo Play" (FIG. 43), then goes to step 3634.

If no,

Step 3608 asks if it is a Keno game? If yes, step 3622 draws a Keno Ball, then goes to step 3634.

If no, step 3610 asks if it is a Craps (or dice) game? If yes, step 3624 rolls the dice, then goes to step 3634.

If no, step 3612 asks if it is a roulette game? If yes, step 3626 spins a ball on the Roulette Wheel, then goes to step 3634.

If no, step 3614 asks if it is a card game? If yes, step 3628 handles cards (dealing, sorting, evaluating, turning over, etc.), then goes to step 3634.

If no, step 3616 asks if it is a finite (or infinite) scratcher (or Pull-Tab) game?

If yes, step 3630 uncovers the required number of positions (or squares), then goes to step 3634.

If no, step 3618 asks if any other game is being played? Other games include lottery number picks, etc. If yes, step 3632 takes appropriate game actions, then goes to step 3634.

If no, to the question at step 3618, go to step 3646, the exit.

Step 3634 (entered after each game action) asks if another action (before another bet) is required? If yes, go back to step 3606, explained before.

If no, step 3636 asks if another bet is required? If yes, go back to step 3604, explained before.

Step 3638 determines the win amount, if any.

Step 3640 asks if the player made a sidebet for a Jackpot, etc.? If no, go to step 3646, the exit.

Step 3642 asks if the player won the sidebet? If no, go to step 3646, the exit.

Step 3644 adds the sidebet win amount to the win amount, if any.

Step 3646 exits from the flowchart with the win amount, if any.

DETAILED DESCRIPTION—FIG. 37

The methodology used to pay winners, "Pari-Mutuel Wins and Bets Settled" starts at flowchart step 3700. Attached commentary box (step 3702) identifies the purpose of this flowchart.

Step 3704 sets the value for rent equal to zero.

Step 3706 has the dealer count the total bets made by winning players (WB). Then, the dealer counts the total bets made by losing players (LB), and the chips for losing players are moved to the dealer pool.

Step 3708 asks if rent is to be taken from bets (WB) made by winning players? If no, go to step 3712.

Figure 42:
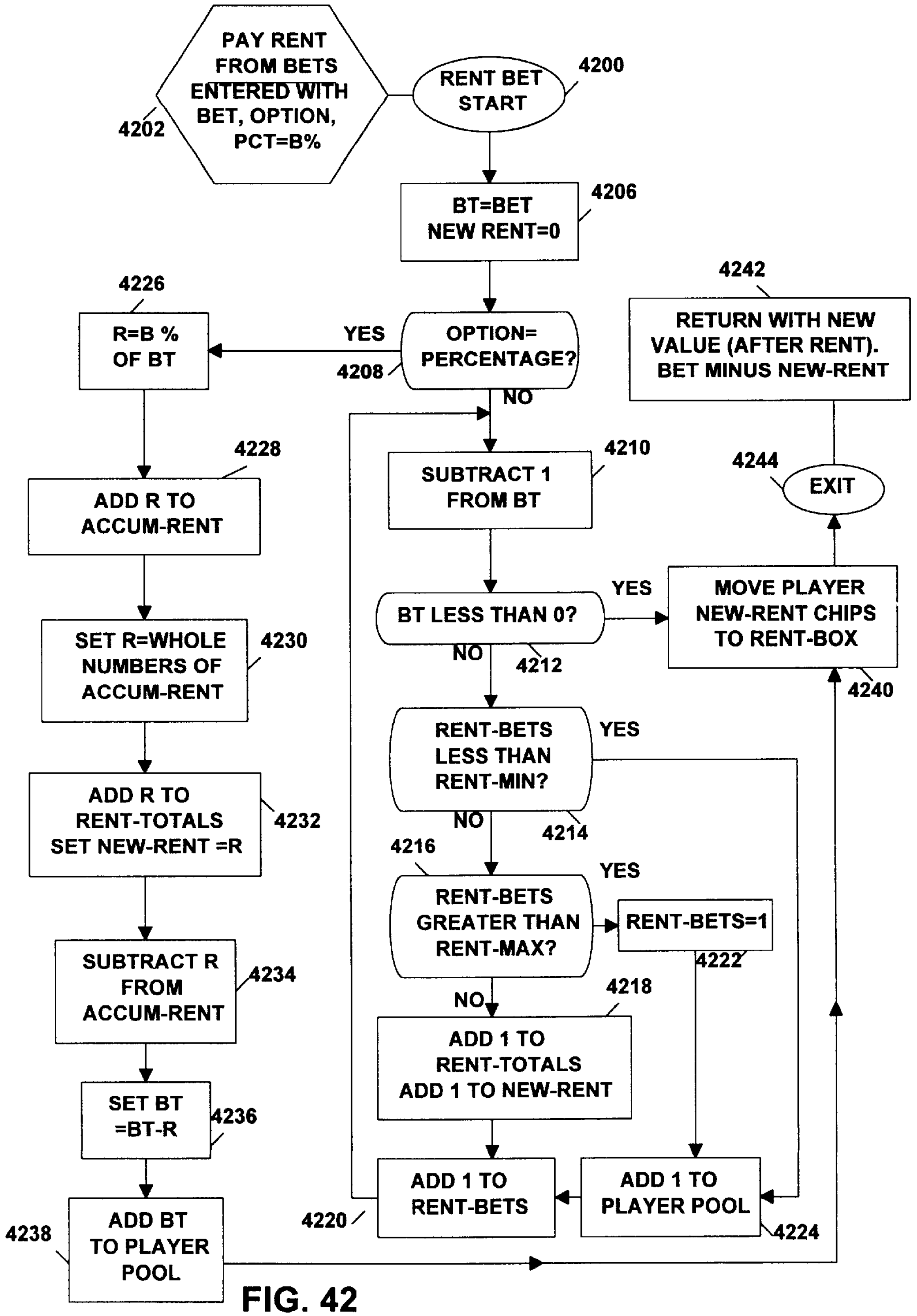
FIG. 42 shows the Pari-Mutuel method of paying the rent from bets according to our invention.

Step 3710 calls methodology "Pay Rent From Bets" (FIG. 42), with parameters: WB, Option, and Y. The Y value supplies the percentage of WB to take for rent. The return value is a new WB after rent is deducted.

Step 3712 asks if rent is taken from bets made by losing players (LB)? If no, go to step 3716.

Step 3714 calls methodology "Pay Rent From Bets" (FIG. 42), with Parameters: LB, Option and X. The X value percentage supplies the percentage of LB to take for rent. The return value is a new LB after rent is deducted.

Step 3716 asks if the game has opponents (like a table poker game)? If no, the game is a banker-type game, so go to step 3720.

Step 3718 sets the total winning amount (MW) equal to the total losing player bets (LB), after rent. Go to step 3722.

Step 3720 (entered from step 3716) sets the total winning amount (TW) equal to the adjusted winner bets (WB), after any rent is deducted.

Step 3722 (entered from steps 3718 and 3720) asks if 'dealer' pool is larger than the winning amount (TW)? If yes, go to step 3732.

Step 3724 asks if the 'total' player pool is larger than the winning amount (TW)? If no, go to step 3726.

Step 3725 uses methodology "Get Dealer Chips" (as described in FIG. 40) to make sure dealer has enough chips to pay winning players. Proceed to step 3732.

Step 3726 (entered from step 3724) uses methodology "Get Dealer Chips" (FIG. 40), and the dealer receives PC's equivalent to all the monies that remain in the player pool (PPA).

Step 3728 sets PPA to zero, since the player pool is now empty.

Step 3730 asks if dealer pool is still less than win amounts? If yes, go to step 3734.

Step 3732 (entered from steps 3722, 3725 and 3730) pays winners the full amounts due to them, and proceeds to step 3754.

Step 3734 (entered from step 3730) selects a WINS settlement algorithm. One must be used, when the player pool is to small to pay all winning players.

Step 3736 asks if it is a percentage settlement? if no, go to step 3740.

Step 3738 pays a fractional share of total winnings to each player in proportion to that player's winnings. Proceed to step 3754.

Step 3740 (entered from step 3736) asks if winnings are to be settled left to right (clockwise), until the pool is gone? If yes, go to step 3744.

Other settlement procedures to consider include the payment of winnings in relation to the odds of the bets. That is, the highest odds bets would be paid first, then the second highest odds, then continuing sequentially to the lowest odds. Conversely, the lowest odds bets could be settled first, then continuing until the highest odds bets are settled.

Step 3742 randomly selects a player position. If not previously paid, a winner at that position, is then paid. Random selections and payments continue, until the pool is gone. Random selections of player positions might also be used in conjunction with other settlement algorithms. Then, proceed to step 3754.

Step 3744 (entered from step 3740) asks, "Is the first settlement position to be determined by dice roll? If no, go to step 3750.

Step 3746 rolls the dice to decide first player position to settle winnings.

Step 3748 moves the settlement Button, to the position that is indicated by the dice roll? Proceed to step 3752.

Step 3750 (entered from step 3744) moves the settlement Button position from the previous game, one position to the right.

Step 3752 (entered from steps 3748 and 3750) pays winners clockwise, until pool is gone.

Step 3754 removes any markers from the table. They may have been used to mark uncommitted money bets, which would have become committed if the player lost. Otherwise, the player's uncommitted bet is returned to the player.

Step 3756 asks if there are excess chips in the dealer pool? If no, go to the exit (step 3764).

Step 3758 asks if excess chips are to be moved to the player pool cage (PPC)? If no, go to step 3764, the exit.

Step 3760 moves excess dealer chips to the player pool cage (PPC).

Step 3762 updates chip balances and reconciles cage accounts for dealer chips.

Step 3764 exits the flowchart.

DETAILED DESCRIPTION—FIG. 38

Methodology flowchart "Pari-Mutuel CASHOUT" starts at step 3800, with two attached commentary boxes (steps 3802 and 3804).

Step 3802 identifies purpose of this flowchart.

Step 3804 defines parameters: MC=Uncommitted Money Chips; PC=Committed Money Pool Chips; PPC=Player Pool Cage; PPA=Player Pool Amount; MC-Pot= Uncommitted Monies held to redeem MC's.

Step 3806 has the player tender chips to the player pool cage (PPC).

Step 3808 asks if the player submitted uncommitted money chips (MC's)? If no, go to step 3818.

Step 3810 counts the dollar MC-Amount for MC's.

Step 3812 gets an MC-Amount of cash from the MC-Pot, in the Player Pool Cage (PPC). The MC-Pot, contains the uncommitted monies reserved for paying off MC chips.

Step 3814 adjusts MC cage balances. The cage MC-Cash balance is decreased by the MC-amount. The cage count of MC's is increased by the MC-amount.

Step 3816 hands an MC-Amount of MC-Pot cash to the player.

Step 3818 (entered from steps 3808 and 3816) asks if the player submitted any pool chips (PC's)? If no, go to step 3832, the exit.

Step 3820 sets the temporary variable NP equal to the amount of the PC chips (NP=PC-amount).

Step 3822 asks if the player pool amount (PPA) is larger than the NP value of the PC's? If yes, go to step 3828.

Step 3824 sets the variable NP equal to the full value of the remaining Player Pool Amount (NP=PPA).

Step 3826 reports the discrepancy to the proper authorities. There should be enough to pay off all PC's, if money handling is always accurate.

Step 3828 (entered from steps 3822 and 3826) pays an NP amount of cash to the player.

Step 3830 adjusts cage balances. The PPA is decreased by the amount of NP, and the PPA display is updated. The cage PC-cash value is decreased by the amount of NP. The cage PC-count value is increased by the chip equivalent of NP.

Step 3832 exits from the flowchart.

DETAILED DESCRIPTION—FIG. 39

Flowchart "ONE PLAYER'S VIEWPOINT" starts at step 3900, with two commentary boxes (steps 3902 and 3904).

Commentary box (step 3902) identifies this flowchart, while commentary box (step 3904) states that this is also a Pari-Mutuel game perspective.

Step 3906 (entered from step 3900) uses methodology "Get Player Chips" (FIG. 35), so the player will have chips to bet.

Step 3907 asks if the rent has been paid? If yes, go to step 3912. If rent is paid out of bets (or winnings), also proceed to step 3912.

Step 3908 waits until the player drops chip(s) into the rent-slot.

Step 3910 updates the rent totals and displays for the rent amounts.

Step 3912 asks if the player wants a chance at a Jackpot? If no, go to step 3918.

Step 3914 has the player try for a Jackpot, by dropping chips through slots reserved for sidebets (including Jackpot).

Step 3916 updates the displays for Jackpot amounts.

Step 3918 (entered from steps 3912, 3916, and 3924) accepts player bets, either uncommitted money (MC's) or committed money (PC's).

Step 3920, an attached commentary box defines parameters:

MC=Uncommitted Money Chips; PC=Committed Money Pool Chips;

PPC=Player Pool Cage; PPA=Player Pool Amount.

Figure 36:
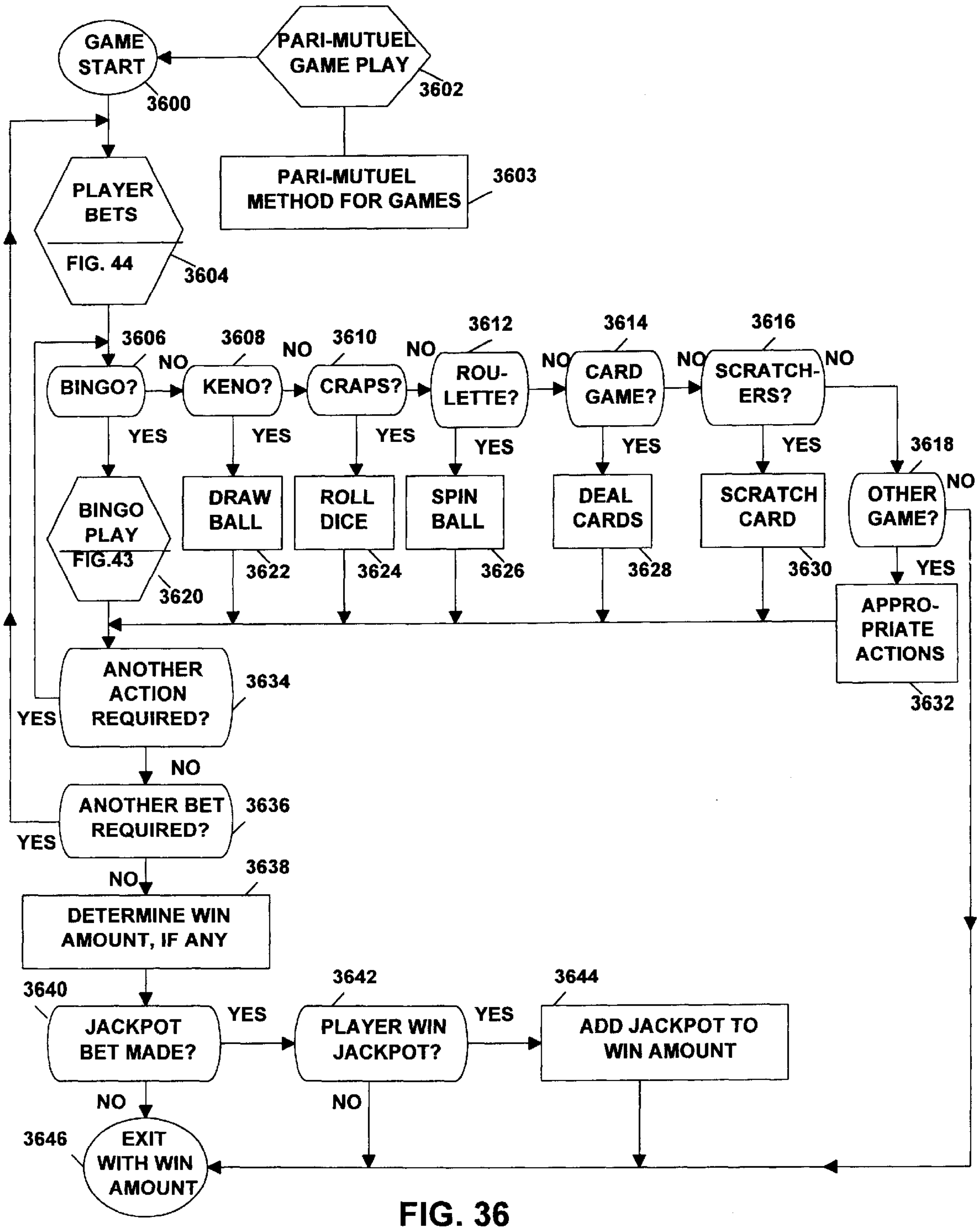
FIG. 36 shows the Pari-Mutuel method for various table games according to our invention.

Step 3922 (entered from step 3918) plays the game using the methodology "Pari-Mutuel Game Play" (FIG. 36).

Step 3924 asks if the game is over? If no, go back to step 3918, to accept more player bets (MC's or PC's).

Step 3926 asks if the player won any money? If yes, go to step 3932.

Step 3928 has the dealer collect losing player chips, with the MC's dropped into an MC box with an electronic sensing slot. The MC's cash money equivalents are immediately added to the player pool.

Step 3930 bumps (automatically, if electronic) the dealer MC-Count and the Player Pool Amount (PPA) for the MC's dropped into the MC box. This also assists in reconciling dealer accounts when the dealer closes out (step 3960).

Step 3948 moves losing player Pool Chips (PC's) to the dealer tray (or dealer pool). These are chips which represent committed money already in the Player Pool. Proceed to step 3946.

Step 3932 (entered from step 3926) sets temporary variable WA equal to the player's win amount.

Step 3934 asks if player Win Amount (WA) is greater than the Player Pool Amount (PPA)? If no, go to step 3938.

Step 3936 sets the variable WA equal to the remaining value of the Player Pool Amount (PPA).

Step 3938 has the dealer pay the player, an amount WA of pool chips (PC's). The dealer obtains PC chips (step 3940) from the player pool cage (PPC), if more chips are needed to pay the player.

The dealer gets these chips by using the methodology "GET DEALER CHIPS" (FIG. 40), which is also used by the dealer, at the start of the business day, step 3942.

Figure 41:
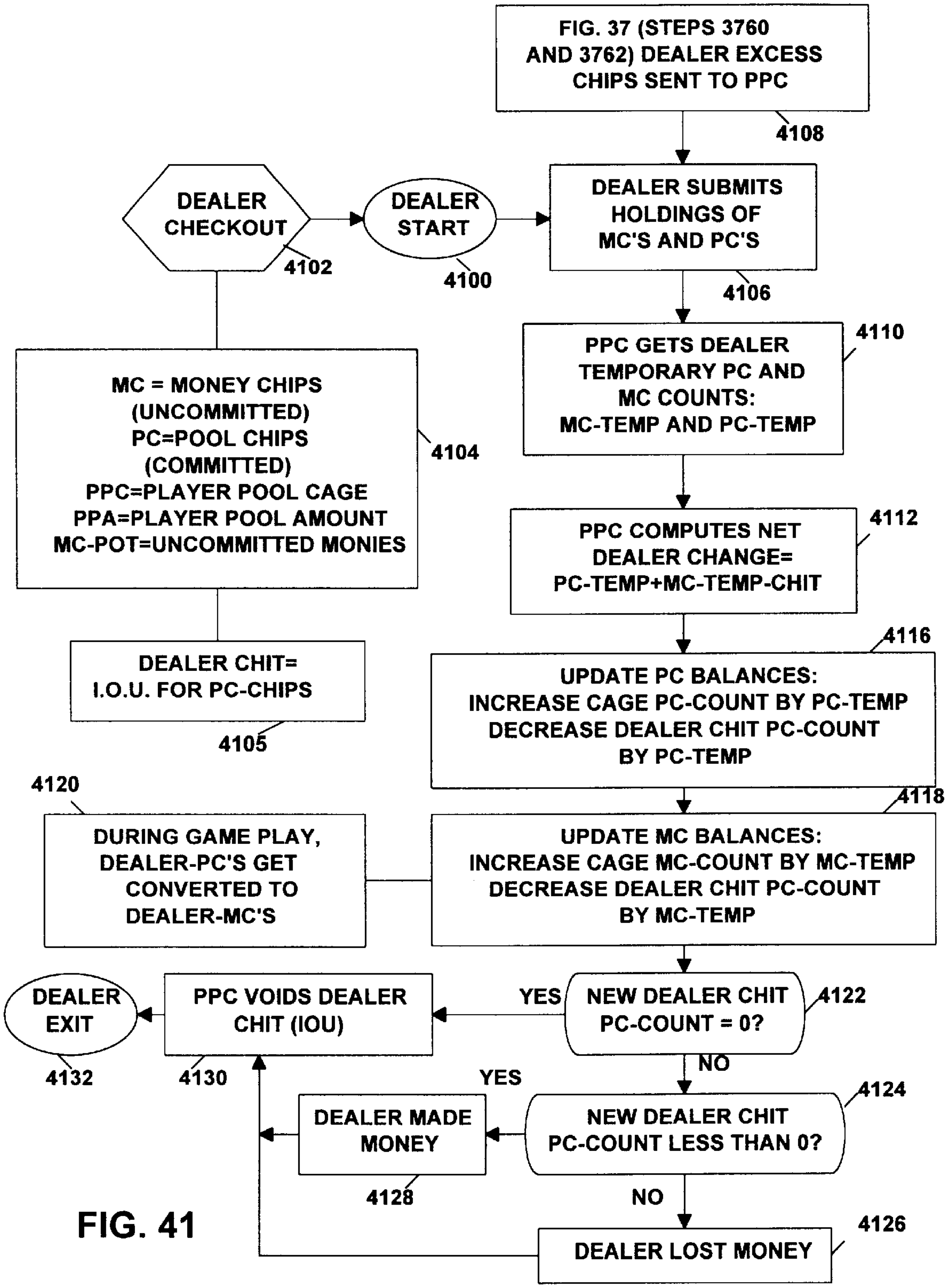
FIG. 41 shows the methodology of the dealer checkout according to our present invention.

At the end of the dealer business day, step 3960 calls "Dealer Checkout" (FIG. 41), when dealer held chips and cash are turned into the PPC. The dealer then leaves work, step 3962 (dealer exit).

Step 3944 (entered from step 3938) reduces the player pool by the value set in variable WA. Of course, the player pool amount (PPA) may go to zero, because of step 3936, above.

Step 3946 (entered from steps 3944 and 3948) asks, "Does the player want another game?" If yes, go back to step 3907, described earlier.

Step 3950 uses methodology "CASHOUT" (FIG. 38) to convert player held chips to cash.

Step 3952 exits the player with the Pari-Mutuel perspective.

DETAILED DESCRIPTION—FIG. 40

Methodology flowchart "GET DEALER CHIPS" starts at step 4000 with one attached commentary box (step 4002).

Step 4002 identifies the purpose of the flowchart.

Step 4004 has the dealer submit a chit (I.O.U.) to the Player Pool Cage (PPC) for a certain Number (NC) of Chips.

Step 4006 moves NC cage-PC's to the dealer pool.

Step 4008 adjusts the balances between the cage and the dealer. The 'dealer' PC-count is increased by NC, and the 'cage' PC-count is decreased by NC. During the dealer shift, big player wins may require that more PC's be transferred to the dealer pool. The PPA is decreased by NC, when extraordinary events occur, and PC's are issued.

Step 4010 exits the dealer.

The above descriptions do not preclude the dealer from receiving money chips (MC's), if the dealer is allowed to accept cash at the table for MC's. The Chit would then include the MC-amount. However, it is preferable to have PPC floor personnel (or runners) to handle MC-transactions.

DETAILED DESCRIPTION—FIG. 41

The method flowchart for "DEALER CHECKOUT" starts at steps 4100, with three attached commentary boxes (steps 4102, 4104 and 4105).

Step 4102 identifies the flowchart purpose.

Step 4104 defines parameters: MC=Uncommitted Money Chips; PC=Committed Money Pool Chips; PPC=Player Pool Cage; PPA=Player Pool Amount; MC-Pot= Uncommitted Monies reserved for cashing MC's;

Step 4105 defines: Chit=Dealer I.O.U. for chips the dealer borrows from the PPC for the dealer pool.

Figure 39:
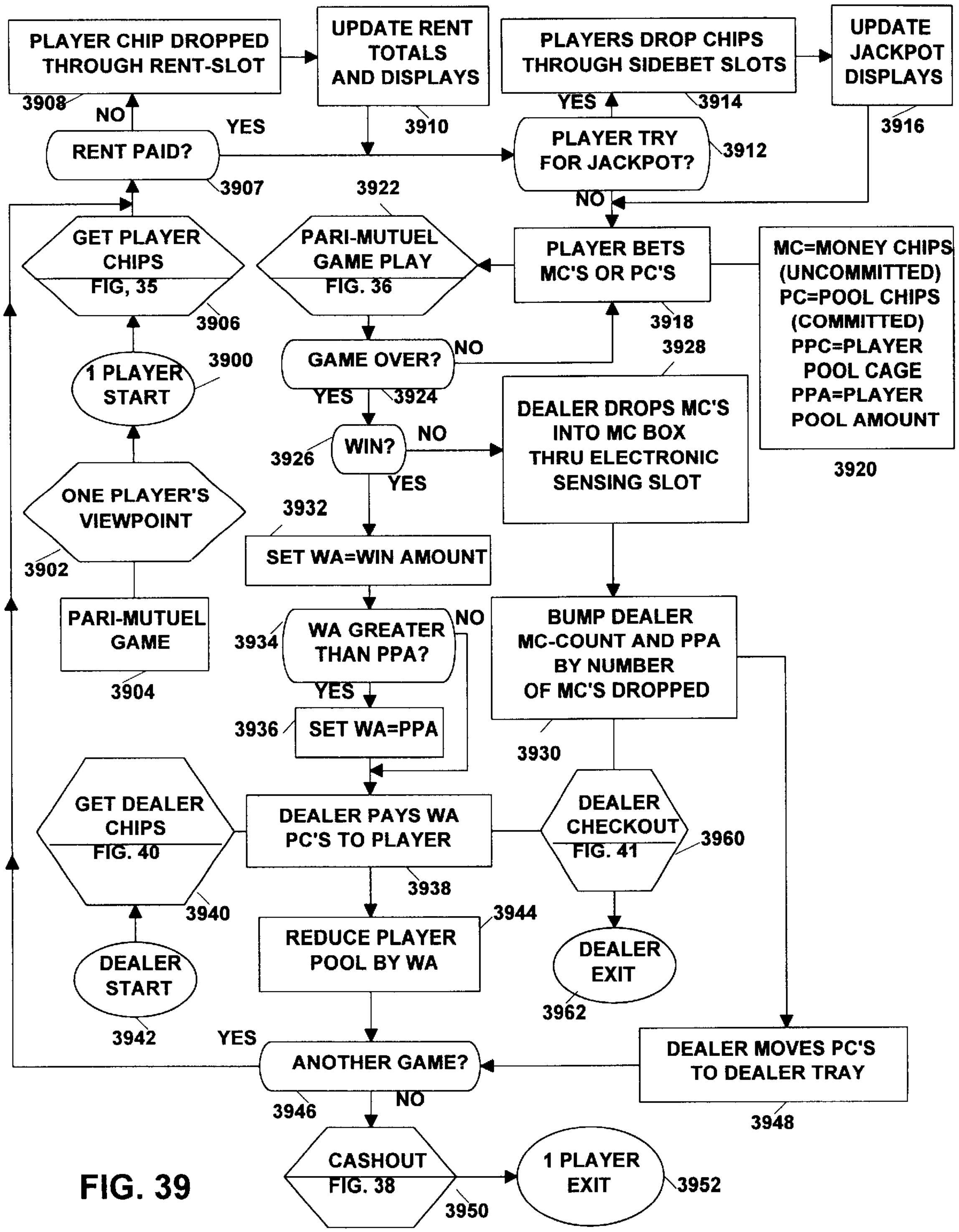
FIG. 39 is from the perspective of the player playing a Pari-Mutuel table game according to our invention.

Step 4106 (entered from step 4100) has the dealer submit current holdings of MC's and PC's. Attached commentary box (step 4108) reminds us that dealer pool excess chips are sent to the PPC during game play (see FIG. 37, steps 3760 and 3762). Dealer counts are also affected at step 3930 of FIG. 39.

Step 4110 has the PPC compute dealer temporary MC counts (MC-Temp) and PC counts (PC-Temp), for the chips handed in by the dealer.

Figure 40:
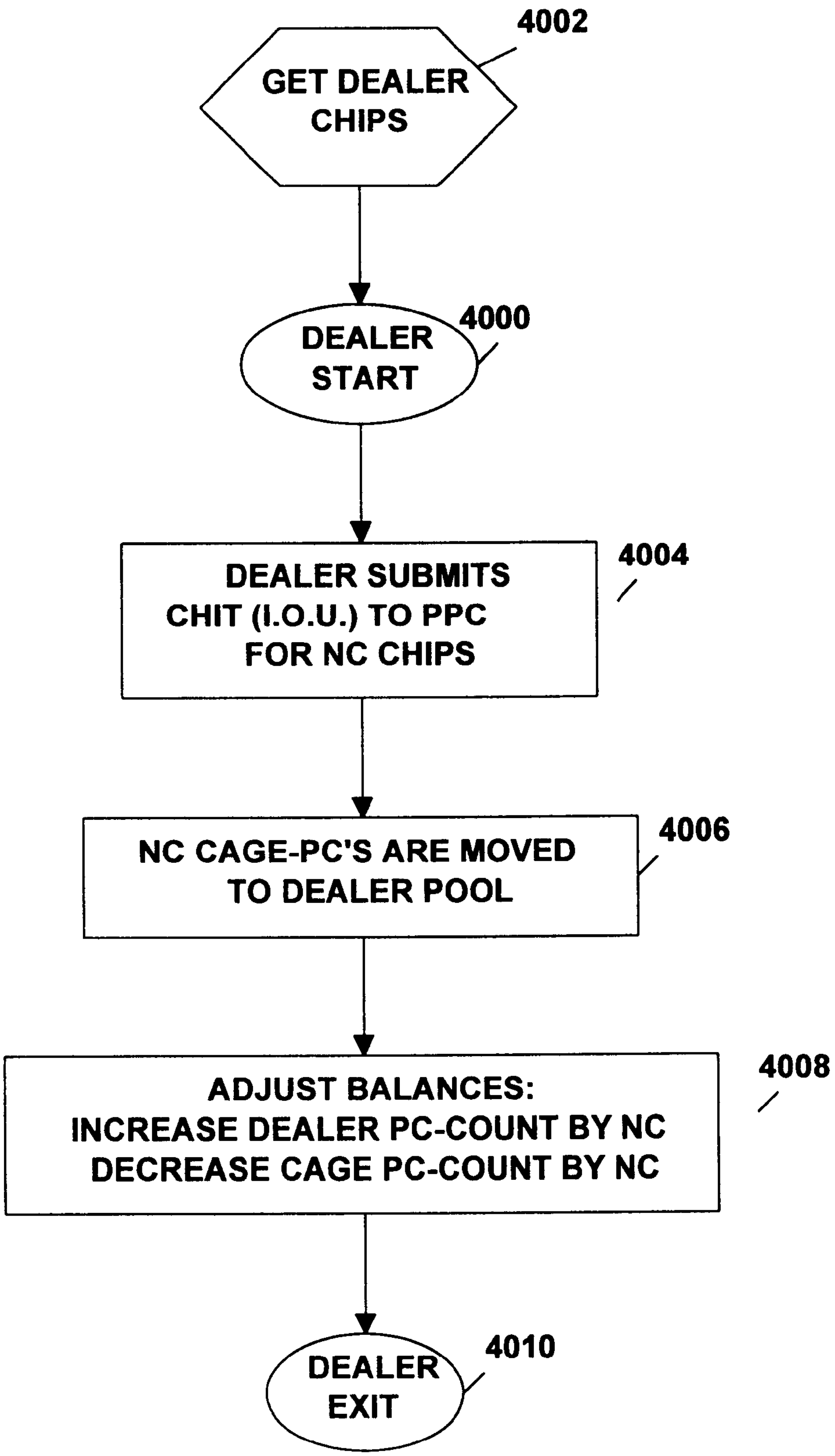
FIG. 40 is the method used on how the dealer acquires the chips according to the Pari-Mutuel table game of the present invention.

Step 4112 has the PPC compute the Net Dealer Change, from the time chips were originally checked out (see FIG. 40). The 'Chit' amount originally borrowed by the dealer are subtracted from the number of dealer currently held chips. (Net Dealer Change=PC-Temp, plus MC-Temp, minus the Chit.

Step 4116 updates PC chip balances, and reconciles the PC Counts for both the PPC and dealer accounts. The cage PC-Count is increased by the value PC-Temp. The 'Chit' Dealer PC-Count is decreased by the value of PC-Temp.

Step 4118 updates MC chip balances, and reconciles the chip counts for both the PPC and dealer accounts. The Cage MC-Count is increased by the value of MC-Temp. The 'Chit' Dealer PC-Count (because the dealer checked out only PC's) is decreased by the value of MC-Temp. (If the dealer can accept cash at the table, MC's might also be issued for the Chit.)

Step 4120 commentary explains that during game play, dealer-PC's become dealer-MC's. The dealer receives Uncommitted MC's when players lose, but the dealer pays winning players with Committed PC's.

Step 4122 asks if the dealer PC-Count equals zero? If yes, the dealer neither made nor lost money, and go to step 4130.

Step 4124 asks if dealer PC-Count is less than zero? That is, did the dealer turn in more chips than were checked out, according to the chit? If yes, go to step 4128.

Step 4126 states that the dealer lost money and proceeds to step 4130.

Step 4128 (entered from step 4124) states that the dealer made money, and proceeds to step 4130.

Step 4130 voids the dealer Chit (I.O.U.), originally issued when the dealer obtained PC's from the PPC.

Step 4132 exits the "DEALER CHECKOUT" flowchart.

DETAILED DESCRIPTION—FIG. 42

Method flowchart "PAY RENT FROM BETS" starts at step 4200, with a commentary box (step 4202). This logic is equally applicable to table games (which refer to chips) and video gaming machines (which refer to credits).

Step 4202 specifies that this logic computes and pays rent using parameters: Bet amount; Option—the option switch specifying whether rent computations use percentages or absolutes; and PCT—the percentage amount (PCT=B%) used for percentage computations.

Step 4206 (entered from step 4200) sets the temporary variable BT equal to the size of the bet. Also, the variable 'NEW-RENT' (for rent this pass), is set equal to zero.

Step 4208 asks if the option flag says to compute a percentage of the bet? If no, go to step 4210.

Step 4226 sets the temporary variable R, equal to the specified percentage of the bet (R=B% of BT).

Step 4228 adds variable R to the Rent accumulator parameter 'Accum-Rent', which maintains a running total for previously unused rent fractions.

Step 4230 sets R equal to the whole numbers (no fractions) of Accum-Rent.

Step 4232 adds the whole numbers of Accum-Rent (R) to the Rent totals to date. The variable 'NEW-RENT' is set equal to R, the amount of rent computed this call.

Step 4234 subtracts the whole numbers (R) from Accum-Rent, leaving only the fractional rent amounts in Accum-Rent, for later use.

Step 4236 subtracts the whole numbers of Accum-Rent (R), from the bet amount (BT). The bet amount now equals the amount to bump the player pool.

Step 4238 adds the after-rent bet amount (BT) to the player pool, then proceeds to step 4240.

Step 4210 (entered from step 4208) subtracts 1 from BT, the variable initially set to the bet amount. The following logic determines what part of the bet should go to rent, or to the player pool. When rent is due, the bet is diverted to rent without affecting the player's bet (or game play).

Step 4212 asks if BT is less than 0? If yes, the bet has been processed, so proceed to step 4240.

Step 4214 asks if the saved parameter 'Rent-Bets' is less than the 'Rent-Min' parameter, which specifies the minimum number of bets before rent can be taken? If yes, go to step 4224.

Step 4216 asks if the parameter 'Rent-Bets' is greater than the parameter 'Rent-Max', which specifies the maximum number of bets, after which rent cannot be taken. If no, go to step 4218.

Step 4222 sets the parameter 'Rent-Bets' equal to a value of 1. This restarts the Bet-Rent logic, so rent won't be paid again until 'Rent-Bets' equals a value of 'Rent-Min'.

Step 4224 (entered from steps 4214 and 4222) adds 1 to the player pool. Go to step 4220.

Step 4218 (entered from step 4216) adds 1, to the rent totals. Rent is bumped only when 'Rent-Bets' is a value from 'Rent-Min' through 'Rent-Max'. Also, the variable 'NEW-RENT' is bumped by 1, for the amount of rent computed this call.

Step 4220 (entered from steps 4218 and 4224) adds 1 to the parameter 'Rent-Bets', which determines rent or Pool choices. Proceed back to step 4210.

Step 4240 (entered from steps 4212 and 4238) moves the number 'NEW-RENT' of player chips to the 'Rent-Box'.

Step 4244 exits the flowchart. Attached commentary box (step 4242) states that the logic returns with a value, equal to the original bet less rent.

DETAILED DESCRIPTION—FIG. 43

The flowchart for "Pari-Mutuel BINGO PLAY" starts at step 4300 with two attached commentary boxes (steps 4301 and 4302).

Step 4301 describes five parameters: (1) Option='F' (Full Play, get Bingo call);='N' (Draw a partial Number of Balls) ;='B' (Both). (2) Number=Number of Balls to Draw for the 'N' Option. (3) Pattern decides how a Bingo looks: Pattern='B' (Blackout);='T' (T-Look);='X' (X=Railroad Crossing) ;=etc. (4) MBC=Maximum Number of Bingo Balls. (5) PPA=Player Pool Amount.

Step 4302 specifies that game logic uses parameters: Option; Number of Balls; Normal Percentage; Jackpot Percentage; and the Pattern. Repeat calls to this method logic, allows the parameter 'Number' to be gradually increased, so payouts can be fine tuned for many different payoff levels.

Step 4304 (entered from step 4300) sets the temporary variable 'Win' to a zero value.

Step 4306 asks, "Play until at least one bingo is called (option='F')?" If no, go to step 4310.

Step 4308 sets the temporary variable Max, equal to Maximum Number of Bingo Balls (MBC). Proceed to step 4312.

Step 4310 (entered from step 4306) sets the temporary variable Max, equal to the value 'Number', given in the call to this logic. (Number is a variable required by option 'N').

Step 4312 (entered from steps 4308 and 4310) sets the temporary variable NUM, equal to one.

Step 4314 asks if variable NUM, is greater than variable Max? If no, go to step 4318.

Step 4316 asks if variable Max was set to Maximum Number of Bingo Balls (MBC)? If no, go to step 4320. Otherwise, the Option was probably 'F', and the game is over. Proceed to the exit (step 4340), with win amount, if any.

Step 4320 asks if Option='B'? If yes, go to step 4322. Otherwise, the parameter 'Number' was not used (to limit the 'NUMBER' of Balls drawn) to create a Jackpot situation. Proceed to the exit (step 4340) with the win amount, if any.

Step 4322 sets variable Max equal to the Maximum number of Bingo Balls (MBC). Also, it changes the option parameter from 'B' to 'F', so the game won't end until a BINGO is called.

Step 4318 (entered from steps 4314 and 4322) draws and calls a Bingo ball.

Step 4324 asks if a bingo was called? If yes, go to step 4328.

Step 4326 adds 1 to variable NUM, then proceeds to step 4314, and follows steps outlined earlier.

Step 4328, asks if variable Max, equals the Maximum Number of Bingo Balls (MBC)? If yes, a Jackpot environment does not exist, so go to step 4332.

Step 4330 asks if the option is currently set to 'N' to get a Jackpot. If yes, go to step 4334.

Step 4332 (entered from steps 4328 and 4330) sets variable W to the value of the 'normal' percentage used for non-Jackpot bingos. Go to step 4336.

Step 4334 (entered from step 4330) sets variable W to the value of the 'Jackpot' percentage, paid when a BINGO is called during a limited drawing.

Step 4336 (entered from steps 4332 and 4334) sets variable 'Win' equal to the appropriate percentage (W%) of the Player Pool Amount (Win=W×PPA). Step 4340 exits the flowchart with the computed win amount, if any.

DETAILED DESCRIPTION—FIG. 44

This flowchart describes "PLAYER BETS" starting at step 4400, with an attached commentary box (step 4402).

Step 4402 indicates this logic requires knowledge of the bet amount.

Step 4404 indicates that the player antes or bets by placing chips onto designated table areas, for table games. Other games, such as scratchers, have the player submit bets directly to an operator.

Step 4406 asks if the rent is paid from bets? If no, go to step 4410.

Step 4408 uses method "Pay Rent From Bets" (FIG. 42) to pay rent out of the bet amount. The full bet may not go to the player pool (some of it might go to rent).

Step 4410 (entered from steps 4406 and 4408) asks if there are any MC's? If no, the bet is made with committed money only. The rest of the logic pertains only to 'Uncommitted' money, so proceed to the exit (step 4430).

Step 4412 asks, "Use markers?" Markers are sometimes used to mark bets without committing them to the player pool. If No, go to step 4418.

Step 4414 replaces MC's with markers of the same value with an attached commentary box (step 4416). Go to step 4430, the exit.

Step 4416 is a commentary box that explains 4414. Markers of the same value are sometimes used. They mark the bet until the player loses. Markers are not committed money.

Step 4418 (entered from step 4412) has the dealer exchange PC's for MC's (that is, the bet becomes committed money).

Step 4420 has the dealer drop the MC's into the MC-Box.

Step 4422 asks if the MC-Box is electronic? If no, go to the exit (step 4430).

Step 4424 automatically adds the amount of the MC,'s (MC-Amount) to the Player Pool Amount (PPA).

Step 4426 automatically adds the MC-Amount to the dealer MC-Count.

Step 4428 automatically updates the PPA display.

Step 4430 (entered from steps 4410, 4414, 4422 and 4428) exits the detailed description of this flowchart.

DETAILED DESCRIPTION—FIG. 45

Figure 45:
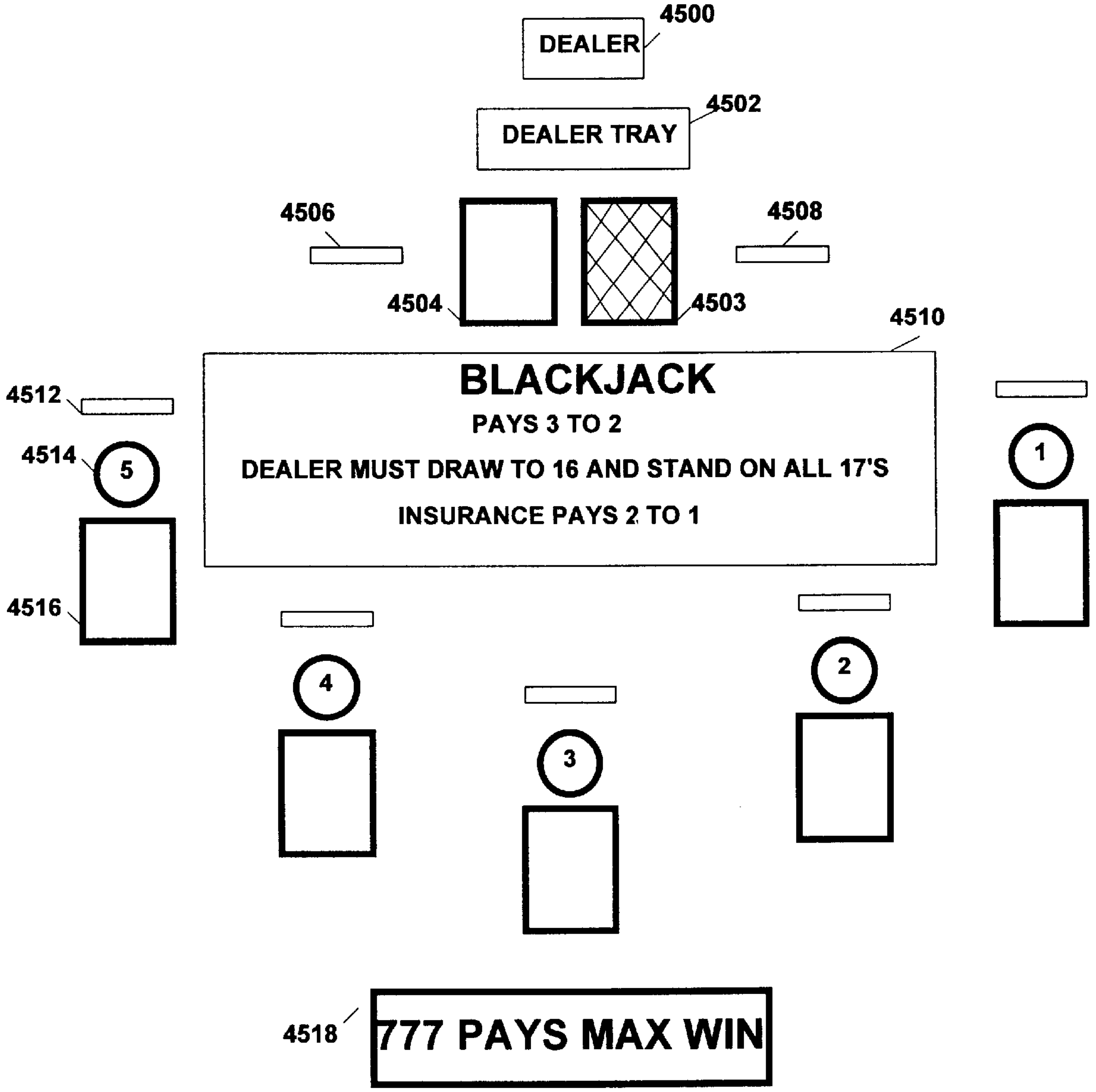
FIG. 45 shows a table layout for the game of "Pari-Jack", a Pari-Mutuel Blackjack table game according to our invention.

FIG. 45 is a table layout for the Pari-Mutuel form of the game Blackjack, called Pari-Jack. This game plays exactly like Black Jack, where players try for their best hand, not to exceed 21. The game rules are the same. The only difference comes when players are paid their winnings. They are paid from the Player Pool. And the house does not back any winnings, or prizes.

Pari-Jack has a player's pool, that provides no benefit to the house. The house furnishes a dealer (4500) whose hand (4503, 4504, plus hits), is used to determine winners. The house does not benefit from the outcome. The dealer receives two cards, one card face up (4504), and one card face down (4503). The rules are printed on the table (4510). The dealer must draw to 16 and stand on all 17's. The players' cards (4516) are compared to the dealer hand to determine wins, losses. or ties. Before a player can play Pari-Jack, rent must be paid to the dealer. Rent collected from the Player is placed in a table rent slot (4508).

Players submit their cash to the PPC for MC's. See "Get Player Chips" (FIG. 35), to see how cash is converted to chips. Players at the table place a wager (MC's or PC's) in the "Bet Box" (4514) in front of their position. They also participate in a Jackpot by placing a chip in the sidebet slot at their position (4512). Appropriate jackpots are established by the house, such as three sevens, or a wheel (Ace, 2, 3, 4, 5).

Wagers can be from the minimum (say $1.00) to the maximum (say $1,000.00) allowance for that table. After all wagers are placed on the table, the dealer shuffles and cuts a card deck. The dealer deals one card in rotation to all players, and one facedown card (4503) to himself. The dealer then deals a second card to all players, with one faceup card (4504) to himself. All player bets are collected if the dealer has a Blackjack hand, unless a player's hand is also a Blackjack.

Otherwise, each player is asked if they want to hit, or stand. When a hit is requested, the player is dealt one card (each new card is called a hit). The player can receive hits until going over 21 (bust), or the player can stop (stand). If they bust, their losing wager is collected immediately into the dealer pool. Every player has a turn, going clockwise from the dealer, to hit or stand. After the final player decision, the dealer hand is turned faceup. The dealer hits (according to house rules) until, either standing pat or busting. Players win, if their hand beats the dealer hand, or the dealer goes over 21 (bust).

Winning players are paid with Pool Chips (PC's), not to exceed the amount in the player pool including the dealer's rack (dealer pool). Losing player bets are collected by the dealer and moved into the dealer pool (4506). Notice that players may bet MC's (Uncommitted Money), but they are always paid with PC's (Player Pool Money).

Three sevens (7's) in the player hand triggers a Jackpot event if the appropriate bet was made before the game started. The Jackpot is added to player winnings.

The player will only be paid according to funds in the players pool. See "Pari-Mutuel Wins and Bets Settled" (FIG. 37) for disbursing the winnings.

The player pool (and dealer pool) money is sometimes too small to pay all winners. Payment priority determines which player should be paid first, according to house rules. This could be done with a random number generator (dice, electronic, etc.). Or winnings could be paid in proportion to their bets, relative to other winners. In any event, Payouts to winning players continues, until the player pool money runs out.

When the player pool is large enough to pay all winners, they are paid clockwise from player position one, through player position five. Players may cashout at any time. See "Pari-Mutuel Cashout" (FIG. 38), for the different handling of MC's and PC's.

A sign or message (4518) is used to notify players of jackpot hand types. It may also contain an electronic device to show the current Jackpot amount.

DETAILED DESCRIPTION—FIG. 46

Figure 46:
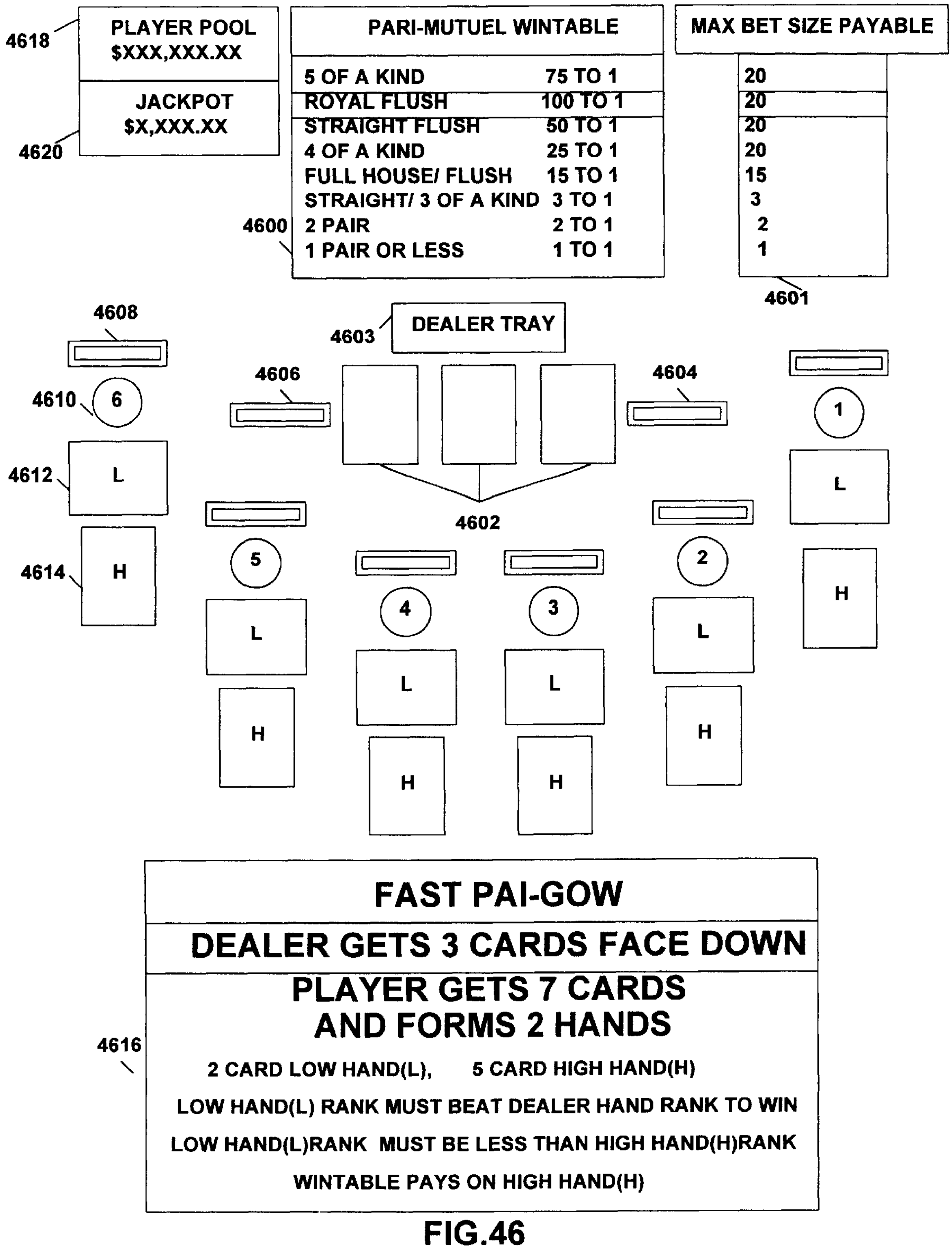
FIG. 46 shows a table layout for the table game of "Fast Pai-Gow" using a Pari-Mutuel method according to our invention.

FIG. 46 is a table layout for the game of "Fast Pai-Gow", the Pari-Mutuel Pai-Gow Poker game. There is a player's pool, with no house backing of prizes. The passive (3 card) hand dealt to the dealer (4602) is compared to the player's hands to determine player wins and losses. The house does not benefit from the game outcome. This Pari-Mutuel Pai-Gow features large bonuses for very good hands, including Royal Flush hands. The Pari-Mutuel Win Table (4600) lists the odds. The maximum bet size (4601) display, shows bets, which can be paid in full, based on the size of the player pool (4618).

Players obtain chips from the Player Pool Cage (PPC) in exchange for their cash. See "Get Player Chips" (FIG. 35), to see how cash is converted to chips.

Rent is collected from players (to pay for the dealer and the table), and deposited in a "rent slot" (4604) to the left of the dealer. Each player at the table places a wager in the bet circle (4610) in front of their position.

They participate in a Jackpot (4620) by placing a chip in the "sidebet slot" (4608) by their position. This causes the Jackpot (4620) display to be increased. A Five-of-a-kind or Royal Flush, as shown in the Pari-Mutuel Wintable (4600), might qualify the player for the Jackpot (4620).

See instruction box (4616) for the rules of play. After all wagers are placed, the dealer deals seven cards to each of the players, and three (only) facedown to the dealer spot (4602). The players arrange their seven cards into a five card-hand (4614) and a two-card hand (4612). The five-card. hand (4614) must have a higher value than the two-card hand (4612), or the player is disqualified and loses the bet.

After players set their hands, the dealer cards are turned face up. Each player low (2 card) hand (4612) is compared to the dealer's (3 card) hand (4602) to determine wins or losses. There are no pushes or tie. The player wins when the two card hand (4612) beats the dealer three card hand (4602). Losing player bets are collected by the dealer, and moved into the dealer pool tray (4603).

The amount of the player win is found by consulting the Pari-Mutuel Wintable (4600). The player is paid for the high (5 card) hand (4614). A four of a kind hand pays 25 to 1. These odds are paid with Pool Chips (PC's), but only if the player's pool (including dealer rack), has accumulated enough money to pay them. The "Max Bet Size Payable" display clues the player before the bet, which handtypes can actually receive full odds winnings. When the Player Pool has a value of zero, all handtypes pay zero. See "Pari-Mutuel Wins and Bets Settled" (FIG. 37) for disbursing winnings. Notice that players may bet MC's (Uncommitted Money), but their winnings are always paid with PC's (Player Pool Money).

A Royal Flush, may trigger a Jackpot when the appropriate sidebet was made before the game started. The Jackpot amount is added to the player winnings.

Big player wins may require that more PC's be transferred to the dealer pool (4603) to pay the winners. When this happens, the PPA (4618) is reduced by the dollar amount of the chips moved. Conversely, excessive dealer chip holdings are sent to the PPC and the PPA (4618) is increased.

Sometimes, the Player Pool is too small to pay all winners. Who gets paid first, is determined, according to the house rules. A random number generator (dice, electronic, device, specified algorithm, etc.) can be used. The rotation of payouts to winning players continues until the player pool money has been totally disbursed.

When the pool is large enough, winning players are paid clockwise, beginning at player position one, and continuing through player position six.

Players may cashout at any time. See "Pari-Mutuel Cashout" (FIG. 38), for method which handles MC's and PC's differently, when converting Player Chips cash.

An electronic paytable or progressive sign for the player's pool (4600), may be part of the Pari-Mutuel Wintable display.

FIGS. 1, 2, 3, 5, 6 and 7—OPERATION OF A VIDEO GAME WITH A PLAYER POOL PROGRESSIVE This is the player's viewpoint, while operating the video game machine of FIG. 1. This perspective of our invention illustrates the typical operation of a non-king game with player pool progressives.

The machine of FIG. 1 is already on line. The player enters rent after viewing the MAXWIN 230 display shown on the video screen CRT 52 of FIG. 2 or FIG. 3 depending on whether they are playing Draw Poker or Keno. A very large bet can be made if the Maxwin is large, since all wins are covered by the PLAYER POOL 72 shown in FIG. 1. Players can adjust their bets WAGER 250, as the MAXWIN 230 fluctuates. As the bet is changed, the paylines change to new payoff amounts (for the BET-1 pay, multiplied by the new betsize) as shown in FIGS. 6 and 7 (at 680).

The machine is on-line, and the player puts rent money in the COIN INLET 54. The amount of rent paid is shown in the RENT 240 box. The player can preset the bet WAGER 250 with either the PLAY MAX 60 or PLAY 1 CREDIT 58 button, then deposit sufficient money in the BILL ACCEPTOR 70 to cover the bet. Non-rent money is added to CREDITS 260 and the betting begins. A DEAL 66 button is pushed, and the bet is subtracted from player CREDITS 260. Game play has started (either KENO 300 or Draw Poker of any GAME 280). The player uses CHANGE CARDS 64 to discard (or hold cards if playing Draw Poker). Multiple bet games require several incremental bets. However, the game ends anytime, when the player presses FOLD 62 button. WAGER 250, or bets, are immediately subtracted from the player's CREDITS 260. Significantly, this bet is added simultaneously to the POOL 72, this causes changes to the MAXWIN 230 display.

If the player wins, the CREDITS 260 increase. However, player wins cause a negative effect on the player's pool. The following displays are adjusted downward: the PLAYER POOL 72, and the MAXWIN 230. FIGS. 6 and 7 show monitor screens which alert the player when large changes occur. The player can collect credits by pushing the COLLECT 56 button. Or continue playing by adding more rent and bet monies, as necessary.

The player selects the game, and the desired paytable number for that game. The displays in FIG. 5, step 500 and 550 help the player make game and paytable selections. The highest Maxwin information which is supplied by game and paytable number, allows the player to quickly make a choice.

SUMMARY, RAMIFICATIONS, AND SCOPE

We provide a method that makes any game a non-banking game. It works for table (and other non-video) games, and for machine play on a computer controlled apparatus. The method provides an exciting player pool progressive, because it increases the pool One Hundred Percent of player bets, less winnings. Standard progressive pools are normally One Percent (1%) or less of player bets. Therefore, this progressive system method needs fewer players to increase jackpots, compared to the typical progressives in use today.

The gaming world diligently seeks exciting jackpot schemes that pay large amounts. Many states have, for various reasons, banned banking games. The California Supreme Court banned guaranteed posted prizes for the on-line Keno game. It has been estimated, that the Keno game removal will cost California approximately $600,000,000.00 in lost revenues, each year. Our non-banked Pari-Mutuel Keno game solves this problem. California Keno players can have their favorite game again.

If desired, this invention can operate with committed bets and Fixed time intervals. Changing prizes would be posted, like at racetracks.

Our invention allows preset prizes to be displayed, when the player pool can pay them. If the pool is too small, those prizes which cannot be paid, are displayed at the Maxwin value (until the player pool is funded sufficiently). When there is not enough money to pay all winners, the invention settles up bets and wins, without house guarantees.

Our unobvious invention allows continuous, interactive play, without fixed time intervals. Players can see the odds change second by second, from bet to bet, creating a hub of activity in this powerful computer system. The players and system interact dynamically, both reacting to a changing game environment.

Although the description above contains many specificities, these should not be construed as limiting the scope of the invention, but as merely providing illustrations of some of the presently preferred embodiments of this invention.

For example, this Maxwin player pool method can be used in any gaming environment (including the Internet) where a Pari-Mutuel can operate (including hotels, cruise ships, trains, planes, and automobiles).

Computer controlled devices (including, mechanical slot reels, stepper motor games, and video games) benefit from this invention. Non-computerized games (including Pachinko, Blackjack, Pai-Gow, Bingo, other table games, craps, roulette, and even the common scratcher) make use of this invention. Formerly disallowed games (such as player favorite Blackjack in some jurisdictions), can now be played using Pari-Mutuel player pools.

Thus the scope of the invention should be determined by the appended claims and their legal equivalents, rather than by the examples given.

We claim:

1. A pari-mutuel system for creating shared pools initially containing zero credits and for managing at least one shared pool associated with at least one shared pot from a pot group including a paypot, a zeropot, a sidepot and a symbolpot, said pot being a subset of said pool, said system comprising:

a. pot creation means for creating said pot initially containing zero credits and a pot remainder accumulator with a value of zero, then designating said pot as one from said pot group including said paypot, said zeropot, said sidepot and said symbolpot;

b. pool creation means for creating said pool initially containing zero credits, then operating said pot creation means as many times as necessary to create at least one said pot associated with said pool;

c. pot percentage means for establishing a pot percentage for each said pot associated with said pool by acquiring predetermined pot factors, then setting a numerator pot multiplier parameter and a denominator pot divisor parameter greater than zero with the values of said predetermined pot factors;

d. pool-change means for adding a pool-change temporary variable to said pool, then evaluating said pool and if said pool is negative subtracting said pool from said pool-change and setting said pool to zero;

e. pot calculation means for setting a pot change equal to said pool-change, then setting said pot-change equal to said pot-change multiplied by said pot multiplier and divided by said pot divisor, storing any remainder from the division into a pot remainder temporary variable;

f. pot accumulator means for adding said pot remainder to said pot remainder accumulator and evaluating said pot remainder accumulator, then if said pot remainder accumulator is negative repeatedly subtracting one from said pot change and adding said pot divisor to said pot remainder accumulator until said pot remainder accumulator becomes positive;

g. pot remainder means for comparing said pot remainder accumulator to said pot divisor and if said pot remainder accumulator is greater than said pot divisor, repeatedly adding one to said pot change and subtracting said pot divisor from said pot remainder accumulator until said pot remainder accumulator is less than said pot divisor;

h. pot additive means for adding said pot change to said pot and if new value in said pot is a negative value, repeatedly adding one to said pot and subtracting said pot divisor from said pot remainder accumulator until said pot is positive;

i. pot zero means for determining that said paypot is associated with an active said zeropot and that said paypot has insufficient said credits according to a threshold paypot parameter, then adding a portion of said zeropot to said paypot and reducing said zeropot by same said portion of said zeropot;

j. pot change means for determining that an associated pot is active for said pool and that said pool-change is other than zero, then processing said pool-change for said associated pot by operating said pot percentage means, said pot calculation means, said pot accumulator means, said pot remainder means, said pot additive means and said pot zero means;

k. format means for acquiring a plurality of data according to prespecified requirements, then formatting said data into a data packet;

l. data means for detecting any changes to said data, then calling said format means to format said pool, said pot, said pot multiplier, said pot divisor and said pot remainder accumulator;

m. display means for calling said data means, then displaying said data packet;

n. pot final means for repeatedly operating said pot change means until all active said pot associated with said pool have been processed, then operating said display means;

o. pool process means for operating said pot final means and setting a pool-return temporary variable equal to said pool-change which may have changed, then setting said pool-change to zero; and, p. pool control means for initially operating said pool creation means and setting said pool-return to zero, then operating said pool process means any time said pool-change is other than zero and returning said pool-return;

whereby said pool is increased and decreased by said pool-change, and said pot is increased and decreased by said pot fraction of said pool-change, and said data packet includes said pool and said pot, and the contents of said data packet is displayed to all interested persons.

2. The pari-mutuel system of claim 1 further including a possible requirement for a payment of a rent in order to access said pool and said pot, said payment being entered as a rent-credits into said rent from a rent group including a system rent, a game rent and a paytable rent, where a rent-sidepot may contain said rent, and said pool control means may fill said rent-sidepot with a percentage of a wager, comprising:

a. rent creation means for creating said rent having a balance of zero said rent-credits and a rent remainder accumulator having an initial balance of zero, then associating said rent with said rent-sidepot if said rent-sidepot is being used to contain said rent-credits;

b. rent-wager means for determining the source of said payment of said rent, then selectively setting a rentwager from a rentwager group including a winnings consisting of a win credits, a winning wager, said wager and a separate contribution of rent independent of other operations;

c. rent-slot creation means for creating a renttime temporary variable set to zero for play time remaining, and a rentgames temporary variable set to zero for number of game plays remaining, and a minrent temporary variable equal to the minimum said rent-credits which are required before allowing access to said pool and said pot;

d. rent-slot definition means for creating a renttime-converter temporary variable and a rentgames-converter temporary variable, then setting said renttime-converter to amount of time allowed for each said rent-credit and setting said rentgames-converter to number of said games for each said rent-credit;

e. rent-slot initializing means for operating said rent-slot creation means to create said rent-sidepot, then calling said rent-slot definition means to establish the values for said renttime-converter and said rentgames-converter;

f. rent-slot conversion means for using said renttime-converter and said rentgames-converter to convert said rent-credits to said renttime-units and said rentgames-units, then adding said renttime-units to said renttime and said rentgames-units to said rentgames;

g. rent-slot reversal means for using said renttime-converter and said rentgames-converter to convert said renttime and said rentgames to said rent-credits, then cause paying of said rent-credits to said player and setting zero into said rent-credits, said renttime and said rentgames;

h. rent-slot accept means for accepting said credits into said rent-credits, then calling said rent-slot conversion means and setting said rent-credits to zero;

i. rent-slot diminishing means for reducing said renttime exceeding zero as time expires, and for reducing said rentgames exceeding zero upon completion of said play of said game;

j. rent-slot final means for operating said rent-slot diminishing means, then if said renttimes and said rentgames are both insufficient, repeatedly operating said rent-slot accept means at least until one of said renttime and said rentgames becomes sufficient;

k. rent-percentage initializing means for creating said rent-sidepot with a value of zero, then associating said rent-sidepot with said pool if said rent is taken from said pool;

l. rent-percentage final means for operating said rent-wager means, setting said pool-change equal to said rentwager and if said pool-change is other than zero, calling said pot change means to change said rent-sidepot;

m. rent-range creation means for determining that portions of a accumulated wager goes to said rent rather than said pool, then defining a range of said credits for said accumulated wager when said wager will be added to said rent-credits rather than to said pool, said range established by setting a renthigh temporary variable to the highest value of said range and setting a rentlow temporary variable to the lowest value of said range and setting a rentmax temporary variable to the maximum accumulative wager which causes a rentcount temporary variable to be reset to zero;

n. rent-range initializing means for operating said rent-range creation means, then setting said rentcount and said rentwager to zero;

o. rent-range wager means for decreasing said rentwager by one and increasing said rentcount by one, then setting said rentcount to zero when said rentcount is greater than said rentmax;

p. rent-range bump means for bumping said rent-credits by one if said rentcount is in said range from said rentlow through said renthigh inclusive, otherwise for bumping said pool-change by one;

q. rent-range accumulate means for calling said rent-range wager means, then calling said rent-range bump means;

r. rent-range final means for calling said rent-wager means and repeatedly calling said rent-range accumulate means while said rentwager is other than zero, then calling said pool control means to process any accumulated said pool-change and then calling said display means;

s. said data means of claim 1, further including said rent, said rent multiplier, said rent divisor, said rent remainder accumulator, said rentlow, said renthigh, said rentcount, said rentwager, said minrent, said rentgames and said renttime in said data packet;

t. rent selection means for determining the source of said payment of said rent, then selectively choosing the appropriate means to collect said rent-credits from a rent collection group including said rent-range final means, said rent-percentage final means and said rent-slot final means, then begin operating the appropriate rent collection means;

u. rent acquire means for collecting said rent-credits from said player by calling said rent selection means and said display means, then allowing the use of said pool and said pot after required said rent-credits have been collected;

v. rent initializing means for determining that said rent is required for utilization of said pool and said pot, then initializing parameters for said rent by operating said rent-percentage initializing means, said rent-range initializing means and said rent-slot initializing means;

w. rent control means for initially operating said rent initializing means, then calling said rent acquire means whenever said rent-credits must be collected;

whereby said rent-credits may be collected for the use of said pools and said pots in said system.

3. The pari-mutuel system of claim 2 further providing for a play of a game requiring said pool, said pot and a paytable to determine winnings, where a player makes a wager of player credits to try for said winnings consisting of said win credits, where an amount equal to a maxwin is the largest allowed said winnings, comprising:

a. game selection means for selecting said game and said paytable to form a game-paytable combination from a plurality of said games and a plurality of said paytables, then setting said wager and said win credits to zero values;

b. game switch means for detecting that said player wants to select a new game-paytable combination or start a new said play of said game, then operating said game selection means;

c. player credits means for detecting that said player wants to contribute said credits towards said play of said game, then receiving said credits from said player into said player credits;

d. action means for accepting an input of an action from said player, then causing a game event to occur;

e. said data means of claim 2 further including said game-paytable combination, said maxwin, said game, said paytable, said player credits, said wager, said win credits and said game event in said data packet;

f. said display means of claim 2 further including additional information in said display showing all information in said data packet needed for said play of said game;

g. wager-rent means for detecting that said rent-credits is taken from said range of said accumulated credits of said wager, then setting said rent-wager equal to said pool-change and calling said rent-range final means;

h. wager means for deducting said credits from said player credits and setting said pool-change equal to the deducted said credits and adding said pool-change to said wager, then calling said wager-rent means if said rent is collected over said range of said credits of said wager, otherwise increasing said pool by calling said pool control means;

i. maxwin threshhold means for testing a change in said maxwin from the time said player selected said game-paytable combination and determining if new said maxwin is less than old said maxwin by an amount exceeding a maxwin threshhold value, then causing a display of excessive said change relative to said maxwin threshhold and then calling said game selection means if said player selects a different said game-paytable combination;

j. betting means for repeatedly operating said player credits means at least until said player credits exceed the minimum said player credits required for the initiation of said action means, then calling said maxwin threshhold means and then operating said wager means for the desired said wager;

k. play-rent means for determining that said rent is separately collected before said play of said game and then repeatedly calling said rent-slot final means to collect said rent until said renttime and said rentgames become sufficient for said play of said game, otherwise said collection of said rent is ignored;

l. play means for operating said play-rent means and said betting means, initiating said action means and calling said display means;

m. award-rent means for determining that said rent is collected from winning said players, then setting said rent-wager to the total said win credits if said rent comes from said winnings, otherwise setting said rent-wager to the total said wagers from said players owed said win credits, then calling said rent-percentage final means to compute a rent amount which is added to said rent-credits, and finally setting said rent-wager to zero;

n. award means for determining that said game event is a win event as established by said paytable, then setting said winnings equal to said win credits for said win event and if said rent-credits is collected from said winning said players calling said award-rent means and reducing said win credits by said rent amount;

o. pay means for operating said award means, then setting said win credits to said pool if said win credits exceeds said pool;

p. win means for operating said pay means, setting said pool-change to the negative value of said win credits and operating said pool control means, then resetting said win credits to the absolute value of said pool-return;

q. win final means for operating said win means, then adding said win credits to said player credits and calling said display means;

r. cashout means for detecting that said player wants to collect said player credits, then disbursing said player credits to said player and subtracting the disbursed said player credits from said player credits and then calling said display means;

s. game play means for detecting the start of new said game, then setting said wager and said win credits to zero and repeatedly operating said play means until said game event is a final event and then operating said win final means; and, t. game control means for detecting that said player has initiated said play, then until said player discontinues said play, repeatedly operating said game switch means, said game play means and said cashout means;

whereby there is at least one said paytable for each said game, where said paytables are available for display and said player is able to select the desired said game-paytable combination, and said play of said game results in said win credits based upon settings in said paytable.

4. The pari-mutuel system of claim 3 further including a committed option for causing the immediate commitment of said credits to said pool before said player makes said wager of said credits, the committed credits being added to said pool, said player credits and a player-stash variable which maintains the count of said committed credits belonging to said player, said player-stash decreasing towards zero when said player makes said wager, comprising:

a. player credits means of claim 3 further adding said credits to said player-stash and said pool-change, then immediately increasing said pool by calling said pool control means;

b. wager means of claim 3 further setting said pool-change equal to said player-stash minus said deducted credits, then if said pool-change is negative setting said pool-change to absolute value of said pool-change and operating said pool-change means, thereby increasing said pool when said player-stash is equal to zero;

c. cashout means of claim 3 further disbursing said player credits less said player-stash to said player, then setting said player credits equal to said player-stash and calling said display means;

d. stash collect means for detecting that said player can collect said committed credits, then disbursing said committed credits in said player-stash to said player and reducing said player-stash by the disbursed said committed credits;

e. stash escrow means for determining that said committed credits can be cashed out and said player wants to cash out, then calling said stash collect means, otherwise detecting that said committed credits can be escrowed for later play, then creating a stash escrow account equal to said player-stash and setting said player-stash to zero, otherwise disallowing collection of said committed credits;

f. stash retrieval means for setting said player-stash equal to a portion of said stash escrow account of said player, then reducing said stash escrow account by said portion of said stash escrow account; and g. stash control means for calling said stash escrow means when said player discontinues said play of said game, and for calling said player-stash retrieval means when said player returns to said play at a later time;

whereby said pool is increased rapidly by said committed credits with immediate inclusion of said player credits into said pool before said player makes said wager, and said pool can maintain larger balances when said committed credits are not collected.

5. The pari-mutuel system of claim 4 further including said award means using a paytable to compute said win credits for said final event, said paytable having at least one said payline that specifies a predetermined win for said final event, said paytable being associated with at least one said pool and one said pot, comprising:

a. top-prize absolute means for determining that said top-prize is a positive predetermined number and that said win credits cannot exceed said predetermined number, then setting said top-prize to said predetermined number;

b. top-prize percentage means for determining that said top-prize is a value which is a percentage of said pool or said pot, then acquiring predetermined top-prize factors and setting a numerator top-prize multiplier and a denominator top-prize divisor greater than zero equal to values from said predetermined top-prize factors;

c. top-prize calculation means for operating said top-prize percentage means, then setting said top-prize equal to said top-prize multiplied by said top-prize multiplier and divided by said top-prize divisor, leaving a top-prize remainder with an absolute value less than said top-prize divisor;

d. top-prize selection means for setting said top-prize to the largest value of zero and said top-prize, then selectively operating said top-prize absolute means if said top-prize is an absolute value, otherwise calling said top-prize calculation means;

e. system top-prize means for setting said top-prize to said credits in said pool or said pot associated with a system, then operating said top-prize selection means and setting said system top-prize equal to said top-prize;

f. game top-prize means for setting said top-prize to said credits in said pool or said pot associated with said game, then operating said top-prize selection means and setting said game top-prize to said top-prize;

g. paytable top-prize means for setting said top-prize to said credits in said pool or said pot associated with said paytable, then operating said top-prize selection means and setting said paytable top-prize to said top-prize;

h. top-prize least means for operating said system top-prize means, said game top-prize means and said paytable top-prize means, then setting said top-prize to the least value of said system top-prize, said game top-prize and said paytable top-prize;

i. payline top-prize means for setting a payline top-prize equal to some combination of a predetermined number, a predetermined percentage of said pool and a predetermined percentage of said pot, then operating said top-prize least means and setting said payline top-prize to the lesser of said payline top-prize and said top-prize;

j. said award means of claim 4 further comprising a calling of said payline top-prize means for said payline;

k. said data means of claim 4 further comprising said top-prize, said system top-prize, said game top-prize, said paytable top-prize, said payline top-prize in said data packet; and l. said display means of claim 4 further including the displaying of said system top-prize, said game top-prize and said paytable top-prize;

whereby said win credits paid to said player at end of said play of said game cannot exceed said top-prize, which is selectable from a top-prize group including said predetermined number, said precentage of said pool and said precentage of said pot.

6. The pari-mutuel system of claim 5 further including said award means using a paytable to compute said win credits for said final event, said paytable having at least one said payline that specifies a predetermined win for said final event, said paytable being associated with at least one said pool and one said pot, comprising:

a. paytable paypot means for specifying which said paypot contains said win credits for payment of said predetermined win, then attaching said paypot to said paytable;

b. paytable zeropot means for specifying which said zeropot will refill said paypot when said paypot has insufficient said credits according to said threshold paypot parameter, then attaching said zeropot to said paytable and said paypot;

c. paytable sidepot means for specifying said sidepot that contains said win credits for jackpots and other special pays to be paid from other than said paypot, and specifying said sidepot for holding said rent and other fees, then attaching said sidepot to said paytable;

d. paytable means for creating said paytable, then associating said paytable with at least one said win event from a win group which includes a system win, a game win, a paytable win, a payline win and a sidepot win;

e. payline win means for detecting said payline win is a predetermined number and setting said payline win credits equal to said predetermined number, otherwise for setting said payline win to a payline percentage which is to be multiplied by said pool or said pot;

f. payline means for creating said payline in said paytable, then associating said payline with said win event and said payline win to be paid from said pot or said pool;

g. payline calculation means for detecting that said payline win is said predetermined number and then multiplying said wager by said predetermined number, otherwise multiplying said wager by the said payline percentage of said pool or said pot, thereby computing a payline win amount;

h. payline maximum means for operating said payline top-prize means, then setting said payline win amount equal to said associated pot if said payline win amount exceeds said associated pot;

i. payline retrieval means for retrieving said payline in said paytable where said win event satisfies said final event, then calling said payline calculation means and said payline maximum means to process said payline;

j. payline final means for operating said payline retrieval means, then setting said payline win credits to said payline win amount;

k. paytable retrieval means for determining if said final event matches said win event of said payline, then operating said payline final means for said final event and adding said payline win credits to said total win;

l. paytable accumulation means for determining said paytable to be used to compute said win credits, then repeatedly operating said paytable retrieval means to process said paylines in said paytable which satisfy said final event;

m. paytable final means for setting said total win to zero and operating said paytable accumulation means for said paytable, then operating said top-prize least means and setting said total win to said top-prize if said total win exceeds said top-prize;

n. said award means of claim 5 further incorporating said paytable;

o. said win means of claim 5 further incorporating said paytable; and p. said data means of claim 5 further comprising said paytable and said payline in said data packet;

whereby said paytable with said predetermined win for said final event allows said win credits to be calculated by using predetermined values or predetermined percentages, and said win credits cannot exceed the least value of said pool, said pot and said top-prize.

7. The pari-mutuel system of claim 6 further imposing a pari-mutuel scheme on a system of pools with a hierarchy having at least one node, at least one said pool and at least one said pot, where said data packet is passed from a lower node to a higher node, using communication schemes that may include an internet or TCP/IP protocol, resulting in said data packet being combined with other said data packets into a combined data packet and a total data packet, comprising:

a. data means of claim 6 further including the identity for both a sending node and a receiving node, designating said identity for said nodes from an identifier group including an internet protocol address, an internet call sign and an internet location;

b. uplink means for determining that said data packet has changed, then operating said data means and transferring said data packet from said lower node to an existing said higher node;

c. combine means for said higher node receiving said data packet from at least one said lower node and combining said data packet with other said data packets to form said combined data packet, then calling said display means to display said combined data packet at said higher node;

d. upload means for operating said uplink means on said combined data packet to transmit it to a total node at the highest hierarchy, said total node computing a total for all said combined data packets received at said total node from said lower nodes, then said total node creating said total data packet;

e. equal means for said lower node receiving said total data packet from from said higher node, then storing said total data packet in an area reserved for said total data packet, said total data packet being kept separate from said data packet and said combined data packet, then operating said display means;

f. downlink means for operating said data means on said total data packet, then sending said total data packet to an existing said lower node;

g. download means for operating said equal means, then operating said downlink means to refresh said lower nodes with the latest said total data packet and the lowest node in said hierarchy will be refreshed with said latest said total data packet;

h. up means for operating said uplink means when said data packet changes, and for operating said upload means when said combined data packet changes;

i. down means for detecting that said total data packet has changed, then operating said download means to transfer said total data packet to said lower nodes; and j. hierarchy means for detecting changes in said data packet, said combined data packet and said total data packet, then selectively operating said up means and said down means;

whereby said total data packet is continuously refreshed at all levels of said hierarchy so that all said nodes have the same said pool and said pot for purposes of computing said win credits.

8. The pari-mutuel system of claim 7 further including that said win credits may be computed using a local paytable and a central computer paytable, at time of computation said paytable is to reside in either a local node or a central computer where said win credits are computed, and said central computer may compute said win credits for a plurality of said local nodes, comprising:

a. paytable locate means for determining in which node said win credits is to be computed, then setting a pay-location temporary variable to local when said win credits is to be computed in said local node, otherwise setting said pay-location to central;

b. said data means of claim 7 further comprising said paytable, said win event, said win credits and said pay-location in said data packet;

c. paytable connect means for connecting said local node with said central computer, then providing for the transfer of said central paytable from said central computer to said local node, otherwise providing for the transfer of said win event from said local node to said central computer and the return transfer of said win credits from said central computer to said local node after said central computer finishes computing said win credits using said central paytable;

d. paytable send means for operating said paytable connect means, then causing said central computer to transmit said central paytable to said local node for the storing of said central paytable in an area reserved for said paytable;

e. event send means for operating said paytable connect means, then causing said local node to send said win event to said central computer for the computing of said win credits using said central paytable in said central computer;

f. paytable local means for determining that said win credits is to be computed in said local node, then operating said paytable final means in said local node with said local paytable being used to compute said win credits;

g. paytable central means for detecting that said win credits is to be computed in said central computer and operating said event send means, then causing said central computer to operate said paytable final means using said central paytable to compute said win credits for said win event received from said local node, then having said central computer transfer the computed said win credits to said local node after the win computation is complete;

h. paytable selection means for detecting that said win credits is to be computed, then cause the computation of said win credits by operating said paytable local means when said pay-location is equal to local, otherwise operating said paytable central means when said pay-location is equal to central;

i. paytable difference means for operating said paytable locate means, then calling said paytable send means if said pay-location indicates that said central paytable must be transferred to said local node; and j. paytable location means for operating said paytable difference means, then detecting that said win credits is to be computed and operating said paytable selection means;

whereby said win credits may be computed for said final event in said local node and said central computer, using said paytable located in said local node and said central computer, respectively.

9. The pari-mutuel system of claim 8 further including a random generator to generate random numbers used to affect an outcome of an event and when said random numbers are generated, said random generator is to reside in said local node or said central computer where said random numbers are generated, and said central computer may compute said random numbers for a plurality of said local nodes, comprising:

a. random initializing means for clearing said random area for said random numbers, then setting to zero a randcount temporary variable which contains the count of said random numbers in said random area;

b. random setup means for setting a randmin temporary variable to the minimum random number, a randmax temporary variable to the maximum random number, and a randmany temporary variable to the number of unique random numbers to be generated and stored in said random area;

c. random locate means for determining the location where said random numbers are to be generated, then setting a random-location temporary variable to local when said random numbers are to be generated in said local node, otherwise setting said random-location to central when said random numbers are to be generated in said central computer;

d. said data means of claim 8 further comprising said random numbers, said random-location, said randcount, said randmin, said randmax and said randmany in said data packet;

e. random connect means for connecting said local node with said central computer, then providing for the generation of said random numbers in said central computer by facilitating the transfer of said randmin, said randmax and said randmany to said central computer for the generation of said random numbers in said central computer and then facilitating the return transfer of the resultant said random numbers to said local node from said central computer, otherwise providing for the transfer of said random numbers generated in said local node to said central computer so that said central computer can apply said central paytable against said random numbers in order to compute said win credits in accordance with said central paytable;

f. random receive means for operating said random connect means, then causing said central computer to operate said random number generator to create said random numbers in said central computer followed by said central computer transferring said random numbers to said local node for storing in an area reserved for said random numbers;

g. random send means for operating said random connect means after operating said random generator to generate said local random numbers, then sending said local random numbers to said central computer for storing in a area reserved for said random numbers;

h. random local means for determining that said random generator is to operate in said local node, then operating said random generator in said local node and returning said random numbers;

i. random central means for operating said random connect means and having said local node request the operating of said random generator in said central computer, then causing said local node to receive said random numbers from said central computer after said random generator completes operating in said central computer;

j. random selection means for detecting where said random generator is to operate, then operating said random local means if said random-location is set to local, otherwise calling said random central means;

k. random unique means for repeatedly operating said random selection means until a returned random number falls in a range from said randmin through randmax inclusive and is unlike any said random numbers currently stored in said random area, then cause the storing of said random number in said random area;

l. random fill means for operating said random unique means, then causing said randcount to be increased by one;

m. random plural means for operating said random locate means, said random initialize means and said random setup means, then repeatedly operating said random fill means until said randcount is equal to said randmany; and n. said action means of claim 8 further comprising the operating of said random plural means, and using at least one said random number to influence said outcome of said final event;

whereby said random numbers may be generated in said local node and said central computer, and said random numbers may be used to affect said play of said game.

10. The pari-mutuel system of claim 9 further providing that said system network can operate as a plurality of separate networks independent of said central computer, with said central computer continuing to operate in a reduced network with said nodes still communicating with said central computer, comprising:

a. top node means for declaring a designated node as a top node for said separate network, said top node operating in place of said central computer for processing communications from said lower nodes in said separate network, with said central computer continuing to operate with fewer said nodes in said reduced network that excludes said nodes operationally belonging to said separate network;

b. separate means for said top node totaling a separate total data packet for said lower nodes reporting to said top node which is the highest said node in said separate network, then having said top node send said separate total data packet to said lower nodes in said separate network, c. reduced means for said central computer totaling a reduced total data packet for said lower nodes still reporting to said central computer in said reduced network, then having said central computer send said reduced total data packet to said lower nodes in said reduced network, d. data means of claim 9 further including said nodes comprising said separate network and said reduced network, and e. display means of claim 9 further including the displaying of said nodes belonging to said separate network and said reduced network, whereby said network can continue operating with a subset of said nodes, said pools and said pots when communication lines are degraded or reconfigured.

11. The pari-mutuel system of claim 10 further allowing said system operator to change system parameters that are used to manage and control the operation of the system facilities which include said pool, said pot, said paypot, said zeropot, said sidepot, said top-prize, said system, said game, said paytable, said payline, said random generator, said player-stash, said separate network, said reduced network and other network controls, comprising:

a. game control means for detecting said system operator wants to change the status of said games, then allowing said system operator to make changes to said system including adding, deleting, activating and deactivating said game and associating said game with said paytable and at least one said pool and said pot;

b. pool number means for detecting said system operator wants to change the status of said pools, then allowing said system operator to make changes to said system including adding, deleting, activating and deactivating said pool and causing the reallocation of said credits in said pool to other said pools as directed by said system operator;

c. pot number means for detecting said system operator wants to change the status of said pots, then allowing said system operator to make changes to said system including adding, deleting, activating and deactivating said pot and causing the reallocation of said credits in said pot to other said pots as directed by said system operator;

d. pot control means for detecting said system operator wants to change the pot parameters for said pots, then allowing said system operator to make changes to said system including changing said pot multiplier and said pot divisor;

e. paytable selection means for detecting said system operator wants to change the status of said paytables, then allowing said system operator to make changes to said system including changing the selection of said paytables which are available for said games, and said pools and said pots which are available for said paytables;

f. paytable control means for detecting said system operator wants to change parameters for said paytables, then allowing said system operator to make changes to said system including changing paytable parameters for said predetermined win, said win event, attached said pools, attached said pots, and said pay-location designating location of said paytable where win computations are to be performed;

g. payline control means for detecting said system operator wants to change said paylines in said paytables, then allowing said system operator to make changes to said system including changing payline parameters in said paytable for said predetermined win, said win event, attached said pots and attached said pools;

h. random control means for detecting said system operator wants to change parameters for said random number generator, then allowing said system operator to make changes to said system including changing parameters for said random-location designating location of said random generator where said random numbers will be generated;

i. rent control means for detecting said system operator wants to change parameters for said rent, then allowing said system operator to make changes to said system including changing parameters for said rent multiplier, said rent divisor and redesignating said sidepot which is to contain said rent;

j. top-prize control means for detecting said system operator wants to change parameters for said top-prize, then allowing said system operator to make changes to said system including changing top-prize parameters for said top-prize absolute value, said top-prize multiplier and said top-prize divisor and associating said top-prize to a system level from one of a system level group including said system, said game and said paytable and designating said pool and said pot to be used for said top-prize at each said system level;

k. node control means for detecting said system operator wants to change the status of said nodes, then allowing said system operator to make changes to said system including adding, deleting, activating and deactivating said nodes and causing the reallocation of said credits among said nodes with respect to their said pools and said pots and causing the setup of said separate networks and said reduced networks as directed by said system operator;

l. said data means of claim 10 further including both an old data packet and a corresponding new data packet when said system operator makes any changes to said system network; and, m. said display means of claim 10 wherein said display highlights differences between said old data packet and said new data packet, said display showing the status of said system facilities, said pools, said pots, said maxwin, said system top-prize, said game top-prizes and said paytable top-prizes;

whereby said system operator is able to configure said system in a desired manner, reallocating said pools and said pots, reconfiguring said nodes to adjust to loss of communications, and to facilitate increased enjoyment by said players.

12. A pari-mutuel gaming system, comprising:

a. account means for establishing at least one player's account having a player's account balance of zero, at least one shared player pool account having a player pool balance of zero and at least one shared paypot account having a paypot balance of zero, said at least one paypot account being a subset of said at least one player pool account, to facilitate the distribution of funds between said player's account, said at least one player pool account and said at least one paypot account;

b. dynamic paytable means for determining a paytable payout for at least one winning outcome of an individual game play during each game play time to allocate an award portion from at least one paypot balance corresponding to said winning outcome for enabling a player's account balance to be increased by said award portion after a successful game play;

c. payment means for accepting an amount of player currency to increase a changing player's account balance by said amount of player currency;

d. betting means responsive to a wager for decreasing said changing player's account balance by a wager amount, for increasing at least one changing player pool balance by a predetermined player pool portion of said wager amount, and increasing said at least one changing paypot balance by a first predetermined paypot portion of said wager amount to said at least one changing player pool account; and e. payout means for detecting the occurrence of at least one immediate winning outcome to facilitate the transfer of an immediate award portion corresponding to said at least one immediate winning outcome from a second predetermined paypot portion of a corresponding said changing player pool account to said changing player's account upon the occurrence of said successful game play, wherein said changing player's account balance is increased by said immediate award portion, said at least one changing player pool balance is decreased by said immediate award portion and said at least one changing paypot balance is decreased by said immediate award portion.

13. A system according to claim 12, wherein said payout means compares said immediate award portion to the corresponding said at least one changing paypot balance and sets said immediate award portion equal to said at least one changing paypot balance if said immediate award portion exceeds said at least one changing paypot balance.

14. A system according to claim 12, wherein said betting means calls said dynamic paytable means to allocate upward revised said award portions after a increasing of said at least one changing player pool balance and a corresponding said at least one changing paypot balance.

15. A system according to claim 12, wherein said payout means calls said dynamic paytable means to allocate downward revised said award portions after a decreasing of said at least one changing player pool balance and said at least one changing paypot balance.

16. A system according to claim 12, further including presentation means for displaying said changing player's account balance, a changing wager amount, said immediate award portion, said at least one changing player pool balance and said at least one changing paypot balance to enable an exact determination thereof to be made.

17. A system according to claim 12, wherein the maximum value authorized for said award portion is a predetermined top-prize from a top-prize group including a predetermined top-prize value, a first predetermined top-prize percentage of said changing player pool balance and a second predetermined top-prize percentage of said changing paypot balance.

18. A system according to claim 17, wherein said immediate award portion is compared to said top-prize and said immediate award portion is set equal to said top-prize if said immediate award portion exceeds said top-prize.

19. A system according to claim 18, wherein one or more said at least one winning outcomes may occur and said payout means operates as many times as necessary to process all said at least one winning outcomes, accumulating an immediate total award for the sum of all said immediate award portions.

20. A system according to claim 19, wherein the maximum award authorized is a maxwin from a maxwin group including a predetermined maxwin value, a first predetermined maxwin percentage of said changing player pool balance and a second predetermined maxwin percentage of said changing paypot balance.

21. A system according to claim 20, wherein said immediate total award is set equal to said maxwin if said said immediate total award exceeds said maxwin and said changing total award is allocated among said immediate award portions in some predetermined manner and said payout means transfers the reallocated said immediate award portions to said changing player account balances instead of the original said immediate award portions prior to reallocating.

22. A system according to claim 21, further including a presentation means for displaying to said players their said changing player's account balance, said changing wager amount, said changing award portion, said changing total award, said top-prize, said maxwin, said at least one changing player pool balance and said at least one changing pot balance to enable an exact determination thereof to be made.

23. A system according to claim 12, wherein said account means further establishes at least one zeropot account corresponding to said at least one paypot account having a zeropot balance of zero, said zeropot account being a subset of said at least one player pool account, and said betting means further allocates to said zeropot balance a predetermined zeropot portion of said wager amount to said at least one changing player pool account.

24. A system according to claim 23, wherein said dynamic paytable means further compares a predetermined paypot value with said changing paypot balance to determine if said changing paypot account is to be replenished, wherein said changing paypot balance is increased by a portion of said at least one changing zeropot account corresponding to said changing paypot account when said dynamic paytable means determines that said changing paypot account requires replenishing and said at least one changing zeropot balance is decreased by the zeropot amount transferred to said at least one changing paypot account.

25. A system according to claim 24, wherein said dynamic paytable means further transfers said changing zeropot account in its entirety to its corresponding said at least one changing paypot account, increasing said at least one changing paypot balance by said changing zeropot balance and then setting said changing zeropot balance to zero.

26. A system according to claim 25, wherein said account means further establishes at least one paypot account as a symbolpot account having a symbolpot balance of zero, and said betting means further allocates said predetermined paypot portion as a symbolpot portion of said wager amount to said at least one changing player pool to be added to said at least one changing symbolpot balance.

27. A system according to claim 25, wherein said account means further establishes at least one sidepot having a sidepot balance of zero, and said betting means further allocates a predetermined sidepot portion of said wager amount to said changing player pool to be added to said changing sidepot balance.

28. A system according to claim 27, wherein said betting means further increases said changing sidepot balance by said sidepot portion of said changing wager amount to said changing player pool account.

29. A system according to claim 23, wherein said betting means further increases said changing zeropot balance by said zeropot portion of said changing wager amount to said at least one changing player pool account.

30. A system according to claim 12, wherein said account means further establishes at least one said paypot account as a jackpot account having a jackpot balance of zero, and said betting means further allocates said predetermined paypot portion as a jackpot portion of said wager amount to said at least one changing player pool to be added to said at least one changing jackpot balance.

31. A system according to claim 12, wherein said account means further establishes at least one said zeropot account with a zeropot balance of zero, at least one said jackpot account with a jackpot balance of zero, at least one said symbolpot account with a symbolpot balance of zero and at least one said sidepot account with a balance of zero.

32. A system according to claim 31, wherein said betting means further allocates a predetermined zeropot portion of said wager amount to said zeropot balance, a predetermined jackpot portion of said wager to said jackpot balance, a predetermined symbolpot portion of said wager to said symbolpot balance, and a predetermined sidepot portion of said wager to said sidepot balance.

33. A system according to claim 32, wherein said betting means further increases said changing zeropot balance by said zeropot portion of said wager amount to said changing player pool, said changing jackpot balance by said jackpot portion of said wager amount to said changing player pool, said changing symbolpot balance by said symbolpot portion of said wager amount to said changing player pool, and said changing sidepot balance by said sidepot portion of said wager amount to said changing player pool.

34. A system according to claim 33, further including presentation means for displaying said player account balances, said wager amounts, said award portions, said player pool balances, said pot balances, said zeropot balances, said jackpot balances, said symbolpot balances and said sidepot balances to enable an exact determination thereof to be made.

35. A system according to claim 34, wherein said dynamic paytable means allocates award portions from said paypot balances, said jackpot balances, said symbolpot balances and said sidepot balances that correspond to said winning outcomes.

36. A system according to claim 35, wherein said payout means further transfers award portions from said paypot balances, said jackpot balances, said symbolpot balances and said sidepot balances for corresponding said winning outcomes.

37. A system according to claim 36, further including means for accumulating all credits and debits charged to said player accounts, said player pool accounts, said paypot accounts, said zeropot accounts, said jackpot accounts, said symbolpot accounts and said sidepot accounts, and for determining a net total of said credits and debits, to facilitate accounting practices for the gaming system.

38. A system according to claim 37, further including means for displaying said credits, debits and net total thereon.

39. A system according to claim 38, wherein said sidepot is a depository account for fees charged for the operating of said game including a house commission account, rent and other fees which are not returned to said players in the form of said winnings.

40. A system according to claim 38, wherein said sidepot is a depository account for extraordinary winnings including special bonuses, jackpots and other special payouts which are to be paid to said players upon the occurrence of certain prespecified events.

41. A pari-mutuel gaming system comprising:

a. account means for establishing a player's account having a player's account balance, a player pool account having a player pool balance and a rent account having a rent balance to facilitate the distribution of funds between said player's account, said player pool account and said rent account;

b. payment means for accepting an amount of player currency to increase said player's account balance by said player currency amount;

c. betting means responsive to a wager for decreasing said player's account balance by a wager amount, for increasing said player pool balance by a player pool portion of said wager amount to a current player pool balance, and increasing said rent balance by a rent portion of said wager amount to distribute said player pool portion and said rent portion of said wager amount to said player pool account and said rent account, respectively;

d. dynamic paytable means for determining a payout for winning outcomes of an individual game play during each game play time to allocate award portions of said current player pool balance to corresponding ones of said winning outcomes for enabling said player's account balance to be increased by one of said award portions after a successful game play; and e. payout means for detecting the occurrence of one of said winning outcomes to facilitate the transfer of said award portion corresponding to said one winning outcome from said player pool account to said player's account upon the occurrence of said successful game play, wherein said player's account balance is increased by said award portion and said current player pool balance is decreased by said award portion.

42. A system according to claim 41, wherein said account means further establishes a zeropot account having a zeropot balance, and said betting means further allocates a zeropot portion of said wager amount to said zeropot balance.

43. A system according to claim 42, wherein said betting means further compares a predetermined pool value with said player pool balance to determine if said player pool is to be replenished, wherein said player pool balance is increased by a portion of said zeropot when said betting means determines that said player pool requires replenishing, and said zeropot is reduced by same said portion of said zeropot.

44. A system according to claim 42, wherein said betting means further increases said zeropot balance by said zeropot portion.

45. A system according to claim 42, wherein said account means further establishes a jackpot pool account and said betting means further increases said jackpot pool balance by a jackpot pool portion of said wager amount.

46. A system according to claim 45, wherein said betting means further compares a predetermined jackpot value with said jackpot pool balance to determine if said jackpot pool is to be replenished, wherein said jackpot pool balance is increased by a portion of said zeropot when said betting means determines that said jackpot pool requires replenishing, and said zeropot is reduced by same said portion of said zeropot.

47. A system according to claim 41, wherein said payout means further compares said award portion with a threshold value.

48. A system according to claim 47, wherein said payout means further detects that said award portion exceeds said threshold value, then transfers a replenishment amount corresponding to the amount of said award portion exceeding said threshold value from said zeropot account to said player pool account.

49. A system according to claim 47, wherein said payout means further adjusts said award portion to an adjusted award portion to maintain said player pool balance at a sufficient level to attract participation.

50. A system according to claim 49, wherein said payout means further transfers a replenishment amount corresponding to said adjusted award portion from said zeropot account to said player pool account.

51. A system according to claim 50, further including presentation means for displaying said player's account balance, said award portions and said player pool balance to enable an exact determination thereof to be made.

52. A system according to claim 41, wherein said paytable further determines a jackpot payout for winning jackpot outcomes of said game play to allocate jackpot award portions of said jackpot pool balance to corresponding ones of said winning jackpot outcomes, and said payout means further detects the occurrence of one of said winning jackpot outcomes to facilitate the transfer of said jackpot award portion corresponding to said winning jackpot outcome to said player's account.

53. A system according to claim 52, wherein said payout means further compares said zeropot balance to said jackpot award portion.

54. A system according to claim 53, wherein said payout means further transfers a jackpot replenishing amount corresponding to said jackpot award portion from said zeropot account to said player pool account.

55. A system according to claim 54, further including means for accumulating all credits and debits charged to said player pool account, said zeropot account, said jackpot account and said rent account, and for determining a net total of said credits and debits, to facilitate accounting practices for the gaming system.

56. A system according to claim 55, further including means for displaying a summary indicating said credits, debits and net total in currency form thereon.

57. A system according to claim 53, wherein said payout means further transfers said zeropot balance in its entirety from said zeropot account to said jackpot pool account.

* * * * *